US011707070B2

(12) United States Patent
Siedler et al.

(10) Patent No.: US 11,707,070 B2
(45) Date of Patent: Jul. 25, 2023

(54) INHIBITION OF FUNGAL GROWTH BY MANGANESE DEPLETION

(71) Applicant: Chr. Hansen A/S, Hoersholm (DK)

(72) Inventors: Solvej Siedler, Hoersholm (DK); Martin Holm Rau, Hoersholm (DK); Stina Dissing Aunsbjerg Nielsen, Hoersholm (DK)

(73) Assignee: Chr. Hansen A/S, Hoersholm (DK)

( * ) Notice: Subject to any disclaimer, the term of this patent is extended or adjusted under 35 U.S.C. 154(b) by 181 days.

(21) Appl. No.: 17/047,900

(22) PCT Filed: Apr. 17, 2019

(86) PCT No.: PCT/EP2019/059942
§ 371 (c)(1),
(2) Date: Oct. 15, 2020

(87) PCT Pub. No.: WO2019/202003
PCT Pub. Date: Oct. 24, 2019

(65) Prior Publication Data
US 2021/0169086 A1    Jun. 10, 2021

(30) Foreign Application Priority Data
Apr. 19, 2018    (EP) ..................... 18168109

(51) Int. Cl.
*A01N 63/20* (2020.01)
*A23C 9/123* (2006.01)
*A23C 9/13* (2006.01)
*A23C 9/146* (2006.01)
*B01D 15/36* (2006.01)

(52) U.S. Cl.
CPC ............ *A01N 63/20* (2020.01); *A23C 9/1234* (2013.01); *A23C 9/1236* (2013.01); *A23C 9/13* (2013.01); *A23C 9/146* (2013.01); *B01D 15/361* (2013.01); *A23Y 2220/13* (2013.01); *A23Y 2220/17* (2013.01); *A23Y 2220/29* (2013.01); *A23Y 2220/35* (2013.01); *A23Y 2220/37* (2013.01); *A23Y 2220/39* (2013.01); *A23Y 2220/47* (2013.01); *A23Y 2220/63* (2013.01); *A23Y 2220/67* (2013.01); *A23Y 2220/71* (2013.01); *A23Y 2220/73* (2013.01); *A23Y 2220/77* (2013.01); *A23Y 2220/79* (2013.01); *A23Y 2280/15* (2013.01)

(58) Field of Classification Search
CPC .... A01N 63/20; A23C 9/1234; A23C 9/1236; A23C 9/1307; A61P 31/10
See application file for complete search history.

(56) References Cited

U.S. PATENT DOCUMENTS

| 10,059,919 B2 | 8/2018 | Hornbaek et al. |
| 10,767,158 B2 | 9/2020 | Hornbaek et al. |
| 2006/0226582 A1 | 10/2006 | Patton et al. |
| 2007/0134395 A1* | 6/2007 | Hodges .................. A23L 5/273 426/580 |

FOREIGN PATENT DOCUMENTS

| CN | 105969700 A | 9/2016 | |
| CN | 105969700 B * | 5/2019 | ........... A23C 20/025 |
| WO | WO-2013/153070 A1 | 10/2013 | |

OTHER PUBLICATIONS

Feng et al. 1997 (Inhibition of yeast growth in grape juice through removal of iron and other metals; International Journal of Food Science and Technology; 32:21-28). (Year: 1997).*
Marschner et al. 1991 (Effect of manganese-reducing rhizosphere bacteria on the growth of Gaeumannomyces graminis var. tritici and on manganese uptake by wheat (*Triticum aestivum* L.); Biol. Fertil Soils 12:33-38). (Year: 1991).*
Loureiro et al. 2003 (Spoilage yeasts I the wine industry; International Journal of Food Microbiology; 86:23-50). (Year: 2003).*
Benitez et al. 2002 (Removal of iron, copper, and manganese from white wines through ion exchange techniques: effects on their organoleptic characteristics and susceptibility to browning; Analytics Chimica Acts: 197-202). (Year: 2002).*
Archibald et al. 1981 (Manganese and Defenses against Oxygen Toxicity in Lactobacillus plantarum; Journal of Bacteriology 145(1) :442-451). (Year: 1981).*
Burmakina et al. 2016 (Determination of Manganese (II) in wines by stripping Voltammetry on Solid Electrodes; Journal of Analytical Chemistry 71(1):71-76). (Year: 2016).*
Feng et al., "Inhibition of yeast growth in grape juice through removal of iron and other metals," International Journal of Food Science and Technology, vol. 32, pp. 21-28 (1997).
Garg et al., "Chelating Resins and Their Applications in the Analysis of Trace Metal Ions," Microchemical Journal vol. 61, pp. 94-114 (1999).
Kleyn, "Ethylenediamine tetraacetic acid a new biological preservative for beer," Antonie van Leeuwenhoek, vol. 35, Supplement: Yeast Symposium, pp. F41-F42 (1969).
Archibald, Frederick S. et al.; "Manganese Acquisition by Lactobacillus plantarum"; Journal of Bacteriology, vol. 158, No. 1;Apr. 1984; pp. 1-8.
Helin, T. R. M. et al.; "Minimum Requirements for Zinc and Manganese in Brewer's Wort"; J. Inst. Brew., vol. 83; Jan.-Feb. 1977; pp. 17-19.

* cited by examiner

*Primary Examiner* — Mary Maille Lyons
(74) *Attorney, Agent, or Firm* — Foley & Lardner LLP

(57) ABSTRACT

The present invention provides a method of controlling growth of unwanted microorganisms by limiting their access to manganese. More specifically, the present invention provides a method of inhibiting or delaying growth of yeast and mold by reducing the manganese concentration in a product which is preferably a food product. The invention also provides manganese scavengers and uses thereof to inhibit or delay fungal growth.

18 Claims, 10 Drawing Sheets
Specification includes a Sequence Listing.

Figures

INHIBITION OF FUNGAL GROWTH BY MANGANESE DEPLETION

CROSS-REFERENCE TO RELATED APPLICATIONS

The present application is the U.S. National Stage of International Application PCT/EP2019/059942, filed Apr. 17, 2019, and claims priority to European Patent Application No. 18168109.9, filed Apr. 19, 2018.

FIELD OF THE INVENTION

The present invention lies in the field of microbiology and relates to methods for controlling of fungal spoilage. The invention also relates to food products and preparations.

BACKGROUND OF THE INVENTION

A major problem in the food industry is spoilage by unwanted microorganisms. According to the Food and Agriculture Organization (FAO), one in every four calories intended for human consumption is ultimately not consumed by humans. In a time of food shortages, with more than 800 million people suffering from hunger, the topic of food waste has become a prioritized issue for global policy makers and food manufacturers. In addition to the negative social and economic impacts for society, wasted food also inflicts a host of related environmental impacts, including unnecessary greenhouse gas emissions and inefficient uses of scarce resources such as water and land.

Yeasts and molds are highly efficient at causing foods to spoil and are a problem for most food manufacturers. Spoilage due to yeasts and molds is clearly visible as patches of mold or discoloration on the surface of the food product, allowing it to be disposed of prior to consumption. Yeasts tend to grow within food and drink matrices in planktonic form and they tend to ferment sugars, growing well under anaerobic conditions. In contrast, molds tend to grow on the surface of products in the shape of a visible mycelium made up of cells.

In particular in the dairy sector, 29 million tons of dairy products go to waste every year in Europe. One of the main challenges in keeping dairy products fresh is to manage contamination by yeast and mold, which are naturally present everywhere, especially if there are disruptions in the cold chain from production to the consumer's table.

For economic and environmental reasons, there is a constant need for novel or improved methods which are effective for controlling yeast and mold contamination.

SUMMARY OF THE INVENTION

The inventors of the present invention have sought to find effective methods to manage fungal contamination and surprisingly identified manganese as important growth constraints for its growth. The present invention provides a novel method of inhibiting fungal growth by limiting the free manganese which is available for yeast(s) or mold(s). The present invention is in part based on the surprising finding that by reducing the level of free manganese in the food product, for example by removing free manganese using manganese scavenging agents, the contamination of yeast(s) and/or mold(s) can be reduced or delayed. The inventors have furthermore shown that common yeasts and molds are responsive to the methods described herein.

Manganese has been considered to be vital to human health and therefore an essential trace element. Manganese is essential to the proper functioning of both humans and animals, as it is required for the functioning of many cellular enzymes, such as manganese superoxide dismutase, pyruvate carboxylase, and it can serve to activate many others like kinases, decarboxylases, transferases and hydrolases.

Manganese can be found naturally in many food sources including leafy vegetables, nuts, grains and animal products. Typical ranges of manganese concentrations in common foods are for example 0.4-40 ppm in grain products, 0.1-4 ppm in meat, poultry, fish and eggs, 0.4-7 ppm in vegetable products.

Besides being dietary supplements, manganese is sometimes added in fermented products as an active ingredient to enhance growth of Bifidobacteria in milk (see e.g. WO2017/021754, Compagnie Gervais Danone, France). However, the inventors have discovered that this may have adverse effect and it would be advantageous to limit manganese concentration in food products in order to prevent or delay growth of unwanted microorganisms.

To combat the problem of microbial spoilage, the present invention provides in a first aspect a method of inhibiting or delaying growth of fungus/fungi in a product comprising the step of reducing free manganese present in said product. Free manganese concentration can be reduced by the methods described in this invention. In a preferred embodiment, one or more manganese scavenging agents are added to reduce free manganese. Free manganese concentration is preferably reduced to below about 0.01 ppm, such as below about 0.008 ppm or below about 0.003 ppm. Using the method, a product in which unwanted yeast and or mold can hardly thrive can be obtained. The product is characterized by a free manganese concentration of below about 0.01 ppm, such as 0.009 ppm, 0.008 ppm, 0.007 ppm, 0.006, 0.005 ppm or lower. The method further comprises the step of measuring the free manganese concentration in the product and obtaining a value of below about 0.01 ppm.

In particular, the present invention provides a method of inhibiting or delaying yeast and/or mold growth in a fermented food product prepared from milk such as yogurt or cheese. The method is characterized by the step of reducing manganese concentration in the food product in order to deprive the yeast and/or mold of manganese and thereby delaying or inhibiting their growth in the food product.

In one preferred embodiment, the present invention provides a method of inhibiting or delaying growth of Torulaspora spp., *Cryptococcus* spp. and *Rhodoturola* spp. in a product comprising the step of reducing free manganese present in said product.

In a second aspect, the present invention provides a method preparing a product such as a food product, comprising reducing free manganese present in said product. Free manganese concentration can be reduced by the methods described in this invention or other methods known to a skilled person in the art. In a preferred embodiment, one or more manganese scavenging agents are added to reduce free manganese. Free manganese concentration is preferably reduced to below about 0.01 ppm, such as below about 0.005 ppm or below about 0.003 ppm. Using the method, a product comprising free manganese concentration below about 0.01 ppm can be obtained.

In a third aspect, the present invention provides products such as food products obtained by the methods described herein. In one embodiment, the present invention provides a method of providing a product, comprising the steps of reducing free manganese in the product and obtaining the product, wherein free manganese concentration is below about 0.01 ppm in the product.

In a further aspect, the present invention provides the use of one or more manganese scavenging agents to inhibit or delay fungal growth as well as to produce food products. Manganese scavenging agents have the effect of making less free manganese available in a product for yeast and mold, thus inhibiting or delaying their growth.

In another aspect, the present invention provides manganese scavenging agents, selections and uses thereof for manganese uptake.

DETAILED DISCLOSURE OF THE INVENTION

Figure 1:
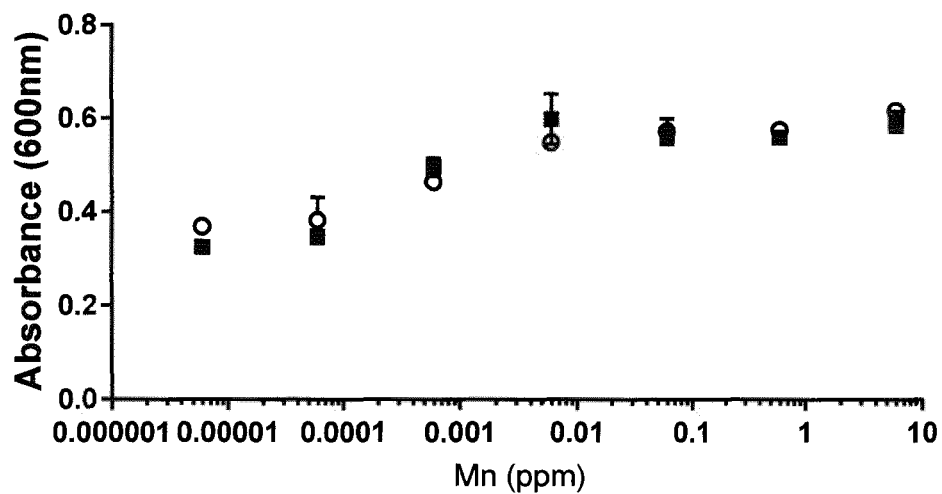
FIGS. 1 and 2 show the growth of 2 different *Debaryomyces hansenii* in chemically defined medium at pH 6.5 (open circles) or 4.5 (black squares) with different manganese concentrations. The growth was measured after 6 days of incubation at 17° C. and determined by absorbance at 600 nm.

Food loss is a major concern worldwide—approximately one third of all food produced for human consumption is either lost or wasted. The reasons for this massive global food loss are diverse, but microbial spoilage that affects organoleptic product quality (aspect, texture, taste, and aroma), plays a major role. Since fungi can grow in different and even harsh environments, they are the major spoilage microorganisms found at all stages of the food process chain. It is therefore crucial to reduce food losses by controlling fungal contamination.

In response to this demand, the present invention provides a novel method of inhibiting or delaying fungal growth in a product. The method is based on the surprising finding that low free manganese concentrations can serve as limiting factor for yeast and/or mold growth. Manganese is present in trace amounts in nature and many of our consumer goods. However, there has not yet been any report suggesting that by manipulating the concentration of free manganese, microbial spoilage can be effectively managed. Based on this unexpected finding, it is envisioned that such spoilage prevention strategy is applicable even beyond food products and extending to other products which are generally prone to microbial contamination, such as feed products, biologic products, health care products, pharmaceutical products and the like.

The present invention provides in a first aspect a method of inhibiting or delaying fungal growth in a product comprising depleting free manganese in said product to a concentration of below about 0.01 ppm.

In general, inhibiting means a decrease, whether partial or whole, in function and activity of cells or microorganisms. As used herein, the terms "to inhibit" and "inhibiting" in relation to yeasts and molds mean that the growth, the number, or the concentration of yeasts and molds is the same or reduced. This can be measured by any methods known in the field of microbiology. Inhibition can be observed by comparing the fungal growth, number or concentration in or on a product with reduced free manganese to a control. The control can be the same product but without reduced free manganese.

The term "to delay" in general means the act of stopping, postponing, hindering, or causing something to occur more slowly than normal. As used herein, "delaying growth of fungi" refers to the act of postponing the growth of fungi. This can be observed by comparing the time needed for the fungi to grow to a given level in two products, one of which with reduced manganese and the other one without (but otherwise the same).

In some embodiments, "delaying growth of fungi" refers to delaying by 7 days, such as 8, 9, 10, 11, 12, 13, 14, 15, 16, 17, 18, 20, 21, 22, 23, 24, 25, 30, 35, 40, 45, 50, 55, 60 days.

A fungus is a member belonging to the kingdom of fungi. Fungal growth can be measured with various methods known to a skilled person in the art. For example, fungal growth can be measured by density or size of colony, cell number, mycelial mass changes, spore production, hyphal growth, colony-forming units (CFU) and the like, depending on the fungus type and the product to which the method is applied. Fungal growth can also be observed by measuring the change in nutrient or metabolite concentrations, such as carbon dioxide release and oxygen uptake. The terms "inhibition of fungal growth" or "inhibiting growth of fungi" refer to the inhibition of fungal cell proliferation. The terms "delay of fungal growth" or "delaying growth of fungi" refer to the slowing down of fungal cell proliferation. This can be observed for example, by measuring the fungal growth and comparing it with a control. Such control may be for example a product without manganese scavengers applied. Methods of determining fungal growth inhibition or delay are known to a skilled person in the art.

"Free manganese" or sometimes "manganese" in accordance with the present invention refers to manganese which is present in a product (i.e. forming part of product, such as within the product or on the surface of a product) that is available to be taken up by fungi, including yeasts and molds. For example, free manganese refers to the manganese that is present in the food matrix of the product.

In one preferred embodiment, the present invention is directed to a method of inhibiting or delaying growth of fungi in a food product, comprising reducing free manganese concentration in a food matrix of the food product. As used herein, the term "food matrix" refers to the food's composition and structure. It is based on the concept that nutrients are contained in a continuous medium.

The term "reduce" or "reducing" generally means lowering the amount of a substance in a given context. As used herein, the term "to reduce free manganese" or "reducing free manganese" means to reduce the amount of manganese present in a product that is available to be taken up by fungi, including yeasts and molds.

For example, this can be carried out by removing manganese present in the product or in a material which is to become part of the product. For example, this can be carried out by subjecting the raw material ion exchange chromatography to remove manganese so that the concentration in the final product is reduced.

Once having access, fungi rapidly colonize, increase in population and take up nutrients from their immediate surroundings. In some embodiments, given that fungi may first come into contact with a product on the surface, it is within the spirit of the present invention that the step of reducing is carried out on parts of the product, for example in the exterior part of the product such as the coating or an outer layer. In such cases, the reducing step nevertheless leads to an overall decrease in the concentration in the product.

Manganese concentration or manganese level as used herein is expressed in parts per million ("ppm") calculated on a weight/weight basis. Reducing free manganese in a product to a concentration below a value means reducing free manganese in the product or parts thereof such that the concentration of free manganese in the entire product by weight is reduced.

Methods of determining trace elements such as manganese are known in the art and described for example in Nielsen, S. Suzanne, ed. *Food analysis*. Vol. 86. Gaithersburg, Md.: Aspen Publishers, 1998.

In applying the present methods, one skilled in the part may first determine the manganese level which is present in the products to be treated. Manganese concentration for food products is well studied and can be found in national food composition databases such as Danish Food Composition Databank, Canadian Nutrient Files. In general, manganese is present at a concentration of at least 0.03 ppm for milk, making dairy products susceptible for fungal contamination. Manganese levels have been reported to range from 0.04 to 0.1 ppm in cow milk and up to 0.18 ppm in goat or sheep milk (Muehlhoff et al., *Milk and dairy products in human nutrition*. Food and Agriculture Organization of the United Nations (FAO), 2013). As for fermented milk products like cheese, the manganese level usually increases due to the concentration process from milk, often up to 10-fold or more. Different levels have been reported for various types of cheeses, for example about 0.06 ppm for ricotta cheese, 0.11 ppm for cream cheese, 0.34 ppm for brie, 0.3 ppm for mozzarella, 0.7 ppm for cottage cheese, 0.68 ppm for gouda and 0.74 ppm for cheddar cheese (Smit, L. E., et al. *The nutritional content of South African cheeses*. ARC-Animal Improvement Institute, 1998; Gebhardt, Susan, et al. "USDA national nutrient database for standard reference, release 12." United States Department of Agriculture, Agricultural Research Service, 1998).

Free manganese in a product is preferably reduced to a concentration below about 0.01 ppm, such as below about 0.009 ppm, below about 0.008 ppm, below about 0.007 ppm, below about 0.006 ppm, below about 0.005 ppm, below about 0.004 ppm, below about 0.003 ppm, below about 0.002 ppm, below about 0.001 ppm, below about 0.0009 ppm, below about 0.0008 ppm, below about 0.0007 ppm, below about 0.0006 ppm, below about 0.0005 ppm, below about 0.0004 ppm, below about 0.0003 ppm or lower.

As used herein, the term "about" indicates that values slightly outside the cited values, i.e., plus or minus 0.1% to 10%. Thus, concentrations slightly outside the cited ranges are also encompassed by the scope of the present inventions.

In one embodiment, the present invention provides a method of inhibiting or delaying growth of fungi in a product, preferably a food product, comprising the steps of
- reducing free manganese in the product, and
- obtaining the product wherein free manganese concentration is below about 0.01 ppm in the product.

The present method further comprises the step of measuring the concentration of free manganese. This can be performed after the reducing step so to determine whether the concentration of free manganese is reduced. In one embodiment, the present invention provides a method of inhibiting of delaying growth of fungi in a food product, comprising reducing free manganese in the product to a concentration of below about 0.01 ppm in the product, and measuring the free manganese in the product, and optionally obtaining a value of below 0.01 ppm.

In one embodiment, the present invention provides a method of inhibiting or delaying growth of fungi in a product, comprising the steps of
- reducing free manganese in the product to a concentration of below about 0.01 ppm in the product,
- measuring the concentration of the free manganese in the product and obtaining a value of below 0.01 ppm.

Methods of measuring of manganese at low concentration are well known to a person skilled in the art. Such methods include atomic absorption spectroscopy, atomic emission spectroscopy, mass spectrometry, neutron activation analysis and x-ray fluorimetry (see e.g., Williams et al. "Toxicological profile for manganese." (2012)).

Preferably, manganese concentration is measured according the standard procedure as described in "Foodstuffs—Determination of trace elements—Pressure digestion" in European Standard EN13805:2014 published by European Committee for Standardization or as described in "Water quality—Determination of selected elements by inductively coupled plasma optical emission spectrometry (ICP-OES)" in ISO 11885:2007 published by International Organization for Standardization.

Fungus

The inventors of the present invention have surprisingly discovered that both yeast and mold can be inhibited by manganese depletion. In one preferred embodiment, the present invention provides a method of inhibiting or delaying growth of yeast in a product, preferably a food product, comprising the step of reducing free manganese in the product. In another preferred embodiment, the present invention provides a method of inhibiting or delaying growth of mold in a product, preferably a food product, comprising the step of free manganese in the product.

In one embodiment, the method is used to inhibit the growth of yeast, such as *Candida* spp., *Meyerozyma* spp., *Kluyveromyces* spp., *Pichia* spp., *Galactomyces* spp., *Trichosporon* spp., *Sporidiobolus* spp., *Torulaspora* spp., *Cryptococcus* spp., *Saccharomyces* spp., *Yarrowia* spp., *Debaryomyces* spp., and *Rhodoturola* spp. Preferably, the fungi is a yeast selected from the group consisting of *Torulaspora* spp., *Cryptococcus* spp., *Saccharomyces* spp., *Yarrowia* spp., *Debaryomyces* spp., *Candida* spp. and *Rhodoturola* spp. More preferably, the fungus is a yeast selected from the group consisting of *Torulaspora delbrueckii*, *Cryptococcus fragicola*, *Saccharomyces cerevisiae*, *Yarrowia lipolytica*, *Debaryomyces hansenii* and *Rhodoturola mucilaginosa*.

In one embodiment, the method is used to inhibit the growth of mold. Preferably, the fungus is a mold selected from the group consisting of *Aspergillus* spp., *Cladosporium* spp., *Didymella* spp. or *Penicillium* spp. More preferably, the fungus is a mold selected from the group consisting of *Penicillium brevicompactum*, *Penicillium crustosum*, *Penicillium solitum*, *Penicillium carneum*, *Penicillium paneum*, and *Penicillium roqueforti*.

Removal of Manganese

Methods of removing manganese are known in the art. Manganese is a common contaminant in many mine waters, groundwater, and freshwaters. In waste water treatment, manganese ions can be chemically removed from effluents by oxidation to $MnO_2$, adsorption, or precipitation as a carbonate.

Alternatively, manganese removal can involve biological processes as alternatives to chemical routes. The role of microbial activity in the remediation of manganese-contaminated waters has been described in various literatures, e.g. Burger et al. Manganese removal during bench-scale biofiltration. *Water Research.* 2008; 42(19):4733-4742; Johnson et al. Rapid manganese removal from mine waters using an aerated packed-bed bioreactor. *Journal of Environmental Quality.* 2005; 34(3):987-993; Tekerlekopoulou et al. "Removal of ammonium, iron and manganese from potable water in biofiltration units: a review." *Journal of Chemical Technology and Biotechnology* 88.5 (2013): 751-773; Patil et al. "A review of technologies for manganese removal from wastewaters." *Journal of Environmental Chemical Engineering* 4.1 (2016): 468-487. In one embodiment, the step of reducing free manganese in the product comprises using ion-exchange chromatography. This is especially applicable if the product is in liquid or substantially liquid.

In one preferred embodiment, the step of reducing free manganese in the product is carried out by adding a manganese scavenging agent. As used herein, the terms "manganese scavenging agent" or "manganese scavenger" refers to a material that is capable of make manganese unavailable for yeast or mold. The material can be a chemical material, such as a chemical chelating material selected from the group consisting of ethylenediaminetetraacetic acid (EDTA), ethylene glycol-bis(β-aminoethyl ether)-N,N,N',N'-tetraacetic acid (EGTA), diaminocyclohexanetetraacetic acid (DCTA), nitrilotriacetic acid (NTA), 1,2-bis(o-aminophenoxy)ethane-N,N,N',N'-tetraacetic acid (BAPTA) or diethylenetriaminepentaacetic acid (DTPA), preferably the chemical chelating material is ethylenediaminetetraacetic acid (EDTA). The material can also be a biological material, such as bacteria.

In some preferred embodiment the manganese scavenging agent is one or more bacteria strains. In such cases, it should be noted that when measuring free manganese, such free manganese does not include the manganese which is found intracellularly. Rather, free manganese refers to the manganese that is found extracellularly, i.e. in the cell-free parts of the product, since they would be available to be taken up by fungi. Thus, in such cases, concentration of free manganese should be measured taking only extracellular manganese into account. This can be done for example by removing cells (such as starter cultures) by centrifugation and obtaining cell-free supernatant, followed by measuring the manganese in the cell-free supernatant. As used herein, the term "bacteria strain" has its common meaning in the field of microbiology and refers to a genetic variant of a bacterium.

In one embodiment, the present invention provides a method of inhibiting or delaying growth of fungi in a product, comprising the steps of
- selecting one or more bacteria strains as a manganese scavenging agent, and reducing free manganese in the product to a concentration of below about 0.03 ppm in the product by adding the manganese scavenging agent.

According to preferred embodiments of the present invention, the method comprises selecting a bacteria strain having manganese uptake activities as a manganese scavenging agent. The selection is based on whether the bacteria strain has manganese transport systems.

Manganese is involved in many crucial biological processes and is ubiquitously found in all organisms. Manganese also contributes to protection against oxidative stress and can also contribute to the catalytic detoxification of reactive oxygen species. Many bacteria have developed sophisticated acquisition system to scavenge essential metals from the environment, using low and high affinity transport systems for chelated or free metals. Manganese which is taken up by bacteria forms a large complex of nondialyzable polyphosphate-protein aggregates in the protein which may reach very high intracellular concentrations.

Transport systems for manganese have been studied and are for example described in Kehres et al., "Emerging themes in manganese transport, biochemistry and pathogenesis in bacteria." *FEMS microbiology reviews* 27.2-3 (2003): 263-290.

In one embodiment, a bacteria strain having manganese uptake activities comprises bacterial $Mn^{2+}$ transporters. $Mn^{2+}$ transporters may be an ABC transporter (for example SitABCD and YfeABCD) or a proton-dependent Nramp-related transport system belonging to the family designated as TC #3.A.1.15 and TC #2.A.55 in the transporter classification system given by the Transport Classification Database (M. Saier; U of CA, San Diego, Saier M H, Reddy V S, Tamang D G, Vastermark A. (2014)). The TC system is a classification system for transport proteins which is analogous to the Enzyme Commission (EC) system for classification of enzymes. The transporter classification (TC) system is an approved system of nomenclature for transport protein classification by the International Union of Biochemistry and Molecular Biology. TCDB is freely accessible at http://www.tcdb.org which provides several different methods for accessing the data, including step-by-step access to hierarchical classification, direct search by sequence or TC number and full-text searching.

In one embodiment, the method comprises selecting a bacteria strain comprising a protein belong to the family designated as TC #3.A.1.15 (manganese chelate uptake transporter (MZT) family) as manganese scavenging agent.

For example, the manganese scavenging agent is a bacteria strain comprising a manganese chelate uptake transporter designated as TC #3.A.1.15.2, TC #3.A.1.15.6, TC #3.A.1.15.8, TC #3.A.1.15.14 or functional variants thereof.

While the ABC transporter is mainly active at higher pH, proton driven transporters may be more active under acidic conditions. This makes them particularly useful as manganese scavenging agents in fermented food products. Thus, in one embodiment, a bacteria strain comprising a protein belong to the family designated as TC #2.A.55 (the metal ion ($Mn^{2+}$-iron) transporter (Nramp) family) is selected.

The step of selecting one or more bacteria strains as manganese scavenging agent comprises determining whether one or more bacteria strain comprises a manganese transporter designated as TC #2.A.55 or functional variants thereof.

More preferably, the transporter belongs to the subfamily designated as TC #2.A.55.2 or the subfamily designated as TC #2.A.55.3, as manganese scavenging agent.

For example, the manganese scavenging agent is a bacteria strain comprising a metal ion ($Mn^{2+}$-iron) transporter (Nramp) designated as TC #2.A.55.3.1, TC #2.A.55.3.2, TC #2.A.55.3.2, TC #2.A.55.3.3, TC #2.A.55.3.4, TC #2.A.55.3.5, TC #2.A.55.3.6, TC #2.A.55.3.7, TC #2.A.55.3.8 or TC #2.A.55.3.9 or functional variants thereof as manganese scavenging agent.

Most preferably, the method comprises selecting a bacteria strain comprising a protein designated as TC #2.A.55.2.6 or functional variants thereof as manganese scavenging agent.

Preferably, the manganese scavenging agent is selected from the group consisting of *Lactobacillus plantarum, Lactobacillus fermenturr, Lactobacillus. reuteri, Lactobacillus sakei, Lactobacillus brevis, Lactobacillus casei, Lactobacillus paracasei, Lactobacillus salivarius, Lactobacillus alimentarius, Pediococcus acidilactici, Lactobacillus rhamnosus* and *Lactobacillus* kefiri.

The term "functional variant" is a protein variant having a substantially similar biological activity, i.e. manganese uptake activities.

As used herein, a "variant" refers to a variant form of a protein which shares at least 55%, 60%, 65%, 70%, 75%, 80%, 85%, 90%, 95%, 96%, 97%, 98%, 99% or 100% sequence identity with a particular nucleic acid or amino acid sequence of the protein.

The invention additionally provides polypeptide sequences of manganese transporters for selecting suitable manganese scavengers to carry out the present invention.

In one preferred embodiment, a manganese scavenging agent is a bacteria strain comprising a polypeptide having the sequence of SEQ ID NO: 1(MASEDKK-SKREHIIHFEDTPSKSLDEVNGSVEVPHNAGFWKT-LAAYTGPGILVAVGYMDPGNWITSI AGGASFKYS-LLSVILISSLIAMLLQAMAARLGIVTGRDLAQMTRD HTSKAMGGFLWVITELAIMATDIAEI IGSAIALKLL-FNMPLIVGIIITTADVLILLLLMRLGFRKIEAV-VATLVLVILLVFAYEVILAQPNVPELLKGYLP HADI-VTNKSMLYLSLGIVGATVMPHDLFLGSSISQTRKIDR TKHEEVKKAIKFSTIDSNLQLTMAFIVNSL LLIL-GAALFFGTSSSVGRFVDLFNALSNSQIVGAIAS-PMLSMLFAVALLASGQSSTITGTLAGQIIMEGFIH LKMPLWAQRLLTRLMSVTPVLIFAIYYHGNEAK-IENLLTFSQVFLSIALPFAVIPLVLYTSDKKIMGEFANR AWVKWTAWFISGVLIILNLYLIAQTLGFVK) or functional variants thereof.

In other preferred embodiments, a manganese scavenging agent is a bacteria strain comprising a polypeptide having at least 55%, such as at least 60%, 65%, 70%, 75%, 80%, 85%, 90%, 95%, 96%, 97%, 98%, 99% or 100% sequence identity with the sequence of SEQ ID NO: 1.

Table 1 shows exemplary sequences which encodes functional variants of SEQ ID NO: 1 and their sequence identity with SEQ ID NO: 1.

TABLE 1

| Origin | SEQ ID NO | Protein ID | % identity | Sequence |
|---|---|---|---|---|
| *Lactobacillus casei* | 4 | WP_013245308.1 | 99.8 | MASEDKKSKREHIIHFEDTPSKSLDEVNGSV EVPHNAGFWKTLAAYTVPGILVAVGYMDPGN WITSIAGGASFKYSLLSVILISSLIAMLLQA MAARLGIVTGRDLAQMTRDHTSKAMGGFLWV ITELAIMATDIAEIIGSAIALKLLFNMPLIV GIIITTADVLILLLLMRLGFRKIEAVVATLV LVILLVFAYEVILAQPNVPELLKGYLPHADI VTNKSMLYLSLGIVGATVMPHDLFLGSSISQ TRKIDRTKHEEVKKAIKFSTIDSNLQLTMAF IVNSLLLILGAALFFGTSSSVGRFVDLFNAL SNSQIVGAIASPMLSMLFAVALLASGQSSTI TGTLAGQIIMEGFIHLKMPLWAQRLLTRLMS VTPVLIFAIYYHGNEAKIENLLTFSQVFLSI ALPFAVIPLVLYTSDKKIMGEFANRAWVKWT AWFISGVLIILNLYLIAQTLGFVK |
| *Lactobacillus brevis* | 5 | WP_011667125.1 | 76.5 | MKNHETDTKTKHHMIESTGSGQKSLDEVNGT VEVPQNAGFWRTLMAYTGPGALIAVGYMDPG NWITSIAGGAQYKYTLLTVVLLSSLVAMLLQ AMSARLGIVTGKDLAQLTREHTGKRTGFALW IUELAIMATDIAEIIGSAIALKLLFGFPLIV GIIITAMDVLVLLVLMKLGFRKIEAIVATLV AVILFVFLYEVILAQPHMGEVLKGYLPSSTV VTNHGMLYLSLGIVGATVMPHDLYLGSSISQ TRSFDRKNRKSVAQAIKFTTIDSNIQLTLAF VVNSLLLILGAALFFGTNSDLGRFVDLFNAL SDSQIVGAIASPMLSMLFALALLSSGQSSTI TGTLAGQIIMEGFINLKMPLWAQRLITRLLS VTPVIIFAIYYHGNEAKIEDLLTFSQVFLSI ALPFAMIPLVIFTSSKKLMGEFANRTWSKIL GWIIAVILIILNIYLILNTLHIVQ |
| *Pediococcus acidilactici* | 6 | WP_070366435.1 | 76.4 | MSKKLDEVDNKSLDEINGSIKVPKNAGFFKT LMAYTGPGILIAVGYMDPGNWITSIAGGAQF KYTLLSVVLISSLIAMLLQAMSARLGIVTGK DLAQLTRERTSKRVGFMLWVVAELAIMATDI AEIIGSGIALELLFHIPLIIGILITAADVLI LLLLMRLGFRKIEAIVATLVMVILIVFAYEV FLSDPSISGIIKGYVPAPVILQNNSMLYLSL GIVGATVMPHDLYLGSSISQTREIDRRDRKN VAQAIRFSTIDSNMQLFLAFIVNSLLLILGA ALFYGTDSSLGRFVDLFNALSDNQIVGAIAS PMLSMLFAVALLASGQSSTITGTLSGQIIME GFIRLRVPLWVQRLVTRLLSVAPVLIFAIYY HGDEAKIENLLTFSQVFLSVALPFAVIPLVM YTSSKKLMGEFANRQWVKWCAWIATIILILL NIYLILQTLGIVK |
| *Lactobacillus plantarum* | 7 | YP_004888316.1 | 74.3 | MKSAKTKDHAKMKAAEEKAIHSTGADSKSLD EVNGSVRVPKDASFWRTLIAYTGPGALVAVG YMDPGNWITSIAGGSQYKYALLSVILLSSLI AMLLQAMAARLGIVTGKDLAQLTRERTSKG MGIFLWIITELAIMATDVAEIIGSGIALKLL FGFPLIVGILITTADVLILLLLMKLGFRKIE AIVATLVAVILFVFLYEVIISQPNIPEMLKG WPTSRIVSNRSMLFLALGIVGATVMPHNLYL GSSISQTRQVDRSDEKEVAKAVKFTTIDSNI QLSVAFVVNSLLLILGAALFFGTKGDLGRFV DLYNALGDSKVVGSIASPLLSMLFAIALLSS GQSSTITGTLSGQIIMEGFIRLKMPLWAQRL LTRLISVTPVLAFAIYYHGNEAKIEDLLTMS QVFLSIALPFAMIPLVMFTSNRALMGNFT NRWVKWTAWIVTVILIILNIYLILQTVGLVK |
| *Lactobacillus sakeI* | 8 | WP_089535161.1 | 67.9 | MHYADGSSLEEINNTVAIPKNAGFWKTLMAF MGPGALVAVGYMDPGNWITSIAGGAQFAYTL ISVILVSNLIAMLLQAMAARLGIVTGMDLAQ MTRAKTGKKMGIFLWIVTELAIMATDIAEII GSAIALELIFNIPLLWGVLITAFDVLLLLLL MKLGFRKIEAIVATLVAVILFVFLYEVILAQ PNMGDVVRGFVPSPRIMTDKKMLFLALGIVG ATVMPHNLYLHSSIAQARQYDRDDVAEKRKA IKFTVIDSNIQLTIAFVVNCLLLILGAAMFY GTNSDLGRFVDLFNALQNKEIVGSIASPMLS LLFAVALLASGQNSTITGTLSGQIVMEGFVR MKIPLWARRVITRGLSILPVIIFTVYYHGNE |

TABLE 1-continued

| Origin | SEQ ID NO | Protein ID | % identity | Sequence |
|---|---|---|---|---|
| | | | | AQVENLLIYSQVFLSIALPVSMIPLTLFTSD EKIMGPFVNRPWVKYTAWFVTIVLTLLNIYL ILQTVGLAA |
| Lactobacillus alimentarius | 9 | WP_057737113.1 | 68.3 | M55KNKKHESL1HYANGPSLEE1NDTVEIPK DAGFFKTLLAYSGPGALVAVGYMDPGNWVTS IAGGAQFKYKLLSVILISSLIAMLLQYMSAK LGIVTGRDLAQLTRDRTSRVGGFILWIITEL AIMATDIAEIIGSAIALKLLFNIPVLWGVII TAFDVLLLLVLMKLGFRKIEAIVATLIMVIL LVFLYEVILAKPDVGQMMVGFIPEPKILQNQ SMLYLSLGIVGATVMPHNLYLHSSISQARKY DRDDPKSIHQAVRFSTWDSNIQLTLAFVVNT LLLLLGAALFYGTSSDLGRFVDLFNALQDPK VAGAVASPVLSILFAVALLASGQNSTITGTL SGQIVMEGFIHMKMKLWARRVITRLMSIIPV ITFAIIYHGNEAKIESLLTFSQVFLSVALPF SIFPLIKFTSNKKLMGEFVNNKLVEYIGYFV AIVLTILNIWLIYTTFVPTA |
| Lactobacillus floricola | 10 | WP_056974015.1 | 65.1 | MTKEETKLFHYADGPSLEEINGTVAVPKKGG FWKTLFAFSGPGALVAVGYMDPGNWVTSIAG GAQYQYTLLSVILISSLIAMLLQAMSARLGI ASGLDLAQATAKHSPKWLRYTLWIITELAIM ATDIAEIVGAAIALKLLFNLPLIVGIFLTTL DVMLLLLLMKLGFRKIEAIVGALIVSILVIF LYEVILARPDVGAMFAGYIPQPEVVTNKGAF YIALGIVGATVMPHNLYLHSSIAQARQYDRN DIEEKKRAIKFTVLDSNIQLSVAFWNTLLLL LGAALFYGAQTDLGTFSELYNALQNPQVAGV IASPILSVLFAVALLASGQNSTITGTLSGQI VMEGFIHLKMPMWARRVITRLISVIPVLIFA IIYHSNEAKIEDLLVFSQVFLSIALPVSIIP LVMFTANKKIMGPFVNKKWVTITSSLVAIIL TGLNIFLILQTLGWVQ |
| Lactobacillus brevis | 11 | WP_011667396.1 | 57.6 | MTDNVSAKSVQGDLTNGPSLAEINGSVRVP KEKGFVRNLLAFSGPGALVAVGYMDPGNWV TSIGGGAQYGYLLMSVILMSSLIAMLLQYM AAKLGIVTQMDLARATRAHTGKRIGAVLWV MTELAIMATDIAEVIGGAIALKLLFGVPLI LGVSLTVLDVLLLLLLTRLGFRKIEAIVLC LILVILVVFAYEVVIAQPSMGQAVASFVPQ AEIMRPGQLTMALGIVGATVMPHNLYLHSS IAQTRKFDRQDPAEMARAVKFTAWDSNIQL FGAFIINCLLLLLGAAMFFGKDAGALGTFG QLYDALQDNRLAGAVASPVLSTLFAVALLA SGQNSTITGTLTGQVIMEGFINMRLPIWVR RLVTRLISVAPVIIVTILYGGSEQALDRLL VNSQVFLSIALPFSMIPLTIFTSSKRIMGT RWVNRWWVTALAWGCTAILTVLNIQIVWAT MTTLF |

In one preferred embodiment, a manganese scavenging agent is a bacteria strain comprising a polypeptide having the sequence of SEQ ID NO: 2 (MARPDER-LTVQREKRSLDDINRSVQVPSVYESSFFQKFLAYSGP-GALVAVGYMDPGNWLTALEGGSRY HYALLSVLLM-SILVAMFMQTLAIKLGVVARLDLAQAIAAFIPNWSR ICLWLINEAAMMATDMTGVVGTAI ALKLL-FGLPLMWGMLLTIADVLVVLLFLRFGIRRI-ELIVLVSILTVGIIFGIEVARADPSIGGIAGGFVPHTDI LTNHGMLLLSLGIMGATIMPHNIYLHSSLAQSRKY-DEHIPAQVTEALRFGKWDSNVHLVAAFLINALLLIL GAALFYGVGGHVTAFQGAYNGLKNPMIVG-GLASPLMSTLFAFALLITGLISSIASTLAGQIVM-EGYLNIRM PLWERRLLTRLVTLIP-IMVIGFMIGFSEHNFEQVIVYAQVSLSIALPFTLFPLV ALTNRRDLMGIHVNSQLV RWVGYFLTGVITVL-NIQLAISVFV) or functional variants thereof.

In other preferred embodiments, a manganese scavenging agent is a bacteria strain comprising a polypeptide having at least 55%, such as at least 60%, 65%, 70%, 75%, 80%, 85%, 90%, 95%, 96%, 97%, 98%, 99% or 100% sequence identity with the sequence of SEQ ID NO: 2.

Table 2 shows exemplary sequences which encode functional variants of SEQ ID NO: 2 and their sequence identity with SEQ ID NO: 2.

TABLE 2

| Origin | SEQ ID NO | Protein ID | % identity | Sequence |
|---|---|---|---|---|
| Lactobacillus casei | 12 | WP_01249167.1 | 99.3 | MARPDERLTVQREKRSLDDINR SVQVPSVYESSFFQKFLAYSGP GALVAVGYMDPGNWLTALEGGS RYHYALLSVLLMSILVAMFMQT LAIKLGVVARLDLAQAIAAFIP HWSRICLWLINEAAMMATDMTG WGTAIALKLLFGLPLMWGMLLT IADVLWLLFLRFGIRRVELIVL VSILTVGIIFGIEVARADPSIG GIAGGFVPHTDILTNHGMLLLS LGIMGATIMPHNIYLHSSLAQS RKYDEHIPAQVTEALRFGKWDS NVHLVAAFLINALLLILGAALF YGVGGHVTAFQGVYNGLKNPMI VGGLASPLMSTLFAFALLITGL ISSIASTLAGQIVMEGYLNIRM PLWERRLLTRLVTLIPIMVIGF MIGFSEHNFEQVIVYAQVSLSI ALPFTLFPLVALTNRRDLMGIH VNSQLVRWVGYFLTGVITVLNI QLAISVFV |
| Lactobacillus rhamnosus | 13 | WP_00571284 2.1 | 85.6 | MTKRNEQLSVQQAKPSLDEINR SVQVPGVYEPSFVQKFLAYSGP GALVAVGYMDPGNWLTALEGGS RYHETLLAVLLLSILAAMFMQT LAIKLGVVARLDLAQAIAAFVP KWSRIGLWLVNEAAMMATDMTG WGTAIALKLLFGLPLMWGMLLT IADVLWLMFLRFGIRRIELIVL ASILTVGIIFGIEWRARPSMGG IVAGLVPHTEILTNRGMLLLSL GIMGATIMPHNIYLHSSLAQSR RYDEHIPAQVTEALRFGKWDSN VHLVAAFIINALLLILGATLFY GMSSHATAFEGVYNGLKNPAIV GGLASPLMSTLFAFALLITGLI SSIASTLAGQIVMEGYLNIQIP LWARRLLTRLVTLIPIMIIGFV MGFSEQHFEQVIVYAQVALSIA LPFTLFPLVALTDRRDLMGQHV NSPVVRWMGYVLTGIITLLNVQ LILSVILP |
| Lactobacillus kefiri | 14 | WP_05476879 3.1 | 72.4 | MSQEPTHKSLDEINQSVEVPSV YETSFLQKFLAYSGPGALVAVG YMDPGNWLTSLGGSQFRYALL SVLLMSILVAMFQTLSIKLGW ARLDLAQAIAQKVPKSGRYTLW IINELAMMATDMTGVVGTAIAL KLLFGLPLVYGILLTIFDVLLV LLFLRFGIRRIEFIVLAAILIV GVIFGIEVTRATPNIVEIAGGL IPTTHIVTNHEMLIMSLGIVGA TIMPHNVYLHSSLAQSRRYDYH NPKQVNEALRFAKWDSNVHLVA AFLINALLLVLGGTLFFHTNSH FSAFQDVYNGLKSSAIVGSLAS PLMSTLFAFALLITGMISSITS TLSGQIVMEGYLHIRLPLWERR LLTRFVTLIPILAIGFLVGFND HDFEEIIVYAQIALSIALPFTL FPMVALTSNHDLMGVHTNRRYV TVIGYLLTSUTILNLQFVLASI |
| Lactobacillus alimentarius | 15 | WP_05773899 2.1 | 68.7 | MPNKKSLDEINESVKVPSVYDT SFLQKFLAYSGPGALVAVGYMD PGNWLTSLGGSQYRYDLLSVL LISILVAMFQTLSIKLGWARL DLAQAIATKVSKPIRYFLWILN EIAMMATDLTGVIGTAIALKLL FNLPLVFGILLTVFDVLIVLIF LRFGIRRIEFIVLAAILTVGII FGIEVFRAOPKLFSIISGVIPST DLFTNHRKLVLSLGIVGATIMP |

TABLE 2-continued

| Origin | SEQ ID NO | Protein ID | % identity | Sequence |
|---|---|---|---|---|
| | | | | HNIYLHSSLAQSRRYDHNDPLQ VNEALRFAKWDSNVHLIAAFII NALLLVLGGTLFYHMTNQLASL QDVFTGLKSHAIVGTLASPLMS WLFAFALLITGMISSITSTLSG QIVMEGYLNIRLPLWQRRLLTR FVTLIPILIIGFIVHFNEQDFE NLIVYAQIILSIALPFTLFPMI FLTNDKKIMGNHVNSKLTTTVG IILASAITILNLQLLFSLI |
| Lactobacillus plantarum | 16 | YP_0048891 77.1 | 67.4 | MQSHRHQSLEEINQSVAVPDVH QTAFWRKFLAYSGPGALVAVGY MDPGNWLTSLAGGGQFQYRLLA VLALAIIVAMFMQGLAIRLGWA RQDLAQAIASKLPRPVRYAAWI LNEVAMMATDMTGVIGTAIALK MLFGLPLLAGILLTIADVLWLL FLRFGIRRVEVIVLVAILTVGI IFGIEVGRAHVQFGNVLLGLVP TPLIVKNHTALVLSLGILGATI MPHNLYLHSSLAQSRRYDYHNP AQVTEALRFANWDSTVHLIAAF LINALLLVLGGTLFFGHTNALA SLQAVFDGLKSTTWGALASPVM SWLFALALLITGLISSITSTLA GQIVMEGYLHIRLPLWQRRLLT RAVTLIPILIIGMLVGFSDAAF ENLIIYAQVALSIALPFTLLPL VALTNDASLMKAHVNRPAVTWV GYGLAGIITVLNIYLVYSLF |
| Lactobacillus reuteri | 17 | WP_0036689 01.1 | 65.8 | MERKSLDEINGSVDVPNVYQSA FWQKFLAYSGPGALVAVGYMDP GNWLTSLAGGSQYRYQLLVVLF TAILIAMYMQSLAIKLGVTTRT DLAQAIARRLPTPLRIALWLFN EIAMMATDLTGVVGTAVALNML FKLPLLIGVLLTIADVLWLFFL HFGIRRIEFIVLTAILVVGAIF AIEVCRAHPEFSAIMDGFVPRS TIFTNHSELLISLGIVGATIMP HNIYLHSSLAQSRRYDEHDPKQ VKETLRFANWDSLIHLFAAFIV NALLLILGGTLFFHAASLGSLE DVFFGLKNPQIVGSLASPLMSW LFAFALLVTGLISSITSTLAGQ IVMEGFINIRLPLWKRRLLTRA VTLVPILIIGFMINFKEEQFEQ LIIYAQIVLSIALPFTLYPLVA LTGNKKLMGPHVNSRWQTVLGY ILASLVTGLNLLVLV |
| Lactobacillus crustorum | 18 | WP_0758872 52.1 | 61.4 | MTEKKSLDEINGSVAVPQYNTS FFRKFLAYSGPGALIAVGYMDP GNWLTSLVGGAHHKYQLLSVLL ISILVATFMQSLSIRLGIASRQ DLAQAIAKKAKKPVRYCLWIIN ELAMMATDLTGVIGTALALNML FKLPLVFGVLITILDVFLILWF MRFGIRRIESIVVISILTVGLI FAFEVSHVQPNLTAIFKGFVPS QTIITNQNKLILSLGIIGATIM PHNIYLHSALAQSRRYDYHDSR QVREALRFANWDSIVHLIAALI INCLLLILGGTIFYDKADQLAS LMTVFKGLMNYQVVGSLASSFM SYLFAFALLVTGLISSITSTLS GQIVMEGYLNIRLPLWQRRLLT RIITLIPILVIGFLVHFNEVIF EDLIVYAQIALSVALPFTLFPL VYLTNNAKIMGKHVNKKWQTIL GFVLALIITILNIVLIATTLSH |

In one preferred embodiment, a manganese scavenging agent is a bacteria strain comprising a polypeptide having the sequence of SEQ ID NO: 3 (MSDDHKKRHPIKLIQYANGPSLEEINGTVEVPHGKGFWRTLFAYSGPGALVAVGYMDPGNWSTSITG GQNFQYLLISVILMSSLIAMLLQYMAAKLGIVSQMDLAQAIRARTSKKLGIVLWILTELAIMATDIAEVIG AAIALYLLFHIPLVIAVLVTVLDVLVLLLLTKIGFRKIEAIVVALILVILLVFVYQVALSDPNMGALLKGFIPTG ETFASSPSINGMSPIQGALGIIGATVMPHNLYLHSAISQTRKIDYK NPDDVAQAVKFSAWDSNIQLSFAF VVNCLLLVMGVAVFKSGAVKDPSFFGLFQALSDSSTLSNGVLIAVAKSGILSILFAVALLASGQNSTITGT LTGQVIMEGFVHMKMPLWARRLVTRIISVIPVIVCVMLTA RDTPIQQHEALNTLMNNSQVFLAFALPFSM LPLLMFTNSKVEMGDRFKNTGWVKVLGWISVLGLTGLN LKGLPDSIAGFFGDHPTATQTNMANIIAIVLI VAILALLAWTIWDLYKGNQRYEAHLAAVADEKEAKADVDEQ) or functional variants thereof.

In other preferred embodiments, a manganese scavenging agent is a bacteria strain comprising a polypeptide having at least 55%, such as at least 60%, 65%, 70%, 75%, 80%, 85%, 90%, 95%, 96%, 97%, 98%, 99% or 100% sequence identity with the sequence of SEQ ID NO: 3.

Table 3 shows exemplary sequences which encode functional variants of SEQ ID NO: 3 and their sequence identity with SEQ ID NO: 3.

TABLE 3

| Origin | SEQ ID NO | Protein ID | % identity | Sequence |
|---|---|---|---|---|
| Lactobacillus casei | 19 | WP_003567390.1 | 99.8 | MSDDHKKRHPIKLIQYANGPS LEEINGTVEVPHGKGFWRTLF AYSGPGALVAVGYMDPGNWST SITGGQNFQYLLISVILMSSL IAMLLQYMAAKLGIVSQMDLA QAIRARTSKKLGIVLWILTEL AIMATDIAEVIGAAIALYLLF HIPLVIAVLVTVLDVLVLLLL TKIGFRKIEAIWALILVILLV FVYQVALSDPNMGALLKGFIP TGETFASSPSINGMSPIQGAL GIIGATVMPHNLYLHSAISQT RKIDHKNPDDVAQAVKFSAWD SNIQLSFAFVVNCLLLVMGVA VFKSGAVKDPSFFGLFQALSD SSTLSNGVLIAVAKSGILSIL FAVALLASGQNSTITGTLTGQ VIMEGFVHMKMPLWARRLVTR IISVIPVIVCVMLTARDTPIQ QHEALNTLMNNSQVFLAFALP FSMLPLLMFTNSKVEMGDRFK NTGWVKVLGWISVLGLTGLNL KGLPDSIAGFFGDHPTATQTN MANIIAIVLIVAILALLAWTI WDLYKGNQRYEAHLAAVADEK EAKADVDEQ |
| Lactobacillus rhamnosus | 20 | WP_005686822.1 | 95 | MSDDHKKKHSMKLIQYANGPS LEEINGTVEVPHGKGFWRTLF AYSGPGALVAVGYMDPGNWST SITGGQNFQYLLISVILMSSL IAMLLQYMAAKLGIVSQMDLA QAIRARTSKKLGIVLWILTEL AIMATDIAEVIGAAIALYLLF HIPLVIAVLVTVLDVLVLLL LTKIGFRKIEAIVVALILVIL LVFVYQVALSDPNMGALLKGF IPTGETFASSPSVNGMSPIQG ALGIIGATVMPHNLYLHSAIS QTRKIDHKDPEDVAQAVKFSA WDSNIQLTFAFWNCLLLVMGV AVFKSGAVKDPSFFGLFQALS DSSTLSNGVLIAVAKSGILSI LFAVALLASGQNSTITGTLTG QVIMEGFIHMKMPLWARRLVT RVISVIPVIVCVMLTARETPI QQHEALNTLMNNSQVFLAFAL PFSMLPLLMFTNSKVEMGDRF KNTGWVKVLGWVSVIGLTYLN LKGLPDSIAGFFGDNPTAAQT NIANMIAYVLIAAVLALLAWT IWDLYKGNKRYEAHLEAVADE EEAKANDDVQ |
| Lactobacillus plantarum | 21 | YP_004890566.1 | 76.3 | MSEKTNTPNRKHKLIEYANGP SLEEINGTIEVPKNLNFWKTL FAYSGPGALVAVGYMDPGNWS |

TABLE 3-continued

| Origin | SEQ ID NO | Protein ID | % identity | Sequence |
|---|---|---|---|---|
| | | | | TSITGGQNYQYMLMSVILISS LIAMLLQYMAAKLGIVSQMDL AQAIRARTSKSLGIVLWILTE LAIMATDIAEVIGAAIALYLL FNIPLVIAVFITVLDVLVLLL LTKIGFRKIEAIVVCLILVIL FVFVYQVALSNPDWGGVIKGL VPTADTFSTSRSVNGMTPLSG ALGIIGATVMPHNLYLHSAIS QTRKIDHNDEEDVARTVKFAA WDSNIQLSFAFVVNSLLLIMG VAVFKSGAVKDPSFFGLYEAL SNTSMLSNGILISVAKSGALS ALFAIALLASGQNSTITGTLT GQVIMEGFVHMRMPLWLRRLV TRLISVIPVLICVLLTSGKSA IDEHTALNNLMNNSQVFLAFA LPFSMLPLLMMTDSAAEMGKR FKNSLWIKGLGWLSVIGLTFL NLLGLPDSILGFFGDNPSAGE QTFSKILAYLLIAAILALLVW TVFDLQRGNKRYVEQQLAAAA KEANK |
| *Pediococcus acidilactici* | 22 | WP_06512 4048.1 | 76.2 | MSNEIKNPKKRRKLISYANGR SLEEINGTVKVPKNIGFWKTL FMYSGPGALVAVGYMDPGNWS TSITGGQNFQYMLMSIILISS LIAMLLQYMAAKLGIVSQMDL AQAIRARTSRALGIVLWILTE LAIMATDIAEVIGAAIALYLL FHIPLVVAVFITVFDVLLLLL LTKIGFRKIEAIVVCLIMVIL VVFVYQVALSHPSWGAVFGGL IPTTKAFATTPTVGGMTPLSG SLGIIGATVMPHNLYLHSAVS QTRKINHDDEEDVARTVRFST WDSNIQLSFAFVVNALLLVMG VAVFKTGAVQDPSFFGLFHAL NDTSTLSNGILIGVAKTGILS TLFAVALLASGQNSTITGTLT GQVIMEGFVHMRMPLWARRLI TRLISVVPVLICVMLTSGKGT IQEHEALNNLMNNSQVFLAFA LPFSMVPLLMMTDSRVEMGDR FKNSWIVRILGWISVIFLTYL NLTGLPDSIAAFFGENASAAE ISMAHDIAYALIVAVLALLAW TVIELYKGNKRYEIELAEKAN AKEAA |
| *Lactobacillus salivarius* | 23 | YP_535797 0.1 | 72.7 | MVNNENNHKKHKMIQYANGKS LEEANGTVEIPKGKGFWKTLF AYSGPGALVAVGYMDPGNWST SITGGQNFQYLLMSVILLSSL IAMLLQYMAAKLGIVSQMDLA QAIRARTSKALGIVLWILTEL AIMATDIAEVIGAAIALYLLF DIPLIIAVFITVFDVLLLLLL TKVGFRKIEAIVVCLIFVILF VFVYQVALSNPDWGGVFKGLI PTSETFAKHPVVHDMSPLNGA LGIIGATVMPHNLYLHSAISQ TRKFDRNNEDDIANAVRFTAW DSNIQLGLAFVVNSLLLIMGV AVFKSGAVEDPSFFGLYQALS DTSVMSNGLLAAAARTGILST LFAVALLASGQNSTITGTLTG QVIMEGFIHL RMPLWARRLITRLLSVIPVLI CVALTSGKSTIEEHEALNNLM NNSQVFLAFALPFSMLPLVIM TGSKVEMGERFKNRLWINILG WISVISLTYLNMIGLPQNLEP |

TABLE 3-continued

| Origin | SEQ ID NO | Protein ID | % identity | Sequence |
|---|---|---|---|---|
| | | | | FFPADKVGLAHTVAYILIVLI IALLIWTLVELHLGNKRFAAE QAKKHNK |
| Lactobacillus fermentum | 24 | WP_01239 1805.1 | 69.6 | MDNTKNQHRKLRLIEHANGKS LEEINGTVEVPHGKGFFRTLF AYSGPGALVAVGYMDPGNWST SITGGQSFQYTLMTTILISSL IAMLLQYMAAKLGIVSQMDLA QAIRARTGKALGVILWLMTEL AIMATDIAEVIGAAIALNLLF HIPLVLAVFITVLDVLVLLLL TKIGFRKIEAIVACLILVILA VFAYQVALSHPDWAGVFKGLL PTKEAIAKEPVVGGISPLTGS LGIIGATVMPHNLYLHSAISQ TRKIDHTNAEDIKQTVRFTAW DSNIQLTLAFFVNALLLIMGV AVFKNGAVQDSSFFGLYDALN NTDMLSNGLLIAVAKSGVLST LFAIALLASGQNSTITGTLTG QVIMEGFVHMKMPLWARRLIT RLLSVVPVLVCVAMTAHESTI DQHASLNILMENSQVFLAFAL PFSMLPLLIMTNSDTEMGQFK NSLWVRVLGWISVIGLTFLNL YNLPQTYEGFGIWSKGLSDVL AWISIWIVVLLAWTCFELIRG DRRLAAEREKHTWEK |
| Lactobacillus amylolyticus | 25 | WP_08088 1380.1 | 63.7 | MCSRKVLLTKQKGKHYLIRYA NGKSLSEINGTIEIPKKRTFW RMLWAYTGPGALVAVGYMDPG NWATSITGGQSFQYILMSTIL ISSLMAMLLQYMAAKLGIVTQ MDLAQAIRLRTGKALGIVLWL MTELAIMATD1AEV1GAAIAL NLLFDIPLVPAVF1TVLDVLL LLLLARIGFRKIEAVVSCLIL VILLVFVYEVLLSNPDWSKAF VGLVPSAKIIQTHPWGGISPL TGTLGIIGATVMPHNLYLHSA ISQTRKINHHNLQLIRDAVKY TALDSNIQLSLAFLVNALLLI MGAAVFKSGAVRDSSFFGLYQ ALDNAKMLSDPLLVHVARTGI LSTLFAVALLASGQNSTITGT LTGQVIMEGYIHLKMPLWARR LVTRLLSVIPVLLCVSFTMND SVMQQHFALNMLMENSQVFLA FALPFSVLPLLIMTNNKAEMG EFKNKPLWHYLGWACALVLTF LNLYNLPSQFVNFKFASKEVS TIIAYFVIWIAALLLWTCIEI YIGDRKVKIHHSGFDAKEKEL KEEGQK |

For purposes of the present invention, the degree of "sequence identity" between two amino acid sequences is determined using the Needleman-Wunsch algorithm (Needleman and Wunsch, 1970, J. Mol. Biol. 48: 443-453) as implemented in the Needle program of the EMBOSS package (EMBOSS: The European Molecular Biology Open Software Suite, Rice et al., 2000, Trends Genet. 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the nobrief option) is used as the percent identity and is calculated as follows:

(Identical Residues×100)/(Length of Alignment−
Total Number of Gaps in Alignment)

For purposes of the present invention, the degree of sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 3.0.0 or later. The optional parameters used are gap open penalty of 10, gap extension penalty of 0.5, and the EDNAFULL (EMBOSS version of NCBI NUC4.4) substitution matrix. The output of Needle labeled "longest identity" (obtained using the—nobrief option) is used as the percent identity and is calculated as follows:

(Identical Deoxyribonucleotides×100)/(Length of Alignment−Total Number of Gaps in Alignment).

In one embodiment, the selecting step comprises determining whether the bacteria strain comprises a manganese transporter having at least 55%, such as at least 60%, 65%, 70%, 75%, 80%, 85%, 90%, 95%, 96%, 97%, 98%, 99% or 100% sequence identity with the sequences of any one of SEQ ID NO: 1-3. The determination can be based on sequencing the bacteria strain or a blast search in known sequence databases.

The manganese scavengers used in the Examples sections in the present invention have manganese transporter as encoded SEQ ID NO: 1-3 or functional variants thereof.

In other embodiments, the present invention provides a method of inhibiting or delaying growth of fungi in a product, comprising the steps of:

selecting one or more bacteria strains as manganese scavenging agent, and reducing free manganese in the product to a concentration of below about 0.01 ppm in the product by adding the manganese scavenging agent, wherein the selecting step comprises measuring a manganese uptake activity of one or more bacteria strains.

Manganese uptake activities can be measured using routine methods known in the art, see e.g. Kehres et al. "The NRAMP proteins of *Salmonella typhimurium* and *Escherichia coli* are selective manganese transporters involved in the response to reactive oxygen." Molecular microbiology 36.5 (2000): 1085-1100.

Figure 11:
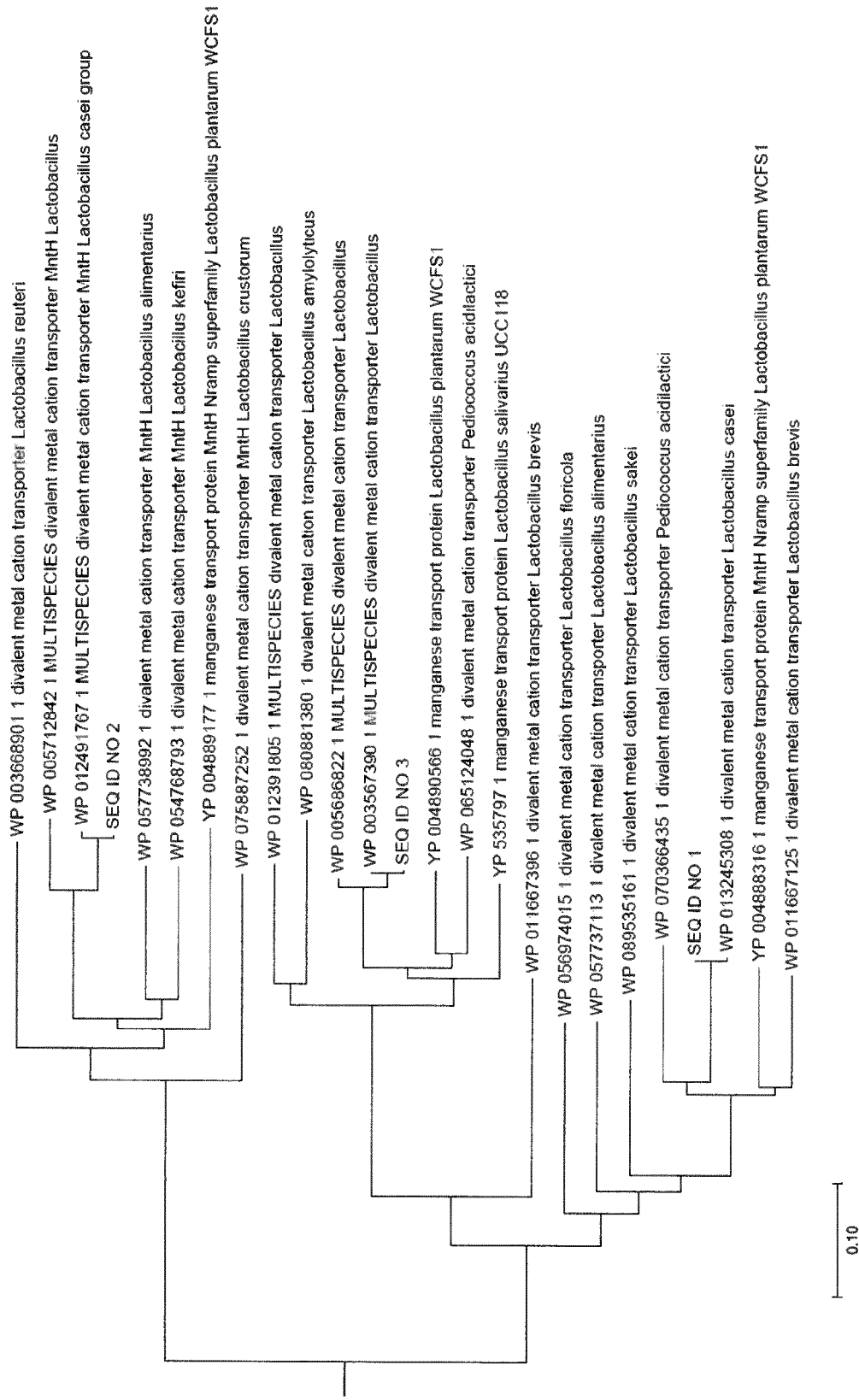
FIG. 11 shows an example phylogenetic tree of MntH manganese transporters of selected *Lactobacillus* species.

For fermented food products such as fermented milk products, a manganese scavenging agent is preferably a *lactobacillus* species. Different manganese transporter families are present in *Lactobacillus* and oftentimes multiple homologs of these are present as well. In FIG. 11, the inventors provide a tree providing an overview of the phylogeny of the manganese transporter MntH family within *Lactobacillus* species. As shown, manganese transporters can be found across the *Lactobacillus* species. Apart from *Lactobacillus* spp., the MntH transporter family can be found in other bacteria as well. The tree was constructed by alignment of *Lactobacillus* MntH protein sequences using mafft v.7 while phylogeny was inferred by neighbor-joining clustering.

In preferred embodiments, the manganese scavenging agent is a bacteria strain selected from the group consisting of *L. rhamnosus, L. salivarius, L. casei, L. paracasei, L. fermentum, L. sakei, L. reuteri, L. plantarum, L. brevis, L. kefiri, L. alimentarius* and *Pedicoccus acidilactici*.

On the other hand, such transporter appears to be absent in *L. helveticus, L. acidophilus, L. gasseri,* and *L. delbrueckii* subsp. *bulgaricus*, making them less suitable for removing free manganese.

According to a preferred embodiment of the present invention, the method comprises a selecting step of determining that the one or more bacteria strains is free of a superoxide dismutase, preferably free of a manganese superoxide dismutase.

Superoxide dismutases, such as manganese superoxide dismutase, have been studied and are for example described in Kehres et al., "Emerging themes in manganese transport, biochemistry and pathogenesis in bacteria." *FEMS microbiology reviews* 27.2-3 (2003): 263-290; Culotta V. C "Superoxide dismutase, oxidative stress, and cell metabolism" *Curr. Top. Cell Regul.* 36, 117-132 (2000) or Whittaker J. W "Manganese superoxide dismutase" *Met. Ions Biol. Syst.* 37, 587-611 (2000), among others.

In the context of the present invention, the term "free of" means that genome of the one or more bacteria strains do not present a gene coding for a superoxide dismutase, or even if the genome of the one or more bacteria strains presents a gene coding for a superoxide dismutase, this gene is not express by the one or more bacteria strains.

Products

In some embodiments, the product is a food product, cosmetic product, health care product or a pharmaceutical product. "Food" and "food product" have the common meaning of these terms. "Food product" refers to any food or feed products suitable for consumption by humans or animals. Food products can be fresh or perishable food products as well as stored or processed food products. Food products include, but are not limited to, fruits and vegetables including derived products, grain and grain-derived products, dairy products, meat, poultry and seafood. More preferably, the food product is a meat product or dairy products, such as yogurt, tvarog, sour cream, cheese and the like.

However, it should be noted that within the context of the present invention, the term "product" and "food product" in the present invention does refer to water as such. Although manganese is essential to human nutrition, in water it is generally regarded as unhealthy for humans according to United States Environmental Protection Agency (EPA). Therefore, the treatment of drinking water or waste water to remove excess manganese is sometimes carried out for decontamination and health purposes, which is not related to the spirit of the present invention.

The present invention is especially applicable for food products having intermediate to high water activity. Water activities ($a_w$) determine viability and functionality of microorganisms. Water activity or $a_w$ is the partial vapor pressure of water in a substance divided by the standard state partial vapor pressure of water. In the field of food science, the standard state is most often defined as the partial vapor pressure of pure water at the same temperature. Using this particular definition, pure distilled water has a water activity of exactly 1.

The main food categories prone to fungal spoilage are dairy products having intermediate to high water activity, such as yogurt, cream, butter, cheese and the like. However, it is also envisioned that the present invention is suitable for food products having lower water activities, such processed meat, cereals, nuts, spices, dried milk, dried meats and fermented meats.

In preferred embodiment, the product where the methods disclosed in the present invention can be applied is a product having a water activity ($a_w$) of less than 0.98, such as less than about 0.97, less than about 0.96, less than about 0.95, less than about 0.94, less than about 0.93, less than about 0.92, less than about 0.91, less than about 0.90, less than about 0.89, less than about 0.88, less than about 0.87, less than about 0.86, less than about 0.85, less than about 0.84, less than about 0.83, less than about 0.82, less than about 0.81, less than about 0.80, less than about 0.79, less than about 0.78, less than about 0.77, less than about 0.76, less than about 0.75, less than about 0.74, less than about 0.73, less than about 0.72, less than about 0.71, less than about 0.70 or lower.

In some embodiments, the product is one having a water activity ($a_w$) of about 0.70 to about 0.98, such as about 0.75 to about 0.97, such as about 0.80 to about 0.96, such as about 0.85 to about 0.95.

Methods for measuring water activity are known in the art, for example, as described in Fontana Jr, Anthony J. "Measurement of water activity, moisture sorption isotherms, and moisture content of foods." Water activity in foods: Fundamentals and applications (2007): 155-173.

In one embodiment, the steps described herein are carried out to inhibit or delay growth of fungi in fermented food products. Fermented food products are foods produced or preserved by the action of microorganisms. Fermentation means the conversion of carbohydrates into alcohols or acids through the action of a microorganism. Fermentation typically refers to the fermentation of sugar to alcohol using yeast. However, it may also involve the conversion of lactose to lactic acid. For example, fermentation may be used to make foods such as yogurt, cheese, salami, sauerkraut, kimchi, pickle and the like.

In one embodiment, the food product is a product of lactic acid fermentation, i.e. prepared by lactic acid bacteria (LAB) fermentation. "Lactic acid bacterium" designates a gram-positive, microaerophilic or anaerobic bacterium, which ferments sugars with the production of acids including lactic acid as the predominantly produced acid. The food product typically has a pH of about 3.5 to about 6.5, such as about 4 to about 6, such as about 4.5 to about 5.5, such as about 5.

The present invention is particularly useful in inhibiting or delaying growth of fungi in dairy products. In such products, contamination with yeast and molds are common and limits the shelf life of such products. "Dairy product" includes, in addition to milk, products derived from milk, such as cream, ice cream, butter, cheese and yogurt, as well as secondary products such as lactoserum and casein and any prepared food containing milk or milk constituents as the main ingredient, such as formula milk. In one preferred embodiment, the dairy product is a fermented dairy product. The term "milk" is understood as the lacteal secretion obtained by milking any mammal, such as cows, sheep, goats, buffaloes or camels. In a preferred embodiment, the milk is cow's milk. The term milk also includes protein/fat solutions made of plant materials, e.g. soy milk.

Concentration of manganese varies in milk, depending on the animal from which it is produced, the feed, as well as the season. In general, manganese is present at a concentration of at least 0.03 ppm in dairy products, for example at least 0.08 ppm for skimmed milk, and at least 0.1 ppm for whole milk. With the present finding of the inventors, reducing the manganese amount in such products or products prepared therefrom would render them more resistant to spoilage.

In one embodiment, the food product is a product prepared by fermentation with thermophiles, i.e. thermophilic fermented food product. The term "thermophile" refers to microorganisms that thrive best at temperatures above 43° C. The industrially most useful thermophilic bacteria include *Streptococcus* spp. and *Lactobacillus* spp. The term "thermophilic fermentation" herein refers to fermentation at a temperature above about 35° C., such as between about 35° C. and about 45° C. "Thermophilic fermented food product" refers to fermented food products prepared by thermophilic fermentation of a thermophilic starter culture. Include in such products are for example yogurt, skyr, labneh, lassi, ayran and doogh.

In one embodiment, the food product is a product prepared by fermentation with mesophiles, i.e. mesophilic fermented food product. The term "mesophile" refers to microorganisms that thrive best at moderate temperatures (15° C.-40° C.). The industrially most useful mesophilic bacteria include *Lactococcus* spp. and *Leuconostoc* spp. The term "mesophilic fermentation" herein refers to fermentation at a temperature between about 22° C. and about 35° C. "Mesophilic fermented food product," which refers to fermented food products prepared by mesophilic fermentation of a mesophilic starter culture. Included in such products are for example buttermilk, sour milk, cultured milk, smetana, sour cream and fresh cheese, such as quark, tvarog and cream cheese.

Preparation of Fermented Products

The methods disclosed herein are particularly useful to inhibit or delay yeast and/or mold growth in fermented milk product such as thermophilic and mesophilic fermented milk product, for example a yogurt product. The term "fermented milk product" is a term generally defined in accordance with relevant official regulations and the standards are well known in the field. For example, symbiotic cultures of *Streptococcus thermophilus* and *Lactobacillus delbrueckii* subsp. *bulgaricus* are used as starter culture for yogurt, whereas *Lactobacillus acidophilus* is used to make *acidophilus* milk. Other mesophilic lactic acid bacteria are used to produce quark or fromage frais.

The expression "fermented milk product" means a food or feed product wherein the preparation of the food or feed product involves fermentation of a milk base with a lactic acid bacterium. "Fermented milk product" as used herein includes but is not limited to products such as thermophilic fermented milk products (e.g. yogurt) and mesophilic fermented milk products (e.g. sour cream and buttermilk, as well as fermented whey, quark and fromage frais). Fermented milk product also includes cheese, such as continental type cheese, fresh cheese, soft cheese, cheddar, mascarpone, pasta filata, mozzarella, provolone, white brine cheese, pizza cheese, feta, brie, camembert, cottage cheese, Edam, Gouda, Tilsiter, Havarti or Emmental, Swiss cheese, and Maasdamer.

The term "yogurt" has its usual meaning and is generally defined in accordance with relevant official regulations and standards are well known in the field. Starter cultures used for making yogurt comprises at least one *Lactobacillus delbrueckii* subsp. *bulgaricus* strain and at least one *Streptococcus thermophilus* strain. Interestingly, the manganese transporter is not present in *L. delbrueckii* subsp. *bulgaricus* and only displays low expression in *Streptococcus thermophilus*, the two strains found in the starter culture in yogurt, making them particularly susceptible to fungal spoilage. It is therefore preferable to include other bacteria strain(s) to scavenging free manganese present in yogurt.

Preferably, free manganese in the fermented product is reduced to a concentration of below about 0.005 ppm.

During food processing chemical preservatives have traditionally been used to avoid fungal spoilage. However, in view of a strong societal demand for less processed and preservative-free foods, the invention contributes to provide an effective solution to manage yeast and mold growth by using biological manganese scavenging agents to reduce the manganese concentration.

When using a biological scavenging agent, the skilled person is able to adjust various parameters such as pH, temperature, and amount of manganese scavenging agent or bacteria to achieve the desired results, taking into consideration the examples provided in this invention as well as the properties of the food product such as water activity, nutrients, level of naturally occurring manganese, shelf life, storage conditions, packing, etc.

The product in which free manganese concentration is reduced is preferably packaged to further limit contact with yeast and mold. It is also preferred to store the product under cold temperature (below 15° C.) to help extend shelf life.

For fermented food product, manganese scavenging bacteria may be added before, at the start, or during the fermentation. Depending on parameters chosen, the step of reducing manganese level to a preferred level may take several hours, such as at least 5 hours, such as at least 10 hours, such as at least 15 hours, such as at least 20 hours, such as at least 1 day, 2 days, 3 days or more. A skilled person in the art will be able to choose appropriate parameters, depending on the product where inhibition or delay of fungi is desired.

The invention provides a method of preparing a fermented food product, comprising adding a starter culture and a manganese scavenging agent to a food substrate, fermenting the substrate for a period of time until a target pH is reached. The manganese scavenging agent is preferably a *lactobacillus* bacteria strain.

As used herein, the term "food substrate" base refers to the substrate in which fermentation is to be carried out.

To make fermented dairy products, the food substrate is a milk base. "Milk base" is broadly used in the present invention to refer to a composition based on milk or milk components which can be used as a medium for growth and fermentation of a starter culture. "Milk" generally refers to the lacteal secretion obtained by milking of any mammal, such as cows, sheep, goats, buffaloes or camels. Milk base can be obtained from any raw and/or processed milk material as well as from reconstituted milk powder. Milk base can also be plant-based, i.e. prepared from plant material e.g. soy milk. Milk base prepared from milk or milk components from cows is preferred.

Milk bases include, but are not limited to, solutions/suspensions of any milk or milk like products comprising protein, such as whole or low-fat milk, skim milk, buttermilk, reconstituted milk powder, condensed milk, dried milk.

Milk base may also be lactose-reduced depending on the need of the consumers. Lactose-reduced milk can be produced according to any method known in the art, including hydrolyzing the lactose by lactase enzyme to glucose and galactose, or by nanofiltration, electrodialysis, ion exchange chromatography and centrifugation.

To ferment the milk base a starter culture is added. The term "starter" or "starter culture" as used in the present context refers to a culture of one or more food-grade microorganisms in particular lactic acid bacteria, which are responsible for the acidification of the milk base.

The manganese scavenging agent can be added before, at the start, or during the fermentation at the same time or at a different time with the starter culture.

After adding the starter culture and the manganese scavenging agents and subjecting the milk base to a suitable condition, the fermentation process begins and continues for a period of time. A person of ordinary skill in the art knows how to select suitable process conditions, such as temperature, oxygen, addition of carbohydrates, amount and characteristics of microorganism(s) and the process time it takes. This process may take from three, four, five, six hours or longer.

These conditions include the setting of a temperature which is suitable for the particular starter culture strains. For example, when the starter culture comprises mesophilic lactic bacteria, the temperature can be set to about 30° C., and if the culture comprises thermophilic lactic acid bacterial strains, the temperature is kept in the range of about 35° C. to 50° C., such as 40° C. to 45° C. The setting of the fermentation temperature also depends on the enzyme(s) added to the fermentation which can be readily determined by a person of ordinary skill in the art. In a particular embodiment of the invention the fermentation temperature is between 35° C. and 45° C., preferably between 37° C. and 43° C., and more preferably between 40° C. and 43° C. In another embodiment, the fermentation temperature is between 15° C. and 35° C., preferably between 20° C. and 35° C., and more preferably between 30° C. and 35° C.

Fermentation can be terminated using any methods known to in the art. In general, depending on various parameters of the process, the fermentation can be terminated by making the milk base unsuitable for the strain(s) of the starter culture to grow. For example, termination can be carried out by rapid cooling of the fermented milk product when a target pH is reached. It is known that during fermentation acidification occurs, which leads to the formation of a three-dimensional network consisting of clusters and chains of caseins. The term "target pH" means the pH at which the fermentation step ends. The target pH depends on the fermented milk product to be obtained and can be readily determined by a person of ordinary skill in the art.

In a particular embodiment of the invention, fermentation is carried out until at least a pH of 5.2 is reached, such as until a pH of 5.1, 5.0, 4.9, 4.8, 4.7, 4.6, 4.5, 4.4, 4.3, 4.2, 4.1, 4.0, 3.9, 3.8 or 3.7 is reached. Preferably, the fermentation is carried out until a target pH between 4.0 and 5.0 and more preferably between 4.0 and 4.6 is reached. In a preferred embodiment, the fermentation is carried out until target pH below 4.6 is reached.

In a preferred embodiment, fermented food product is selected from the group consisting of quark, cream cheese, fromage frais, greek yogurt, skyr, labneh, butter milk, sour cream, sour milk, cultured milk, kefir, lassi, ayran, twarog, doogh, smetana, yakult and dahi.

In another preferred embodiment, fermented food product is a cheese, including continental type cheese, fresh cheese, soft cheese, cheddar, mascarpone, pasta filata, mozzarella, provolone, white brine cheese, pizza cheese, feta, brie, camembert, cottage cheese, Edam, Gouda, Tilsiter, Havarti or Emmental, Swiss cheese, and Maasdamer.

In a further embodiment, the method further comprises packing the food product to reduce contact with yeast and mold.

Included in the present invention is a food product obtained by the methods described herein.

The product obtained by the present invention is preferably a fermented milk product with a concentration of free manganese reduced to less than 0.01 ppm after being stored for at least two days, for example at least 3 days, at least 4 days, more preferably at least 5 days, at least 6 days, at least 7 days, at least 8 days, at least 9 days, at least 10 days, at least 11 days, at least 12 days, at least 13 days, and at least 14 days.

Other features and advantages of the invention will become apparent from reading the following description in conjunction with the accompanying figures. Unless otherwise defined, all terms used herein have the same meaning as commonly understood by one of ordinary skill in the art. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Unless otherwise stated, all exact values provided herein are representative of corresponding approximate values (e.g. all exact exemplary values provided with respect to a particular factor or measurement can be considered to also provide a corresponding approximate measurement, modified by "about", where appropriate). The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

EXAMPLES

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description and the following examples. Such modifications are also intended to fall within the scope of the appended claims. In the case of conflict, the present disclosure including definitions will prevail.

Example 1 Growth of Yeasts in Different Manganese Concentration

The example demonstrates manganese requirements of *Debaryomyces hansenii* in minimal medium. Two *D. hansenii* isolated from spoiled yogurt (strain 1) and quark (strain 2), respectively, were used. The strains were grown in chemically defined medium with different manganese concentrations.

The minimal medium contains biotin 2 µg/L, calcium pantothenate 400 µg/L, folic acid 2 µg/L, inositol 2 mg/L, nicotinic acid 400 µg/L, p-amino benzoic acid 200 µg/L, pyridoxine 400 µg/L, riboflavin 200 µg/L, thiamine 400 µg/L, Boric acid 500 µg/L, copper sulfate 40 µg/L, potassium iodide 100 µg/L, ferric chloride 200 µg/L, sodium molybdate 200 µg/L, zinc sulfate 400 µg/L, potassium phosphate monobasic 0.5 g/L, potassium phosphate dibasic 0.5 g/L, magnesium sulfate 0.5 g/L, sodium chloride 0.1 g/L, calcium chloride 0.2 g/L, glucose 20 g/L, ammonium sulfate 5 g/L.

Manganese concentration used: 6 ppm, 0.6 ppm, 0.06 ppm, 0.006 ppm, 0.0006 ppm, 0.00006 ppm 0.000006 ppm.

Two different pH were tested: pH 6.5 and 4.5.

The strains were inoculated to 150 µl of the different medium in a 96 well plate. The plates were incubated at 17° C. for several days and the growth of the yeast strains was followed by measuring absorbance at 600 nm in a plate reader.

Figure 2:
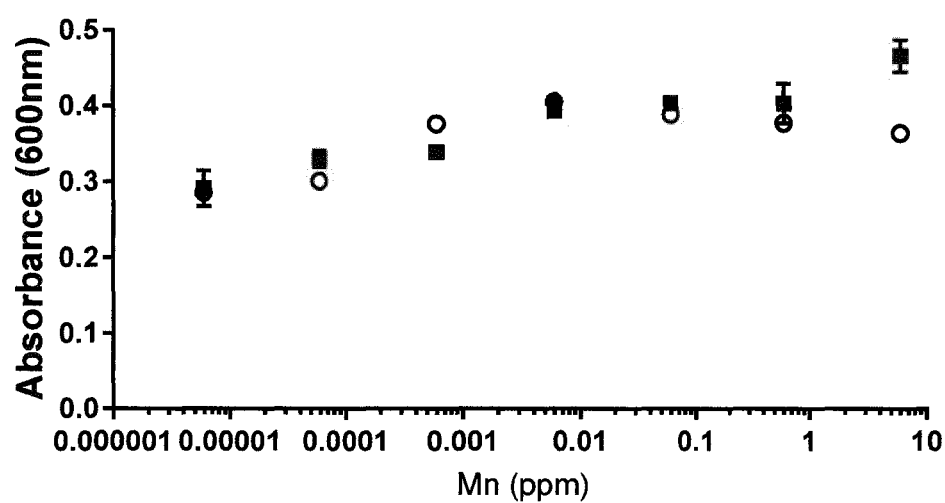

The effect of different pH and different manganese concentrations to the growth of the two different *D. hansenii* strains are shown in FIG. 1 (strain 1) and FIG. 2 (strain 2). It can be seen that growth of *D. hansenii* is inhibited below a concentration of about 0.01 ppm manganese. There was no difference between the two different pH, demonstrating that this mechanism is valid in this pH range.

Example 2 Inhibition of Yeast in Fermented Milk Products

The example demonstrates manganese requirements of *Debaryomyces hansenii* in fermented milk products.

Fermented milk products with a starter culture (*Streptococcus thermophilus* and *Lactobacillus delbrueckii* subsp. *bulgaricus*) or additionally with manganese scavenging agents (*L. rhamnosus* and *L. paracasei*) were prepared. The fermented milk products were centrifuged (10 min at 5000 rpm) and the supernatant was sterile filtered. The supernatant was transferred to a sterile 96-well plate (150 µl in each well), and manganese was added to the first well to a final concentration of 6 ppm, then a 10-fold serial dilution was performed to result in different manganese concentrations reaching from 6 ppm to 0.000006 ppm. *D. hansenii* was inoculated to ~20 cells/well and the plates were incubated at 17° C. for several days and the growth of the yeast strains was followed by measuring absorbance at 600 nm in a plate reader at day 7.

Figure 3:
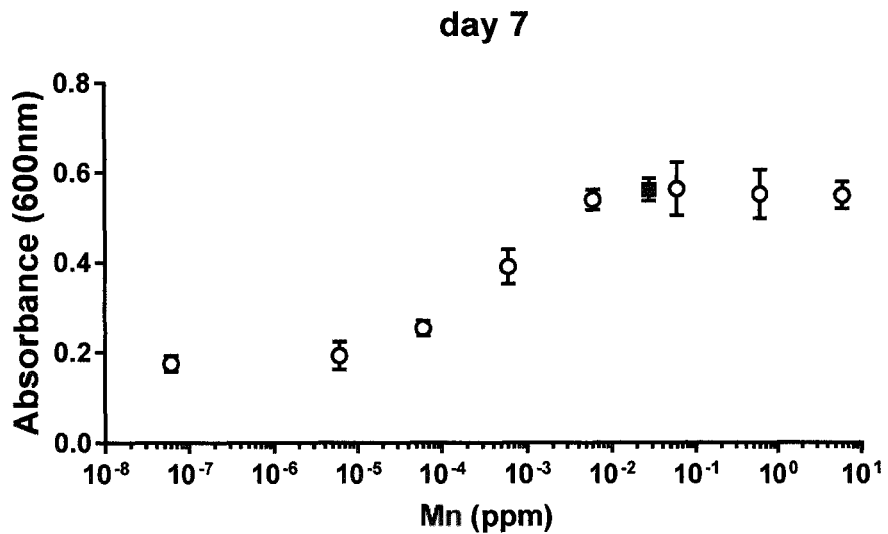
FIGS. 3 and 4 show the growth of 2 different *Debaryomyces hansenii* in the aqueous phase of fermented milk in the presence of manganese scavengers and with different manganese concentrations added. Absorbance at 600 nm was measured after 7 days of incubation at 17° C. Growth after manganese was added to aqueous phase is shown in FIG. 3 for *Debaryomyces hansenii* (strain 1) and FIG. 4 for *Debaryomyces hansenii* (strain 2) (open circles), compared to reference where no additional manganese is added (square). Average and standard deviation of technical replicates n=6 (A) and n=3 (B) are shown.
Figure 4:
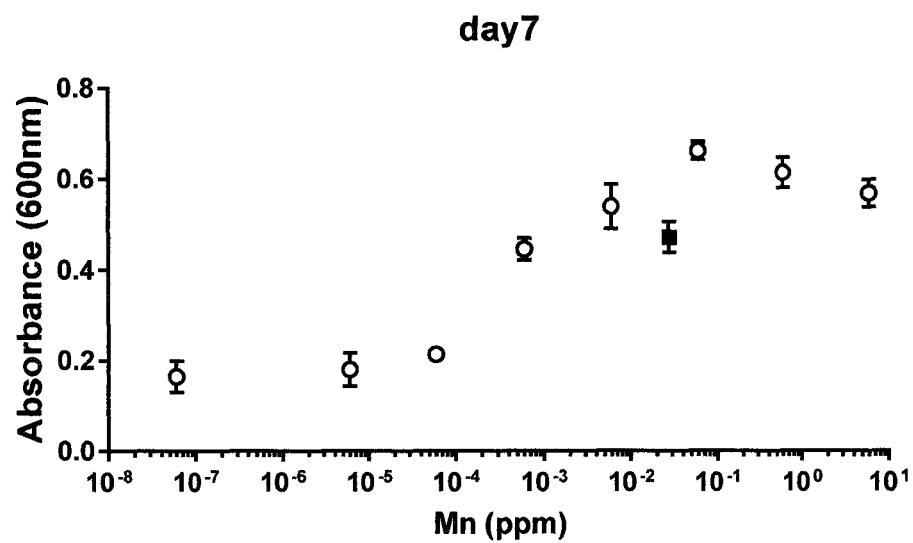

FIGS. 3 and 4 show the growth of *D. hansenii* (strain 1 and strain 2, respectively). Yeast growth after manganese was added to aqueous phase is shown in FIG. 3 for strain 1 and FIG. 4 for strain 2 (open circles). Average and standard deviation of technical replicates n=6 (A) and n=3 (B) are shown. As comparison, yeast growth is also shown for the reference yogurt aqueous phase where neither manganese scavengers nor additional manganese was added (square). It is noted that the reference has an inherent manganese concentration of 0.03 ppm. For the open circles the x-axis indicates the manganese concentration added, and for the square (the reference yogurt aqueous phase) the x-axis indicates the manganese inherent in the aqueous phase.

This result demonstrates that the growth of the yeast strains in a food matrix depends on manganese. Addition of manganese results in a similar growth to the reference, proving that low manganese concentrations are the major limitation for yeast growth in the fermented milk product.

Example 3 Inhibition of *Debaryomyces* and *Rhodoturola*

This example shows manganese scavenging activities of the various bacteria and their inhibitory effect against *Debaryomyces* and *Rhodoturola*. Inhibitory effect in fermented milk products with low manganese concentration and elevated manganese concentration was evaluated.

Table 4 lists the bacteria added and whether they comprise manganese transporters.

TABLE 4

| No. | Species | Contains manganese transporter |
|---|---|---|
| 1 | Lactobacillus rhamnosus | Yes |
| 2 | Lactobacillus rhamnosus | Yes |
| 3 | Lactobacillus rhamnosus | Yes |
| 4 | Lactobacillus rhamnosus (ATCC 7469) | Yes |
| 5 | Lactobacillus salivarius | Yes |
| 6 | Lactobacillus casei | Yes |
| 7 | Lactobacillus paracasei | Yes |
| 8 | Lactobacillus fermentum | Yes |
| 9 | Lactobacillus sakei (ATCC 15521) | Yes |
| 10 | Lactobacillus reuteri (ATCC 23272) | Yes |

TABLE 4-continued

| No. | Species | Contains manganese transporter |
|---|---|---|
| 11 | Lactobacillus plantarum | Yes |
| 12 | Lactobacillus delbrueckii | No |
| 13 | Lactobacillus helveticus | No |
| 14 | Lactobacillus gasseri (ATCC 33323) | No |
| 15 | Lactobacillus brevis | Yes |
| 16 | Lactobacillus kefiri (ATCC 35411) | Yes |
| 17 | Lactobacillus alimentarius | Yes |
| 18 | Pediococcus acidilactici (DSM20284) | Yes |
| 19 | Control (starter culture only) | |

The listed bacteria were grown in MRS medium overnight.

Preparation: 2 ml milk containing a starter culture (*Streptococcus thermophilus* and *Lactobacillus delbrueckii* subsp. *bulgaricus*) was inoculated with 10 μl of the overnight culture.

The milk was fermented at 43° C. for about 6 hours until pH 4.5 was reached. The fermented milk was stored in the fridge upon further use. 150 μl of the fermented milk was transferred to individual wells in a 96 well plate in duplicate. To half of the sample manganese was added to obtain an increase of 6 ppm manganese and all the wells were inoculated with about 20 cells of either *Debaryomyces hansenii* or *Rhodoturola mucilaginosa*. After 4 days a dilution row was spotted on selective YGC plates to analyze the yeast growth. The yeast growth was was measured by optical inspection, whereas a value of 0 is given for no growth and 5 for complete growth. The average of two biological independent experiments was shown in Table 5 for *Debaryomyces* and Table 6 for *Rhodoturola*.

TABLE 5

Inhibition of *Debaryomyces*

| | Scavenger | Yeast growth (a.u.) | Yeast growth (a.u.) with 5 ppm manganese |
|---|---|---|---|
| 1 | Lactobacillus rhamnosus | 0 | 5 |
| 2 | Lactobacillus rhamnosus | 0 | 5 |
| 3 | Lactobacillus rhamnosus | 0 | 5 |
| 4 | Lactobacillus rhamnosus | 0 | 4.5 |
| 5 | Lactobacillus salivarius | 3.75 | 5 |
| 6 | Lactobacillus casei | 3.75 | 5 |
| 7 | Lactobacillus paracasei | 0 | 5 |
| 8 | Lactobacillus fermentum | 0 | 5 |
| 9 | Lactobacillus sakei | 0.5 | 5 |
| 10 | Lactobacillus reuteri | 4 | 5 |
| 11 | Lactobacillus plantarum | 0.5 | 5 |
| 12 | Lactobacillus delbrueckii | 4.5 | 4.5 |
| 13 | Lactobacillus helveticus | 5 | 3 |
| 14 | Lactobacillus gasseri | 5 | 5 |
| 15 | Lactobacillus brevis | 3.5 | 5 |
| 15 | Lactobacillus kefiri | 1.5 | 5 |
| 17 | Lactobacillus alimentarius | 3.5 | 5 |
| 18 | Pediococcus acidilactici | 4 | 5 |
| 19 | Control (starter culture only) | 5 | 5 |

TABLE 6

Inhibition of *Rhodoturola*

| | Scavenging agent(s) | Yeast growth (a.u.) | Yeast growth (a.u.) with 6 ppm manganese |
|---|---|---|---|
| 1 | Lactobacillus rhamnosus | 1 | 4.5 |
| 2 | Lactobacillus rhamnosus | 1.5 | 4.5 |
| 3 | Lactobacillus rhamnosus | 1 | 4.5 |
| 4 | Lactobacillus rhamnosus | 1 | 4.5 |
| 5 | Lactobacillus salivarius | 3.5 | 5 |
| 6 | Lactobacillus casei | 3.5 | 5 |
| 7 | Lactobacillus paracasei | 2 | 5 |
| 8 | Lactobacillus fermentum | 3 | 5 |
| 9 | Lactobacillus sakei | 1 | 4.5 |
| 10 | Lactobacillus reuteri | 4 | 5 |
| 11 | Lactobacillus plantarum | 2.5 | 4 |
| 12 | Lactobacillus delbrueckii | 4 | 4 |
| 13 | Lactobacillus helveticus | 4.5 | 5 |
| 14 | Lactobacillus gasseri | 4.5 | 4.5 |
| 15 | Lactobacillus brevis | 3.5 | 4.5 |
| 16 | Lactobacillus kefiri | 3.5 | 4.5 |
| 17 | Lactobacillus alimentarius | 5 | 5 |
| 18 | Pediococcus acidilactici | 5 | 5 |
| 19 | Control (starter culture only) | 5 | 5 |

The results show that the strains that scavenge manganese can be used to inhibiting *D. hansenii* and *R. mucilaginosa*, but the inhibition is diminished upon addition of manganese.

Example 4 Inhibition of *Debaryomyces*, *Saccharomyces*, *Rhodoturola*, *Cryptococcus* and *Torulaspora*

The example evaluates the differences in yeast growth in aqueous phase of fermented milk which is prepared with a starter culture, with and without manganese scavenging agents.

Table 7 lists manganese scavenging agents used:

TABLE 7

| No. | Scavenging agent(s) | manganese transporter |
|---|---|---|
| 1 | L. rhamnosus L. paracasei | Yes |
| 2 | L. rhamnosus | Yes |
| 3 | L. rhamnosus | Yes |

This example shows yeast growth under 2 different manganese concentrations. Inhibitory effects towards 6 different yeasts in fermented milk products with low manganese concentration and elevated manganese concentration was evaluated.

Reduced-fat (1.5% w/v) homogenized milk was heat-treated at 90±1° C. for 20 min and cooled immediately. A commercial starter culture (*Streptococcus thermophilus* and *Lactobacillus delbrueckii* subsp. *bulgaricus*) was inoculated at 0.02% (v/w) in 3 L buckets. One bucket was inoculated with manganese scavenging agents in total concentration of 100 U/T and one bucket was used as a reference and only inoculated with the starter culture. All buckets were incubated in a water bath at 43±1° C. and fermented at these conditions until pH of 4.60±0.1 was reached. The fermented milk products were divided into 200 mL bottles and cooled down.

The fermented milk product was then centrifuged (10 min at 5000 rpm) and the supernatant was sterile filtered. The supernatant was transferred to a sterile 96-well plate (150 μl in each well) and to half of the manganese was added to obtain an increase of 6 ppm manganese. Six different yeasts were selected and inoculated about 20 cells per well at grown for 7 days at 17° C. As a control milk fermented with a starter culture alone (reference) was used. The growth was determined by absorbance by measuring at 600 nm.

The average and standard deviation from at least 5 replicates are shown in Table 8-13.

TABLE 8

Inhibition of *Debaryomyces hansenii* (Strain 1):

|   | Scavenging agent(s) | Yeast growth (absorbance at 600 nm) | Yeast growth (absorbance at 600 nm) with 6 ppm manganese |
|---|---|---|---|
| 1 | L. rhamnosus L. paracasei | 0.14 ± 0.01 | 0.48 ± 0.07 |
| 2 | L. rhamnosus | 0.18 ± 0.01 | 0.46 ± 0.05 |
| 3 | L. rhamnosus | 0.27 ± 0.01 | 0.62 ± 0.08 |
| Ref | None | 0.40 ± 0.03 | |

TABLE 9

Inhibition of *Debaryomyces hansenii* (Strain 2)

|   | Scavenging agent(s) | Yeast growth (absorbance at 600 nm) | Yeast growth (absorbance at 600 nm) with 6 ppm manganese |
|---|---|---|---|
| 1 | L. rhamnosus L. paracasei | 0.01 ± 0.01 | 0.43 ± 0.06 |
| 2 | L. rhamnosus | 0.01 ± 0.00 | 0.44 ± 0.03 |
| 3 | L. rhamnosus | 0.10 ± 0.02 | 0.51 ± 0.06 |
| Ref | None | 0.33 ± 0.04 | |

TABLE 10

Inhibition of *Saccharomyces cerevisiae*

|   | Scavenging agent(s) | Yeast growth (absorbance at 600 nm) | Yeast growth (absorbance at 600 nm) with 6 ppm manganese |
|---|---|---|---|
| 1 | L. rhamnosus L. paracasei | 0.51 ± 0.06 | 0.63 ± 0.09 |
| Ref | None | 0.62 ± 0.02 | |

TABLE 11

Inhibition of *Rhodoturola mucilaginosa*

|   | Scavenging agent(s) | Yeast growth (absorbance at 600 nm) | Yeast growth (absorbance at 600 nm) with 6 ppm manganese |
|---|---|---|---|
| 1 | L. rhamnosus L. paracasei | 0.15 ± 0.01 | 0.19 ± 0.01 |
| 2 | L. rhamnosus | 0.13 ± 0.01 | 0.23 ± 0.02 |
| 3 | L. rhamnosus | 0.17 ± 0.01 | 0.22 ± 0.02 |
| Ref | None | 0.24 ± 0.01 | |

TABLE 12

Inhibition of *Cryptococcus fragicola*

|   | Scavenging agent(s) | Yeast growth (absorbance at 600 nm) | Yeast growth (absorbance at 600 nm) with 6 ppm manganese |
|---|---|---|---|
| 1 | L. rhamnosus L. paracasei | 0.06 ± 0.01 | 0.08 ± 0.01 |
| 2 | L. rhamnosus | 0.06 ± 0.01 | 0.08 ± 0.01 |
| 3 | L. rhamnosus | 0.07 ± 0.00 | 0.09 ± 0.01 |
| Ref | None | 0.10 ± 0.01 | |

TABLE 13

Inhibition of *Torulaspora delbrueckii*

|   | Scavenging agent | Yeast growth (absorbance at 600 nm) | Yeast growth (absorbance at 600 nm) with 6 ppm manganese |
|---|---|---|---|
| 1 | L. rhamnosus L. paracasei | 0.11 ± 0.00 | 0.16 ± 0.02 |
| Ref | None | 0.20 ± 0.02 | |

The results demonstrate that the strains *Debaryomyces, Saccharomyces, Rhodoturola, Cryptococcus* and *Torulaspora* can be inhibited by bacteria which scavenge manganese, and the inhibition effect is reduced upon addition of manganese.

Example 5 Inhibition of *Debaryomyces hansenii*

The example evaluates the influence of different manganese concentrations in fermented milk prepared with a starter culture, with and without manganese scavenging agents was tested.

Table 14 lists manganese scavenging agents used:

TABLE 14

| No. | Scavenging agent(s) | Contains manganese transporter |
|---|---|---|
| 1 | L. rhamnosus L. paracasei | Yes |
| 2 | L. rhamnosus | Yes |
| 3 | L. rhamnosus | Yes |

Fermented milk product was prepared as in Example 4.

150 μl of the fermented milk was transferred to individual wells in a 96 well plate in duplicate or triplicate. A serial dilution was performed to result in different manganese concentrations added reaching from 6 ppm to 0.000006 ppm. All wells were inoculated with about 20 cells of *Debaryomyces hansenii* (strain 2) and the plates were incubated at 17° C. for 5 days. Afterwards, 10 μl of a 1000-fold dilution, prepared in saline peptone, was spotted on selective YGC plates to analyze the yeast growth.

Figure 5:
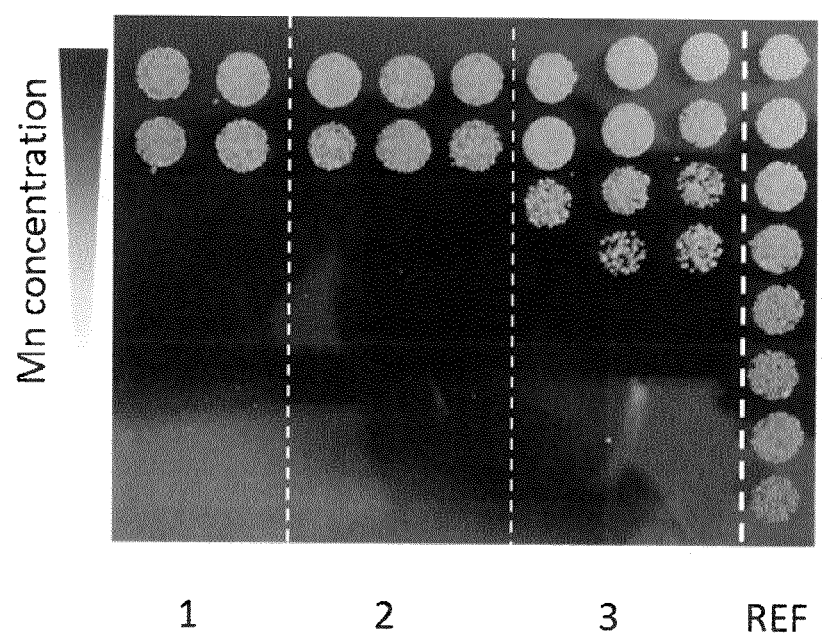
FIG. 5 shows the growth of *Debaryomyces hansenii* (strain 2) in fermented milk prepared with and without different scavenging agents, after addition of different manganese concentrations ranging from 6 ppm (top row), to 0.000006 ppm (bottom row).

FIG. 5 shows the growth of *Debaryomyces hansenii* in fermented milk prepared with scavenging agents (No. 1, No. 2 and No. 3) and without scavenging agents (REF), after addition of different manganese concentrations: 6 ppm (top row), 0.6 ppm (row 2), 0.06 ppm (row 3), 0.006 ppm (row 4), 0.0006 ppm (row 5), 0.00006 ppm (row 6), 0.000006 ppm (row 7) and 0 ppm (bottom row).

As shown, yeast growth in fermented milk with scavenging agent(s) No. 1 and No. 2 was inhibited upon addition of 0.6 ppm (compare row 3 to row 2); addition of 0.006 ppm did result in some yeast growth in the present of scavenging agent No. 3.

Example 6 Inhibition of Yeast in Fermented Milk Product with Different Manganese Levels Influence of manganese on the inhibitory effect against different molds were evaluated. An agar-assay resembling the manufacturing process and production of fermented milk products was used. *L. rhamnosus* and *L. paracasei* were used together as manganese scavenging agents.

Preparation of Fermented Milk Samples:

Reduced-fat (1.5% w/v) homogenized milk was heat-treated at 90±1° C. for 20 min and cooled immediately. A commercial starter culture (*Streptococcus thermophilus* and *Lactobacillus delbrueckii* subsp. *bulgaricus*) was inoculated at 0.02% (v/w) in 3 L buckets. One bucket was inoculated with manganese scavenging agents in total concentration of 100 U/T and one bucket was used as a reference and only inoculated with the starter culture. All buckets were incubated in a water bath at 43±1° C. and fermented at these conditions until pH of 4.60±0.1 was reached. The fermented milk products were divided into 200 mL bottles and cooled down. Manganese concentration already present in the reference product was previously determined to be about 0.03 ppm and in the product with the scavenging strains below the detection limit of 0.003 ppm.

Addition of Manganese:

Different manganese concentrations were added to fermented milk products with and without manganese scavenger to obtain an addition in the levels of manganese (0, 0.006 and 6 ppm manganese in reference products and 0, 0.000006, 0.00006, 0.0006, 0.006, 0.06, 0.6 and 6 ppm manganese).

All the fermented milk samples were warmed to a temperature of 40° C. and added 40 ml of a 5% sterile agar solution that had been melted and cooled down to 60° C. This solution of fermented milk and agar was then poured into sterile Petri dishes and the plates were dried in a LAF bench for 30 min.

Challenge Test Using Yeast:

Three target contaminants, including two *Debaryomyces hansenii* (strain 1 and strain 2) and one *Cryptococcus fragicola* were spotted in concentrations of $10^3$, $10^2$ and $10^1$ CFU/spot. Plates were incubated at 7±1° C. and regularly examined for the growth of yeast.

Figure 6:
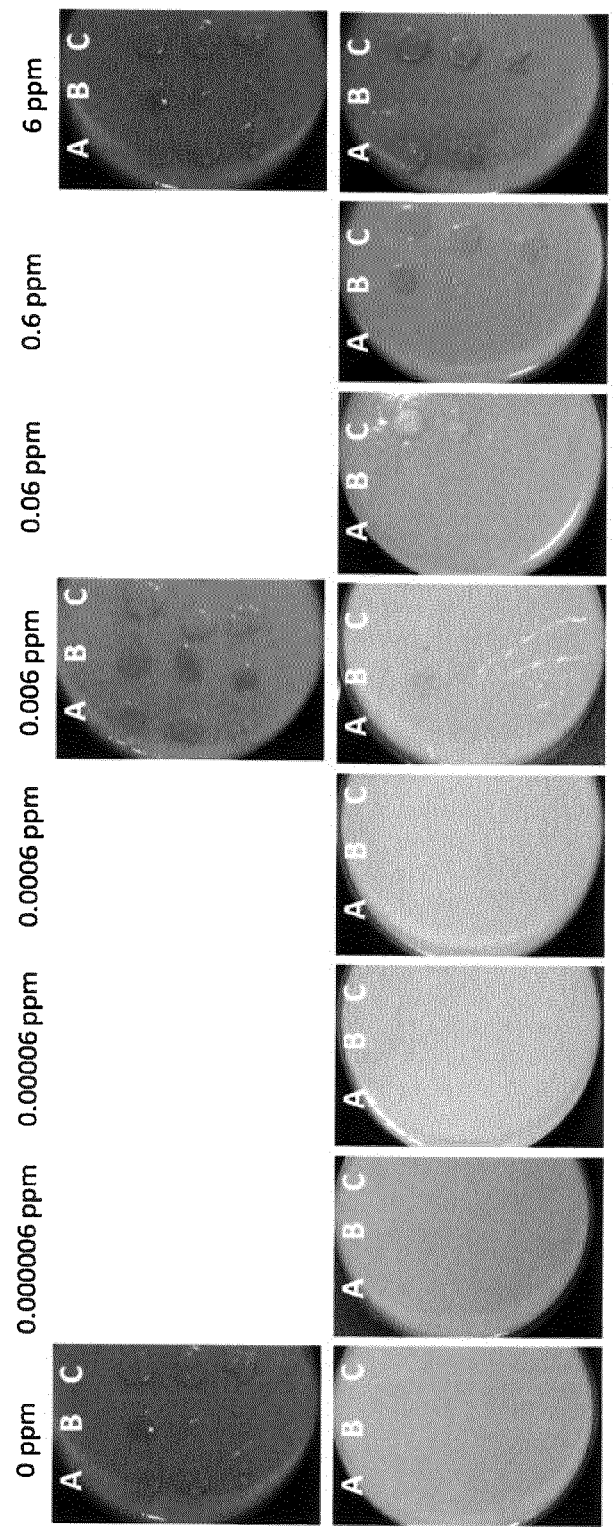
FIG. 6 shows the growth of 3 different yeasts on plates prepared from milk fermented with a starter culture alone (reference, top row) or together with manganese scavenger (bottom row). Different manganese concentrations were added as indicated above the pictures. Three target contaminants (column A: *Debaryomyces hansenii* (strain 2), column B: *Cryptococcus fragicola*, column C: *Debaryomyces hansenii* (strain 1) were added in three different concentrations: $1\times10^3$ cfu/spot (top row on plate), $1\times10^2$ cfu/spot (middle row on plate) and $1\times10^1$ cfu/spot (bottom row on plate).

Results:

Results of the yeast agar-assay are presented in FIG. 6 showing the growth of 3 different yeasts on plates prepared from milk fermented with a starter culture alone (reference, top row) or together with manganese scavengers (bottom row). Different manganese concentrations were added as indicated above the pictures. Three target contaminants (column A: *Debaryomyces hansenii* (strain 2), column B: *Cryptococcus fragicola*, column C: *Debaryomyces hansenii* (strain 1) were added in three different concentrations: $1\times10^3$ cfu/spot (top row on plate), $1\times10^2$ cfu/spot (middle row on plate) and $1\times10^1$ cfu/spot (bottom row on plate).

As can be seen from FIG. 6, the tested yeasts grew well on the agar plates made from milk fermented only with the starter culture (reference). However, when manganese scavengers were present during milk fermentation the outgrowth of all the yeasts was delayed.

At manganese levels of up to 0.0006 ppm, the scavenger kept the high inhibitory activity towards all three yeast. At manganese levels between 0.006 ppm and 0.6 ppm the inhibitory activity of scavenger towards *C. fragicola* was decreased. Manganese concentration of 6 ppm seemed to inhibit the growth of *C. fragicola*. *D. hansenii* (strain 1) was inhibited by manganese scavenger at manganese levels up to 0.006 ppm. At manganese levels of 0.06 ppm and above, manganese scavenger lost the inhibitory activity towards *D. hansenii* (strain 1). *D. hansenii* (Strain 2) was inhibited by manganese scavenger at manganese levels up to 0.6 ppm and at 6 ppm manganese the activity was lost.

Example 7 Inhibition of Mold in Fermented Milk Product with Different Manganese Levels Fermented milk product samples with different levels of manganese were prepared as described in Example 6.

Figure 7:
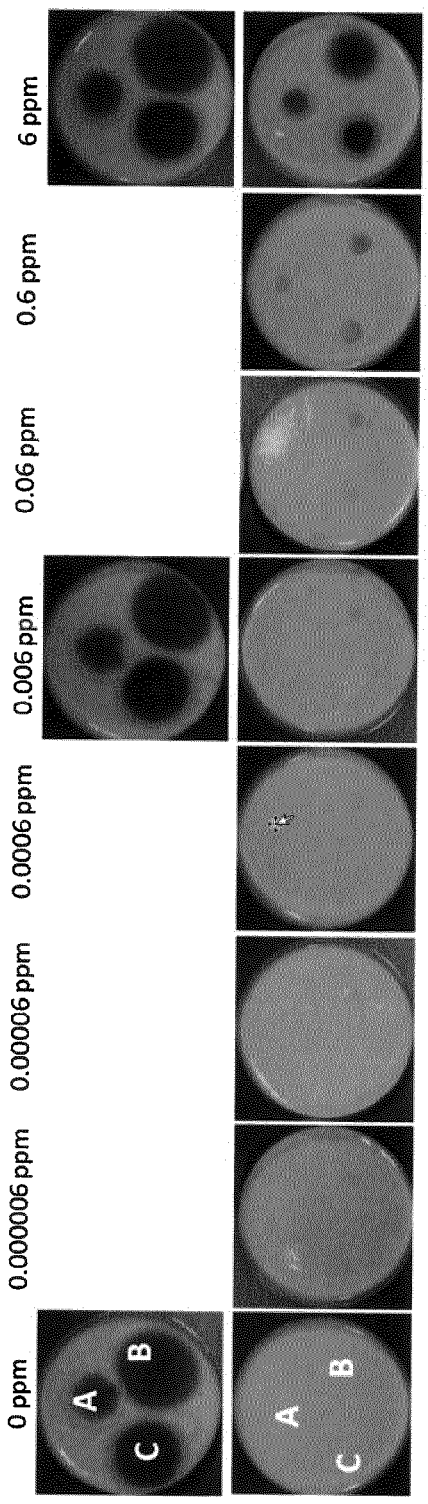
FIG. 7 shows the growth of 3 different molds on plates prepared from milk fermented with starter culture alone (reference, top row) or together with manganese scavenger (bottom row). Different manganese concentrations were added as indicated above the pictures. Three target contaminants (A: *Penicillium brevicompactum*, B: *Penicillium crustosum* and C: *Penicillium solitum*) were added in concentrations of 500 spores/spot. The plates were incubated at 7±1° C. for 25 days.

Challenge Test Using Mold:

FIG. 7 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium brevicompactum*, B: *Penicillium crustosum* and C: *Penicillium solitum*) were added in concentrations of 500 spores/spot. The plates were incubated at 7±1° C. for 25 days.

Figure 8:
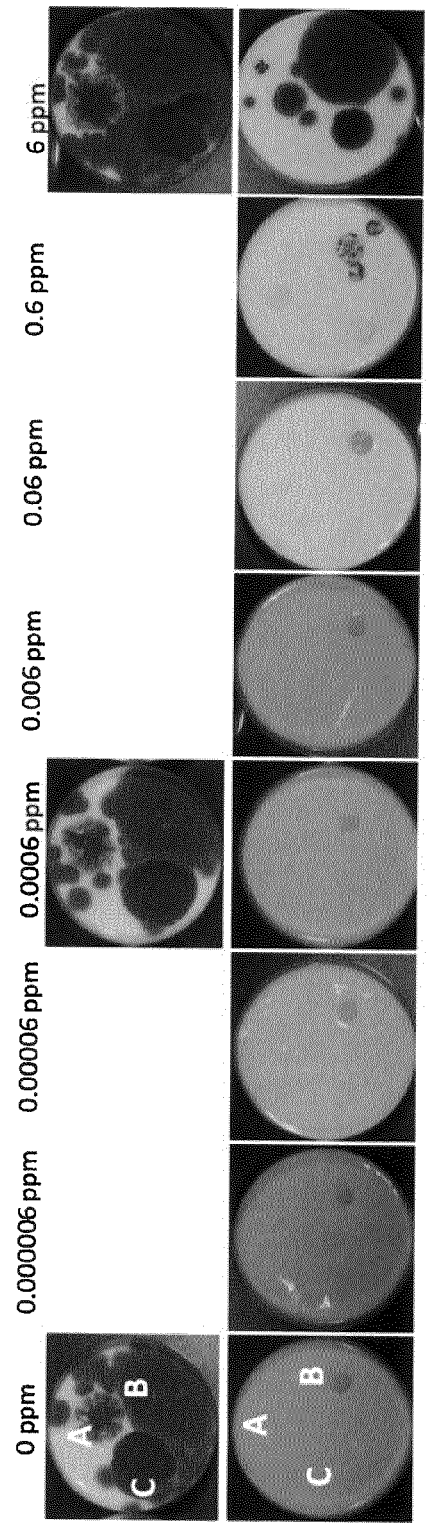
FIG. 8 shows the growth of 3 different molds on plates prepared from milk fermented with starter culture alone (reference, top row) or together with manganese scavenger (bottom row). Different manganese concentrations were added as indicated above the pictures. Three target contaminants (A: *Penicillium brevicompactum*, B: *Penicillium crustosum* and C: *Penicillium solitum*) were added in concentrations of 500 spores/spot. The plates were incubated at 22±1° C. for 8 days.

FIG. 8 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium brevicompactum*, B: *Penicillium crustosum* and C: *Penicillium solitum*) were added in concentrations of 500 spores/spot. The plates were incubated at 22±1° C. for 8 days.

Figure 9:
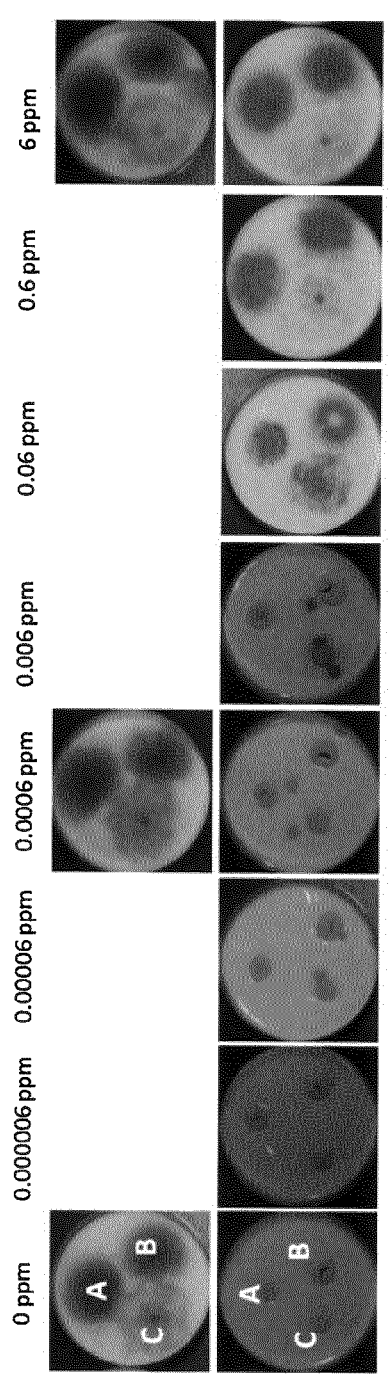
FIG. 9 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium carneum*, B: *Penicillium paneum* and C: *Penicillium roqueforti*) were added in concentrations of 500 spores/spot. The plates were incubated at 7±1° C. for 25 days.

FIG. 9 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium carneum*, B: *Penicillium paneum* and C: *Penicillium roqueforti*) were added in concentrations of 500 spores/spot. The plates were incubated at 7±1° C. for 25 days.

Figure 10:
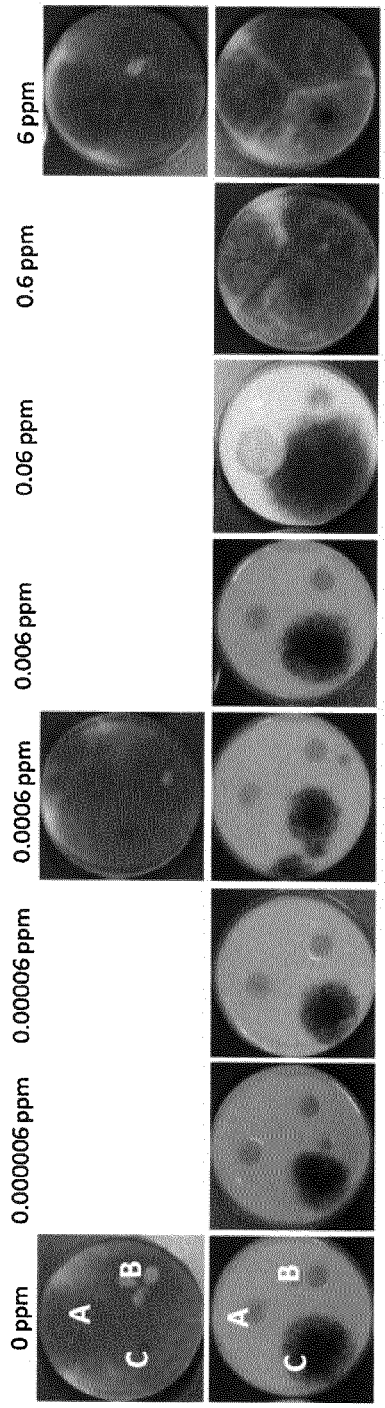
FIG. 10 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium carneum*, B: *Penicillium paneum* and C: *Penicillium roqueforti*) were added in concentrations of 500 spores/spot. The plates were incubated at 22±1° C. for 8 days.

FIG. 10 shows the growth of 3 different molds on plates prepared from milk fermented with starter culture alone (reference, top row) or additionally with manganese scavenger (bottom row). Different manganese concentrations were further added as indicated above the pictures. Three target contaminants (A: *Penicillium carneum*, B: *Penicillium paneum* and C: *Penicillium roqueforti*) were added in concentrations of 500 spores/spot. The plates were incubated at 22±1° C. for 8 days.

All the tested molds grew very well on the agar plates made from milk fermented only with the starter culture (reference). However, when manganese scavengers were present during milk fermentation, the outgrowth of all the molds tested was inhibited delayed. The inhibitory effect is stronger at lower temperature (FIGS. 7 and 9).

The manganese scavenger kept the high inhibitory activity towards all molds at additional manganese levels up to 0.006 ppm. At manganese levels from 0.06 ppm and above the inhibitory activity of manganese scavengers was decreased. Manganese scavengers lost most of the inhibitory activity at 6 ppm towards the sensitive molds (FIGS. 7 and 8) and at 0.06 ppm towards the robust molds (FIGS. 9 and 10).

The higher concentration of manganese added which diminishes the inhibitory effect found in this assay compared to the concentrations found in the aqueous phase is due to the continuous uptake by the living and metabolically active manganese scavenger in the fermented milk product.

Example 8 Inhibition of *Debaromyces hansenii* in Aqueous Phase and in Different Concentrations of a Chemical Chelating Material Two concentrations of manganese were used, 6 ppm and 0.6 ppm, in example 8. The concentration of 6 ppm has shown to have an inhibitory/toxic effect on yeast growth, while 0.6 ppm was used as a standard concentration, which is enough to repeal the manganese deficiency caused by the one or more bacteria strains acting as manganese scavengers.

Figure 12:
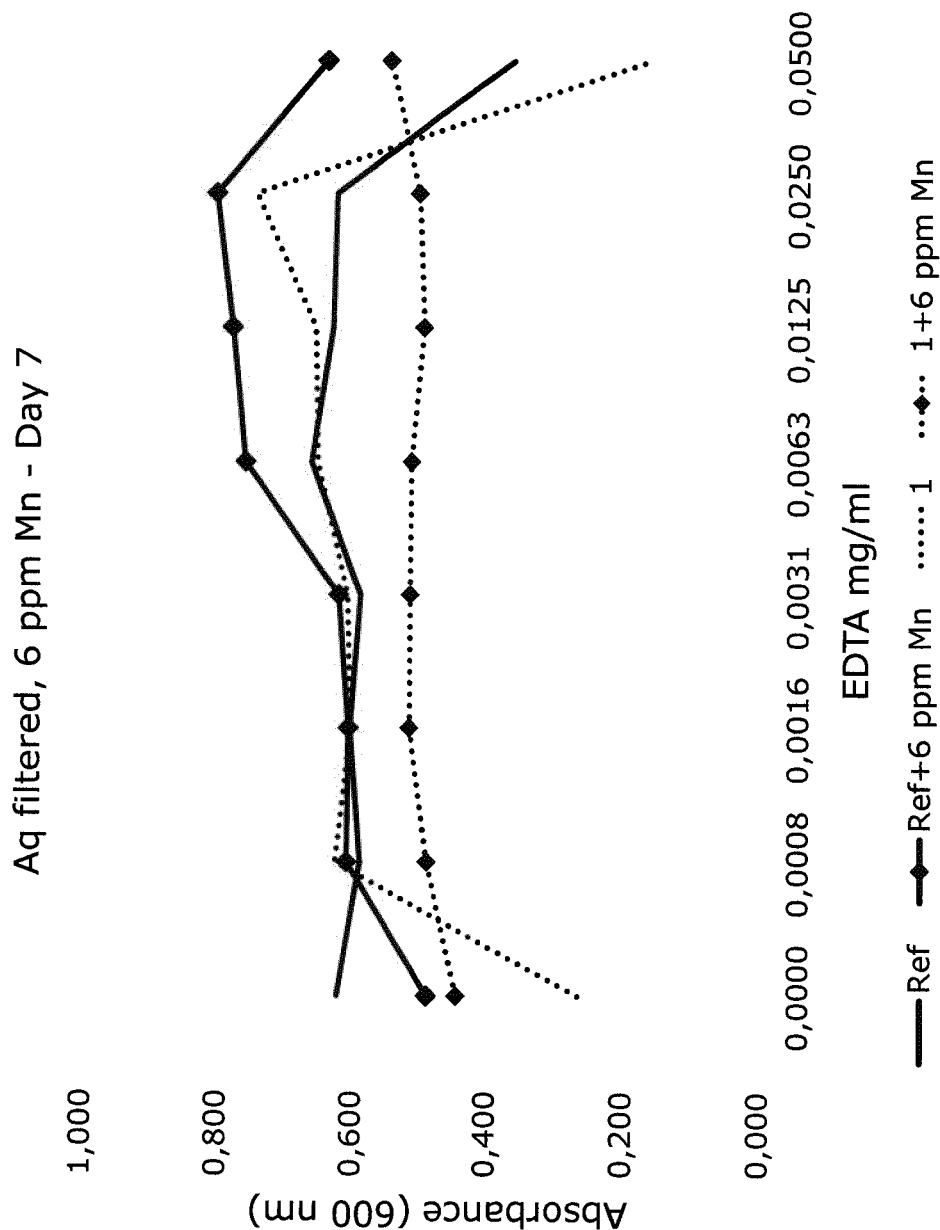
FIG. 12 shows the growth of a *Debaryomyces hansenii* strain (strain 1 or strain 2) in an aqueous phase filtered with a 1.2 µm filter (aq filtered), preferably an aqueous phase of fermented milk, with different EDTA concentrations, with and without other manganese scavengers, preferably manganese scavenger 1, and with and without 6 ppm of manganese. Absorbance at 600 nm was measured after 7 days of incubation at 17° C., compared to reference. Samples made in triplicate.
Figure 13:
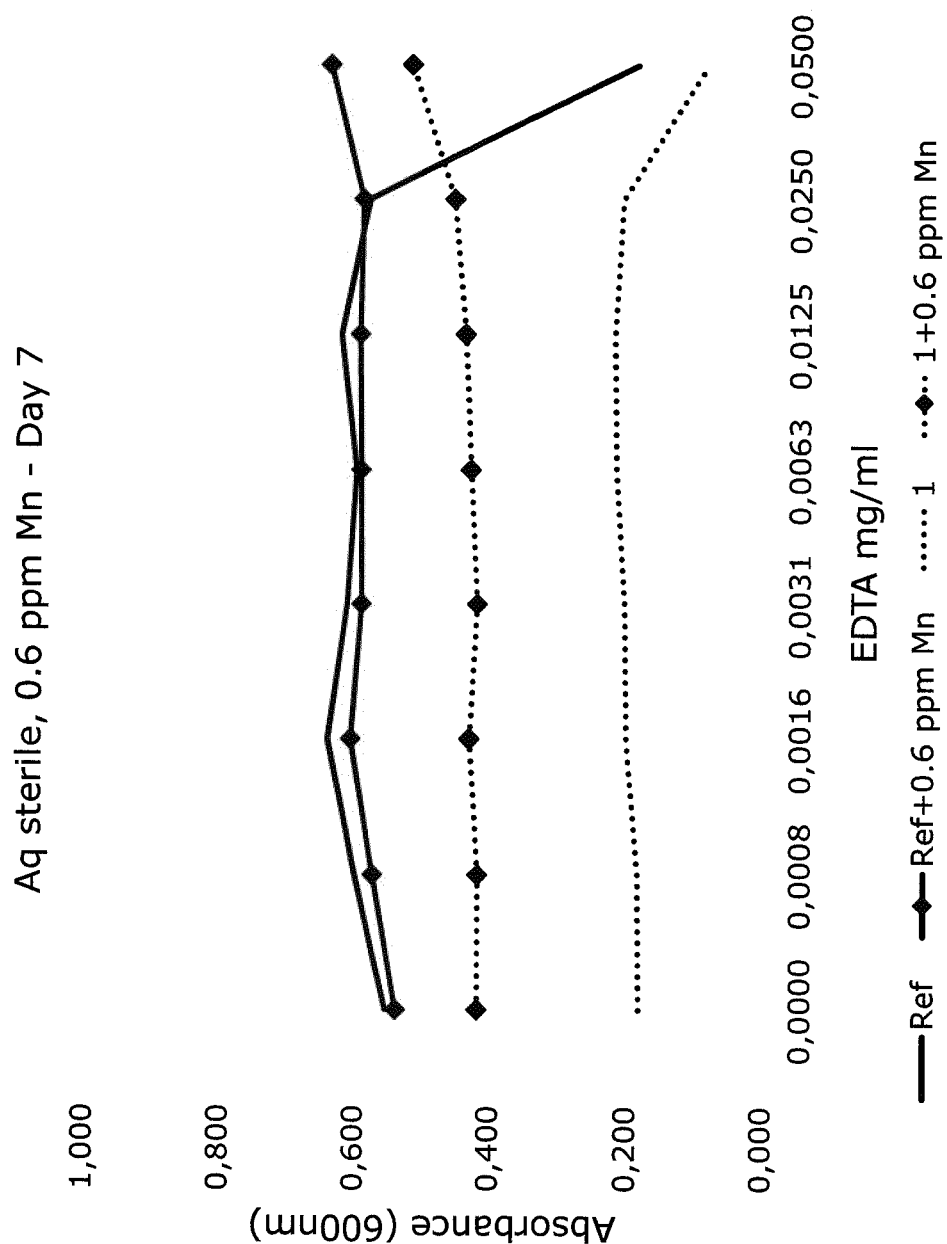
FIG. 13 shows the growth of a *Debaryomyces hansenii* strain (strain 1 or strain 2) in an aqueous phase filtered with a 0.2 µm filter (aq sterile), preferably an aqueous phase of fermented milk, with different EDTA concentrations, with and without other manganese scavengers, preferably manganese scavenger 1, and with and without 0.6 ppm of manganese. Absorbance at 600 nm was measured after 7 days of incubation at 17° C., compared to reference. Samples made in triplicate.

FIGS. 12 and 13 show that a chemical chelating material, such as EDTA, has an inhibitory effect on *Debaromyces hansenii* growth, in aqueous phase.

FIG. 12 shows that *Debaromyces hansenii* cells stop growing when faced with a concentration of 0.05 mg/ml of EDTA. Thus, EDTA shows an inhibitory effect at a concentration of 0.05 mg/ml.

FIG. 13 shows that a concentration of 0.05 mg/ml EDTA and in the absence of manganese (0.6 ppm) *Debaromyces hansenii* stop growing; thus, EDTA has an inhibitory effect on *Debaromyces hansenii* under these conditions. The addition of 0.6 ppm of manganese and 0.05 mg/ml EDTA restores the growth of *Debaromyces hansenii* and the effect of EDTA is repealed by the excess of manganese.

Example 9 Inhibition of *Debaryomyces hansenii* in Yogurt

In yogurt, it was possible to reproduce the inhibition of the manganese scavengers selected from one or more bacteria strains (scavenging agent 1) by adding up to 0.89 mg/ml EDTA, a manganese scavenger, to the yogurt. At said concentration, the reference yogurt showed inhibition similar to one observed when manganese scavenging agent 1 is added. The negative controls in bottom row of FIG. 14 (no EDTA added) show normal inhibition in the presence of manganese scavenger 1 and restored yeast growth with added manganese.

Figure 14:
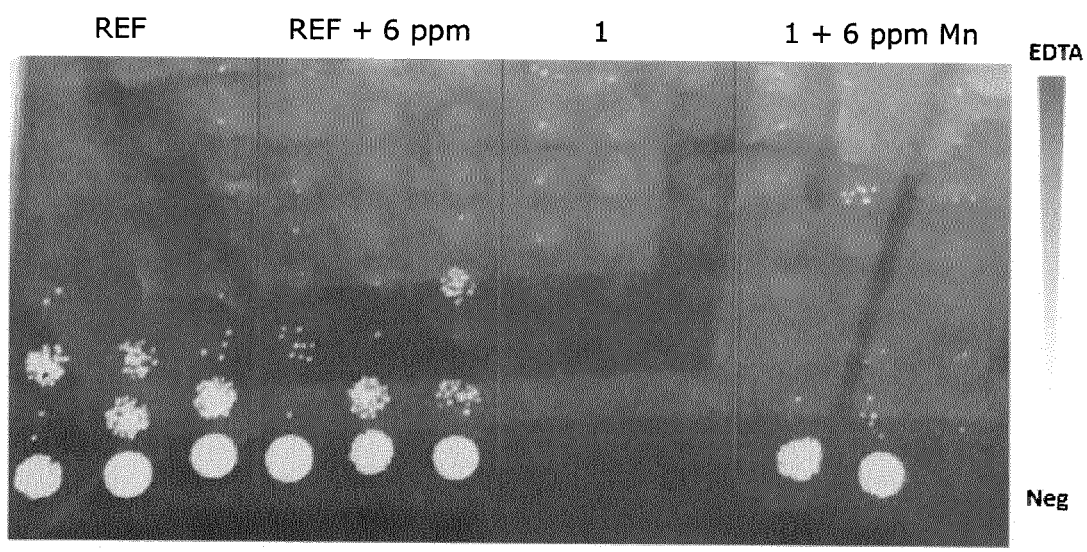
FIG. 14 shows the growth of a *Debaryomyces hansenii* strain (strain 1 or strain 2) in yogurt with and without different manganese scavengers, such as bacteria, preferably lactic acid bacteria, and/or a chemical chelating material such as EDTA, after addition of 6 ppm of manganese. The concentration of EDTA ranges from 14 mg/ml (top row), 7.10 mg/ml, 3.55 mg/ml, 1.78 mg/ml, 0.89 mg/ml, 0.44 mg/ml, 0.22 mg/ml to 0 mg/ml (bottom row).

Example 9 shows that a chemical chelating material, such as EDTA, has the same effect as manganese scavengers selected from one or more bacteria herein disclosed (FIG. 14). Hence, example 9 demonstrates that EDTA has the same effect as the one or more bacteria strains herein disclosed as manganese scavengers.

Manganese scavengers, either a chemical chelating material and/or a biological material, such as one or more bacteria strains, when present in a given product, such as a food product, lead to manganese depletion for the spoilage fungi, thereby inhibiting fungi growth.

The invention claimed is:

1. A method of inhibiting or delaying growth of fungi in a fermented milk product, comprising the step of reducing free manganese in the product to a concentration of below about 0.01 ppm in the product, wherein the step of reducing free manganese in the product comprises adding to the product, in an amount effective to reduce free manganese in the product to a concentration below about 0.01 ppm in the product, one or more manganese scavenging agents selected from bacteria strains that comprise a manganese transporter gene and exhibit manganese uptake activity and chemical chelating materials, thereby inhibiting or delaying growth of fungi in the fermented milk product via reduction of free manganese in the product to a concentration below about 0.01 ppm in the product.

2. The method according to claim 1, further comprising the step of measuring the concentration of the free manganese in the product.

3. The method according to claim 1, wherein the fungi is yeast or mold.

4. The method according to claim 1, wherein the fungi is a yeast selected from the group consisting of Torulaspora spp., *Cryptococcus* spp., *Saccharomyces* spp., *Yarrowia* spp., Debaryomyces spp., *Candida* spp. and Rhodoturola spp., or a mold selected from the group consisting of *Aspergillus* spp., *Cladosporium* spp., *Didymella* spp. and *Penicillium* spp.

5. The method according to claim 1, wherein the product is a thermophilic or mesophilic fermented milk product.

6. The method according to claim 1, wherein the free manganese in the product is reduced to a concentration of below about 0.005 ppm.

7. The method according to claim 1, wherein the step of reducing free manganese in the product comprises subjecting the product to ion-exchange chromatography.

8. The method according to claim 1, wherein the one or more manganese scavenging agents comprises a chemical chelating material selected from the group consisting of ethylenediaminetetraacetic acid, ethylene glycol-bis(β-aminoethyl ether)-N,N,N',N'-tetraacetic acid, diaminocyclohexanetetraacetic acid, nitrilotriacetic acid, 1,2-bis(o-aminophenoxy)ethane-N,N,N',N'-tetraacetic acid, and diethylenetriaminepentaacetic acid.

9. The method according to claim 1, further comprising the step of selecting one or more bacteria strains as the manganese scavenging agent, wherein the one or more manganese scavenging agents comprises the selected strain(s).

10. The method according to claim 9, wherein the selecting step comprises determining that the one or more bacteria strains comprises a manganese transporter having at least 55% sequence identity with the sequence of any one of SEQ ID NO: 1-3.

11. The method according to claim 9, wherein the selecting step comprises determining that the one or more bacteria strains is free of a superoxide dismutase.

12. The method according to claim 9, wherein the selecting step comprises measuring a manganese uptake activity of the one or more bacteria strains.

13. The method according to claim 1, wherein the step of reducing free manganese comprises adding as a manganese scavenging agent one or more lactic acid bacteria strains selected from the group consisting of *Lactobacillus plantarum, Lactobacillus fermentum, Lactobacillus reuteri, Lactobacillus sakei, Lactobacillus brevis, Lactobacillus casei, Lactobacillus paracasei, Lactobacillus salivarius, Lactobacillus alimentarius, Pediococcus acidilactici, Lactobacillus rhamnosus* and *Lactobacillus kefiri*.

14. The method according to claim 13, wherein the one or more lactic acid bacteria strains comprises a manganese transporter having at least 55% sequence identity with the sequence of any one of SEQ ID NO: 1-3.

15. The method according to claim 13, wherein the one or more lactic acid bacteria strains is free of a superoxide dismutase.

16. The method according to claim 13, wherein the one or more lactic acid bacteria strains is free of a manganese superoxide dismutase.

17. The method according to claim 1, wherein the step of reducing free manganese comprises adding ethylenediaminetetraacetic acid as chemical chelating material.

18. The method according to claim 9, wherein the selecting step comprises determining that the one or more bacteria strains is free of a manganese superoxide dismutase.

* * * * *

SEQUENCE LISTING

```
<160> NUMBER OF SEQ ID NOS: 25

<210> SEQ ID NO 1
<211> LENGTH: 458
<212> TYPE: PRT
<213> ORGANISM: Lactobacillus

<400> SEQUENCE: 1

Met Ala Ser Glu Asp Lys Lys Ser Lys Arg Glu His Ile Ile His Phe
1               5                   10                  15

Glu Asp Thr Pro Ser Lys Ser Leu Asp Glu Val Asn Gly Ser Val Glu
            20                  25                  30

Val Pro His Asn Ala Gly Phe Trp Lys Thr Leu Ala Ala Tyr Thr Gly
        35                  40                  45

Pro Gly Ile Leu Val Ala Val Gly Tyr Met Asp Pro Gly Asn Trp Ile
    50                  55                  60

Thr Ser Ile Ala Gly Gly Ala Ser Phe Lys Tyr Ser Leu Leu Ser Val
65                  70                  75                  80

Ile Leu Ile Ser Ser Leu Ile Ala Met Leu Leu Gln Ala Met Ala Ala
                85                  90                  95

Arg Leu Gly Ile Val Thr Gly Arg Asp Leu Ala Gln Met Thr Arg Asp
            100                 105                 110

His Thr Ser Lys Ala Met Gly Gly Phe Leu Trp Val Ile Thr Glu Leu
        115                 120                 125

Ala Ile Met Ala Thr Asp Ile Ala Glu Ile Ile Gly Ser Ala Ile Ala
    130                 135                 140

Leu Lys Leu Leu Phe Asn Met Pro Leu Ile Val Gly Ile Ile Ile Thr
145                 150                 155                 160

Thr Ala Asp Val Leu Ile Leu Leu Leu Met Arg Leu Gly Phe Arg
                165                 170                 175

Lys Ile Glu Ala Val Val Ala Thr Leu Val Leu Val Ile Leu Leu Val
```

```
            180                 185                 190
Phe Ala Tyr Glu Val Ile Leu Ala Gln Pro Asn Val Pro Glu Leu Leu
            195                 200                 205

Lys Gly Tyr Leu Pro His Ala Asp Ile Val Thr Asn Lys Ser Met Leu
        210                 215                 220

Tyr Leu Ser Leu Gly Ile Val Gly Ala Thr Val Met Pro His Asp Leu
225                 230                 235                 240

Phe Leu Gly Ser Ser Ile Ser Gln Thr Arg Lys Ile Asp Arg Thr Lys
                245                 250                 255

His Glu Glu Val Lys Lys Ala Ile Lys Phe Ser Thr Ile Asp Ser Asn
            260                 265                 270

Leu Gln Leu Thr Met Ala Phe Ile Val Asn Ser Leu Leu Ile Leu
        275                 280                 285

Gly Ala Ala Leu Phe Phe Gly Thr Ser Ser Val Gly Arg Phe Val
    290                 295                 300

Asp Leu Phe Asn Ala Leu Ser Asn Ser Gln Ile Val Gly Ala Ile Ala
305                 310                 315                 320

Ser Pro Met Leu Ser Met Leu Phe Ala Val Ala Leu Leu Ala Ser Gly
                325                 330                 335

Gln Ser Ser Thr Ile Thr Gly Thr Leu Ala Gly Gln Ile Ile Met Glu
            340                 345                 350

Gly Phe Ile His Leu Lys Met Pro Leu Trp Ala Gln Arg Leu Leu Thr
        355                 360                 365

Arg Leu Met Ser Val Thr Pro Val Leu Ile Phe Ala Ile Tyr Tyr His
    370                 375                 380

Gly Asn Glu Ala Lys Ile Glu Asn Leu Leu Thr Phe Ser Gln Val Phe
385                 390                 395                 400

Leu Ser Ile Ala Leu Pro Phe Ala Val Ile Pro Leu Val Leu Tyr Thr
                405                 410                 415

Ser Asp Lys Lys Ile Met Gly Glu Phe Ala Asn Arg Ala Trp Val Lys
            420                 425                 430

Trp Thr Ala Trp Phe Ile Ser Gly Val Leu Ile Ile Leu Asn Leu Tyr
        435                 440                 445

Leu Ile Ala Gln Thr Leu Gly Phe Val Lys
    450                 455

<210> SEQ ID NO 2
<211> LENGTH: 450
<212> TYPE: PRT
<213> ORGANISM: Lactobacillus

<400> SEQUENCE: 2

Met Ala Arg Pro Asp Glu Arg Leu Thr Val Gln Arg Glu Lys Arg Ser
1               5                   10                  15

Leu Asp Asp Ile Asn Arg Ser Val Gln Val Pro Ser Val Tyr Glu Ser
            20                  25                  30

Ser Phe Phe Gln Lys Phe Leu Ala Tyr Ser Gly Pro Gly Ala Leu Val
        35                  40                  45

Ala Val Gly Tyr Met Asp Pro Gly Asn Trp Leu Thr Ala Leu Glu Gly
    50                  55                  60

Gly Ser Arg Tyr His Tyr Ala Leu Leu Ser Val Leu Leu Met Ser Ile
65                  70                  75                  80

Leu Val Ala Met Phe Met Gln Thr Leu Ala Ile Lys Leu Gly Val Val
                85                  90                  95
```

```
Ala Arg Leu Asp Leu Ala Gln Ala Ile Ala Ala Phe Ile Pro Asn Trp
            100                 105                 110

Ser Arg Ile Cys Leu Trp Leu Ile Asn Glu Ala Ala Met Met Ala Thr
            115                 120                 125

Asp Met Thr Gly Val Val Gly Thr Ala Ile Ala Leu Lys Leu Leu Phe
        130                 135                 140

Gly Leu Pro Leu Met Trp Gly Met Leu Leu Thr Ile Ala Asp Val Leu
145                 150                 155                 160

Val Val Leu Leu Phe Leu Arg Phe Gly Ile Arg Ile Glu Leu Ile
                165                 170                 175

Val Leu Val Ser Ile Leu Thr Val Gly Ile Ile Phe Gly Ile Glu Val
            180                 185                 190

Ala Arg Ala Asp Pro Ser Ile Gly Gly Ile Ala Gly Gly Phe Val Pro
        195                 200                 205

His Thr Asp Ile Leu Thr Asn His Gly Met Leu Leu Leu Ser Leu Gly
        210                 215                 220

Ile Met Gly Ala Thr Ile Met Pro His Asn Ile Tyr Leu His Ser Ser
225                 230                 235                 240

Leu Ala Gln Ser Arg Lys Tyr Asp Glu His Ile Pro Ala Gln Val Thr
                245                 250                 255

Glu Ala Leu Arg Phe Gly Lys Trp Asp Ser Asn Val His Leu Val Ala
            260                 265                 270

Ala Phe Leu Ile Asn Ala Leu Leu Leu Ile Leu Gly Ala Ala Leu Phe
        275                 280                 285

Tyr Gly Val Gly His Val Thr Ala Phe Gln Gly Ala Tyr Asn Gly
        290                 295                 300

Leu Lys Asn Pro Met Ile Val Gly Gly Leu Ala Ser Pro Leu Met Ser
305                 310                 315                 320

Thr Leu Phe Ala Phe Ala Leu Leu Ile Thr Gly Leu Ile Ser Ser Ile
                325                 330                 335

Ala Ser Thr Leu Ala Gly Gln Ile Val Met Glu Gly Tyr Leu Asn Ile
            340                 345                 350

Arg Met Pro Leu Trp Glu Arg Arg Leu Leu Thr Arg Leu Val Thr Leu
        355                 360                 365

Ile Pro Ile Met Val Ile Gly Phe Met Ile Gly Phe Ser Glu His Asn
        370                 375                 380

Phe Glu Gln Val Ile Val Tyr Ala Gln Val Ser Leu Ser Ile Ala Leu
385                 390                 395                 400

Pro Phe Thr Leu Phe Pro Leu Val Ala Leu Thr Asn Arg Arg Asp Leu
                405                 410                 415

Met Gly Ile His Val Asn Ser Gln Leu Val Arg Trp Val Gly Tyr Phe
            420                 425                 430

Leu Thr Gly Val Ile Thr Val Leu Asn Ile Gln Leu Ala Ile Ser Val
        435                 440                 445

Phe Val
    450

<210> SEQ ID NO 3
<211> LENGTH: 535
<212> TYPE: PRT
<213> ORGANISM: Lactobacillus

<400> SEQUENCE: 3

Met Ser Asp Asp His Lys Lys Arg His Pro Ile Lys Leu Ile Gln Tyr
1               5                   10                  15
```

-continued

```
Ala Asn Gly Pro Ser Leu Glu Glu Ile Asn Gly Thr Val Glu Val Pro
                20                  25                  30

His Gly Lys Gly Phe Trp Arg Thr Leu Phe Ala Tyr Ser Gly Pro Gly
             35                  40                  45

Ala Leu Val Ala Val Gly Tyr Met Asp Pro Gly Asn Trp Ser Thr Ser
 50                  55                  60

Ile Thr Gly Gly Gln Asn Phe Gln Tyr Leu Leu Ile Ser Val Ile Leu
 65                  70                  75                  80

Met Ser Ser Leu Ile Ala Met Leu Leu Gln Tyr Met Ala Ala Lys Leu
                 85                  90                  95

Gly Ile Val Ser Gln Met Asp Leu Ala Gln Ala Ile Arg Ala Arg Thr
                100                 105                 110

Ser Lys Lys Leu Gly Ile Val Leu Trp Ile Leu Thr Glu Leu Ala Ile
             115                 120                 125

Met Ala Thr Asp Ile Ala Glu Val Ile Gly Ala Ala Ile Ala Leu Tyr
130                 135                 140

Leu Leu Phe His Ile Pro Leu Val Ile Ala Val Leu Val Thr Val Leu
145                 150                 155                 160

Asp Val Leu Val Leu Leu Leu Thr Lys Ile Gly Phe Arg Lys Ile
                165                 170                 175

Glu Ala Ile Val Val Ala Leu Ile Leu Val Ile Leu Leu Val Phe Val
                180                 185                 190

Tyr Gln Val Ala Leu Ser Asp Pro Asn Met Gly Ala Leu Leu Lys Gly
             195                 200                 205

Phe Ile Pro Thr Gly Glu Thr Phe Ala Ser Ser Pro Ser Ile Asn Gly
210                 215                 220

Met Ser Pro Ile Gln Gly Ala Leu Gly Ile Ile Gly Ala Thr Val Met
225                 230                 235                 240

Pro His Asn Leu Tyr Leu His Ser Ala Ile Ser Gln Thr Arg Lys Ile
                245                 250                 255

Asp Tyr Lys Asn Pro Asp Asp Val Ala Gln Ala Val Lys Phe Ser Ala
             260                 265                 270

Trp Asp Ser Asn Ile Gln Leu Ser Phe Ala Phe Val Val Asn Cys Leu
             275                 280                 285

Leu Leu Val Met Gly Val Ala Val Phe Lys Ser Gly Ala Val Lys Asp
290                 295                 300

Pro Ser Phe Phe Gly Leu Phe Gln Ala Leu Ser Asp Ser Ser Thr Leu
305                 310                 315                 320

Ser Asn Gly Val Leu Ile Ala Val Ala Lys Ser Gly Ile Leu Ser Ile
                325                 330                 335

Leu Phe Ala Val Ala Leu Leu Ala Ser Gly Gln Asn Ser Thr Ile Thr
                340                 345                 350

Gly Thr Leu Thr Gly Gln Val Ile Met Glu Gly Phe Val His Met Lys
             355                 360                 365

Met Pro Leu Trp Ala Arg Arg Leu Val Thr Arg Ile Ile Ser Val Ile
370                 375                 380

Pro Val Ile Val Cys Val Met Leu Thr Ala Arg Asp Thr Pro Ile Gln
385                 390                 395                 400

Gln His Glu Ala Leu Asn Thr Leu Met Asn Asn Ser Gln Val Phe Leu
                405                 410                 415

Ala Phe Ala Leu Pro Phe Ser Met Leu Pro Leu Leu Met Phe Thr Asn
             420                 425                 430
```

```
Ser Lys Val Glu Met Gly Asp Arg Phe Lys Asn Thr Gly Trp Val Lys
            435                 440                 445

Val Leu Gly Trp Ile Ser Val Leu Gly Leu Thr Gly Leu Asn Leu Lys
        450                 455                 460

Gly Leu Pro Asp Ser Ile Ala Gly Phe Phe Gly Asp His Pro Thr Ala
465                 470                 475                 480

Thr Gln Thr Asn Met Ala Asn Ile Ile Ala Ile Val Leu Ile Val Ala
                485                 490                 495

Ile Leu Ala Leu Leu Ala Trp Thr Ile Trp Asp Leu Tyr Lys Gly Asn
            500                 505                 510

Gln Arg Tyr Glu Ala His Leu Ala Ala Val Ala Asp Glu Lys Glu Ala
        515                 520                 525

Lys Ala Asp Val Asp Glu Gln
        530                 535

<210> SEQ ID NO 4
<211> LENGTH: 458
<212> TYPE: PRT
<213> ORGANISM: Lactobacillus casei

<400> SEQUENCE: 4

Met Ala Ser Glu Asp Lys Lys Ser Lys Arg Glu His Ile Ile His Phe
1               5                   10                  15

Glu Asp Thr Pro Ser Lys Ser Leu Asp Glu Val Asn Gly Ser Val Glu
            20                  25                  30

Val Pro His Asn Ala Gly Phe Trp Lys Thr Leu Ala Ala Tyr Thr Val
        35                  40                  45

Pro Gly Ile Leu Val Ala Val Gly Tyr Met Asp Pro Gly Asn Trp Ile
    50                  55                  60

Thr Ser Ile Ala Gly Gly Ala Ser Phe Lys Tyr Ser Leu Leu Ser Val
65                  70                  75                  80

Ile Leu Ile Ser Ser Leu Ile Ala Met Leu Gln Ala Met Ala Ala
                85                  90                  95

Arg Leu Gly Ile Val Thr Gly Arg Asp Leu Ala Gln Met Thr Arg Asp
            100                 105                 110

His Thr Ser Lys Ala Met Gly Gly Phe Leu Trp Val Ile Thr Glu Leu
        115                 120                 125

Ala Ile Met Ala Thr Asp Ile Ala Glu Ile Ile Gly Ser Ala Ile Ala
    130                 135                 140

Leu Lys Leu Leu Phe Asn Met Pro Leu Ile Val Gly Ile Ile Ile Thr
145                 150                 155                 160

Thr Ala Asp Val Leu Ile Leu Leu Leu Met Arg Leu Gly Phe Arg
                165                 170                 175

Lys Ile Glu Ala Val Val Ala Thr Leu Val Leu Val Ile Leu Leu Val
            180                 185                 190

Phe Ala Tyr Glu Val Ile Leu Ala Gln Pro Asn Val Pro Glu Leu Leu
        195                 200                 205

Lys Gly Tyr Leu Pro His Ala Asp Ile Val Thr Asn Lys Ser Met Leu
    210                 215                 220

Tyr Leu Ser Leu Gly Ile Val Gly Ala Thr Val Met Pro His Asp Leu
225                 230                 235                 240

Phe Leu Gly Ser Ser Ile Ser Gln Thr Arg Lys Ile Asp Arg Thr Lys
                245                 250                 255

His Glu Glu Val Lys Lys Ala Ile Lys Phe Ser Thr Ile Asp Ser Asn
            260                 265                 270
```

```
Leu Gln Leu Thr Met Ala Phe Ile Val Asn Ser Leu Leu Ile Leu
        275                 280                 285
Gly Ala Ala Leu Phe Phe Gly Thr Ser Ser Ser Val Gly Arg Phe Val
290                 295                 300
Asp Leu Phe Asn Ala Leu Ser Asn Ser Gln Ile Val Gly Ala Ile Ala
305                 310                 315                 320
Ser Pro Met Leu Ser Met Leu Phe Ala Val Ala Leu Leu Ala Ser Gly
                325                 330                 335
Gln Ser Ser Thr Ile Thr Gly Thr Leu Ala Gly Gln Ile Ile Met Glu
                340                 345                 350
Gly Phe Ile His Leu Lys Met Pro Leu Trp Ala Gln Arg Leu Leu Thr
                355                 360                 365
Arg Leu Met Ser Val Thr Pro Val Leu Ile Phe Ala Ile Tyr Tyr His
        370                 375                 380
Gly Asn Glu Ala Lys Ile Glu Asn Leu Leu Thr Phe Ser Gln Val Phe
385                 390                 395                 400
Leu Ser Ile Ala Leu Pro Phe Ala Val Ile Pro Leu Val Leu Tyr Thr
                405                 410                 415
Ser Asp Lys Lys Ile Met Gly Glu Phe Ala Asn Arg Ala Trp Val Lys
                420                 425                 430
Trp Thr Ala Trp Phe Ile Ser Gly Val Leu Ile Leu Asn Leu Tyr
        435                 440                 445
Leu Ile Ala Gln Thr Leu Gly Phe Val Lys
450                 455

<210> SEQ ID NO 5
<211> LENGTH: 459
<212> TYPE: PRT
<213> ORGANISM: Lactobacillus brevis

<400> SEQUENCE: 5

Met Lys Asn His Glu Thr Asp Thr Lys Thr Lys His His Met Ile Glu
1               5                   10                  15
Ser Thr Gly Ser Gly Gln Lys Ser Leu Asp Glu Val Asn Gly Thr Val
                20                  25                  30
Glu Val Pro Gln Asn Ala Gly Phe Trp Arg Thr Leu Met Ala Tyr Thr
            35                  40                  45
Gly Pro Gly Ala Leu Ile Ala Val Gly Tyr Met Asp Pro Gly Asn Trp
        50                  55                  60
Ile Thr Ser Ile Ala Gly Gly Ala Gln Tyr Lys Tyr Thr Leu Leu Thr
65                  70                  75                  80
Val Val Leu Leu Ser Ser Leu Val Ala Met Leu Leu Gln Ala Met Ser
                85                  90                  95
Ala Arg Leu Gly Ile Val Thr Gly Lys Asp Leu Ala Gln Leu Thr Arg
                100                 105                 110
Glu His Thr Gly Lys Arg Thr Gly Phe Ala Leu Trp Ile Ile Thr Glu
            115                 120                 125
Leu Ala Ile Met Ala Thr Asp Ile Ala Glu Ile Ile Gly Ser Ala Ile
        130                 135                 140
Ala Leu Lys Leu Leu Phe Gly Phe Pro Leu Ile Val Gly Ile Ile Ile
145                 150                 155                 160
Thr Ala Met Asp Val Leu Val Leu Leu Val Met Lys Leu Gly Phe
                165                 170                 175
Arg Lys Ile Glu Ala Ile Val Ala Thr Leu Val Ala Val Ile Leu Phe
```

```
                180                 185                 190
Val Phe Leu Tyr Glu Val Ile Leu Ala Gln Pro His Met Gly Glu Val
            195                 200                 205

Leu Lys Gly Tyr Leu Pro Ser Ser Thr Val Thr Asn His Gly Met
        210                 215                 220

Leu Tyr Leu Ser Leu Gly Ile Val Gly Ala Thr Val Met Pro His Asp
225                 230                 235                 240

Leu Tyr Leu Gly Ser Ser Ile Ser Gln Thr Arg Ser Phe Asp Arg Lys
                245                 250                 255

Asn Arg Lys Ser Val Ala Gln Ala Ile Lys Phe Thr Thr Ile Asp Ser
            260                 265                 270

Asn Ile Gln Leu Thr Leu Ala Phe Val Val Asn Ser Leu Leu Leu Ile
        275                 280                 285

Leu Gly Ala Ala Leu Phe Phe Gly Thr Asn Ser Asp Leu Gly Arg Phe
        290                 295                 300

Val Asp Leu Phe Asn Ala Leu Ser Asp Ser Gln Ile Val Gly Ala Ile
305                 310                 315                 320

Ala Ser Pro Met Leu Ser Met Leu Phe Ala Leu Ala Leu Leu Ser Ser
                325                 330                 335

Gly Gln Ser Ser Thr Ile Thr Gly Thr Leu Ala Gly Gln Ile Ile Met
            340                 345                 350

Glu Gly Phe Ile Asn Leu Lys Met Pro Leu Trp Ala Gln Arg Leu Ile
        355                 360                 365

Thr Arg Leu Leu Ser Val Thr Pro Val Ile Ile Phe Ala Ile Ile Tyr
        370                 375                 380

His Gly Asn Glu Ala Lys Ile Glu Asp Leu Leu Thr Phe Ser Gln Val
385                 390                 395                 400

Phe Leu Ser Ile Ala Leu Pro Phe Ala Met Ile Pro Leu Val Ile Phe
                405                 410                 415

Thr Ser Ser Lys Lys Leu Met Gly Glu Phe Ala Asn Arg Thr Trp Ser
            420                 425                 430

Lys Ile Leu Gly Trp Ile Ile Ala Val Ile Leu Ile Ile Leu Asn Ile
        435                 440                 445

Tyr Leu Ile Leu Asn Thr Leu His Ile Val Gln
        450                 455

<210> SEQ ID NO 6
<211> LENGTH: 447
<212> TYPE: PRT
<213> ORGANISM: Pediococcus acidilactici

<400> SEQUENCE: 6

Met Ser Lys Lys Leu Asp Glu Val Asp Asn Lys Ser Leu Asp Glu Ile
1               5                   10                  15

Asn Gly Ser Ile Lys Val Pro Lys Asn Ala Gly Phe Phe Lys Thr Leu
            20                  25                  30

Met Ala Tyr Thr Gly Pro Gly Ile Leu Ile Ala Val Gly Tyr Met Asp
        35                  40                  45

Pro Gly Asn Trp Ile Thr Ser Ile Ala Gly Gly Ala Gln Phe Lys Tyr
    50                  55                  60

Thr Leu Leu Ser Val Val Leu Ile Ser Ser Leu Ile Ala Met Leu Leu
65                  70                  75                  80

Gln Ala Met Ser Ala Arg Leu Gly Ile Val Thr Gly Lys Asp Leu Ala
                85                  90                  95
```

```
Gln Leu Thr Arg Glu Arg Thr Ser Lys Arg Val Gly Phe Met Leu Trp
                100                 105                 110

Val Val Ala Glu Leu Ala Ile Met Ala Thr Asp Ile Ala Glu Ile Ile
            115                 120                 125

Gly Ser Gly Ile Ala Leu Glu Leu Leu Phe His Ile Pro Leu Ile Ile
        130                 135                 140

Gly Ile Leu Ile Thr Ala Ala Asp Val Leu Ile Leu Leu Leu Leu Met
145                 150                 155                 160

Arg Leu Gly Phe Arg Lys Ile Glu Ala Ile Val Ala Thr Leu Val Met
                165                 170                 175

Val Ile Leu Ile Val Phe Ala Tyr Glu Val Phe Leu Ser Asp Pro Ser
            180                 185                 190

Ile Ser Gly Ile Ile Lys Gly Tyr Val Pro Ala Pro Val Ile Leu Gln
        195                 200                 205

Asn Asn Ser Met Leu Tyr Leu Ser Leu Gly Ile Val Gly Ala Thr Val
210                 215                 220

Met Pro His Asp Leu Tyr Leu Gly Ser Ser Ile Ser Gln Thr Arg Glu
225                 230                 235                 240

Ile Asp Arg Arg Asp Arg Lys Asn Val Ala Gln Ala Ile Arg Phe Ser
                245                 250                 255

Thr Ile Asp Ser Asn Met Gln Leu Phe Leu Ala Phe Ile Val Asn Ser
            260                 265                 270

Leu Leu Leu Ile Leu Gly Ala Ala Leu Phe Tyr Gly Thr Asp Ser Ser
        275                 280                 285

Leu Gly Arg Phe Val Asp Leu Phe Asn Ala Leu Ser Asp Asn Gln Ile
290                 295                 300

Val Gly Ala Ile Ala Ser Pro Met Leu Ser Met Leu Phe Ala Val Ala
305                 310                 315                 320

Leu Leu Ala Ser Gly Gln Ser Ser Thr Ile Thr Gly Thr Leu Ser Gly
                325                 330                 335

Gln Ile Ile Met Glu Gly Phe Ile Arg Leu Arg Val Pro Leu Trp Val
            340                 345                 350

Gln Arg Leu Val Thr Arg Leu Leu Ser Val Ala Pro Val Leu Ile Phe
        355                 360                 365

Ala Ile Tyr Tyr His Gly Asp Glu Ala Lys Ile Glu Asn Leu Leu Thr
370                 375                 380

Phe Ser Gln Val Phe Leu Ser Val Ala Leu Pro Phe Ala Val Ile Pro
385                 390                 395                 400

Leu Val Met Tyr Thr Ser Ser Lys Lys Leu Met Gly Glu Phe Ala Asn
                405                 410                 415

Arg Gln Trp Val Lys Trp Cys Ala Trp Ile Ala Thr Ile Ile Leu Ile
            420                 425                 430

Leu Leu Asn Ile Tyr Leu Ile Leu Gln Thr Leu Gly Ile Val Lys
        435                 440                 445

<210> SEQ ID NO 7
<211> LENGTH: 464
<212> TYPE: PRT
<213> ORGANISM: Lactobacillus plantarum

<400> SEQUENCE: 7

Met Lys Ser Ala Lys Thr Lys Asp His Ala Lys Met Lys Ala Ala Glu
1               5                   10                  15

Glu Lys Ala Ile His Ser Thr Gly Ala Asp Ser Lys Ser Leu Asp Glu
            20                  25                  30
```

-continued

Val Asn Gly Ser Val Arg Val Pro Lys Asp Ala Ser Phe Trp Arg Thr
        35                  40                  45

Leu Ile Ala Tyr Thr Gly Pro Gly Ala Leu Val Ala Val Gly Tyr Met
    50                  55                  60

Asp Pro Gly Asn Trp Ile Thr Ser Ile Ala Gly Gly Ser Gln Tyr Lys
 65              70                  75                  80

Tyr Ala Leu Leu Ser Val Ile Leu Leu Ser Ser Leu Ile Ala Met Leu
                85                  90                  95

Leu Gln Ala Met Ala Ala Arg Leu Gly Ile Val Thr Gly Lys Asp Leu
            100                 105                 110

Ala Gln Leu Thr Arg Glu Arg Thr Ser Lys Gly Met Gly Ile Phe Leu
            115                 120                 125

Trp Ile Ile Thr Glu Leu Ala Ile Met Ala Thr Asp Val Ala Glu Ile
            130                 135                 140

Ile Gly Ser Gly Ile Ala Leu Lys Leu Leu Phe Gly Phe Pro Leu Ile
145                 150                 155                 160

Val Gly Ile Leu Ile Thr Thr Ala Asp Val Leu Ile Leu Leu Leu Leu
                165                 170                 175

Met Lys Leu Gly Phe Arg Lys Ile Glu Ala Ile Val Ala Thr Leu Val
            180                 185                 190

Ala Val Ile Leu Phe Val Phe Leu Tyr Glu Val Ile Ile Ser Gln Pro
            195                 200                 205

Asn Ile Pro Glu Met Leu Lys Gly Tyr Val Pro Thr Ser Arg Ile Val
        210                 215                 220

Ser Asn Arg Ser Met Leu Phe Leu Ala Leu Gly Ile Val Gly Ala Thr
225                 230                 235                 240

Val Met Pro His Asn Leu Tyr Leu Gly Ser Ser Ile Ser Gln Thr Arg
                245                 250                 255

Gln Val Asp Arg Ser Asp Glu Lys Glu Val Ala Lys Ala Val Lys Phe
            260                 265                 270

Thr Thr Ile Asp Ser Asn Ile Gln Leu Ser Val Ala Phe Val Val Asn
        275                 280                 285

Ser Leu Leu Leu Ile Leu Gly Ala Ala Leu Phe Phe Gly Thr Lys Gly
        290                 295                 300

Asp Leu Gly Arg Phe Val Asp Leu Tyr Asn Ala Leu Gly Asp Ser Lys
305                 310                 315                 320

Val Val Gly Ser Ile Ala Ser Pro Leu Leu Ser Met Leu Phe Ala Ile
                325                 330                 335

Ala Leu Leu Ser Ser Gly Gln Ser Ser Thr Ile Thr Gly Thr Leu Ser
            340                 345                 350

Gly Gln Ile Ile Met Glu Gly Phe Ile Arg Leu Lys Met Pro Leu Trp
            355                 360                 365

Ala Gln Arg Leu Leu Thr Arg Leu Ile Ser Val Thr Pro Val Leu Ala
            370                 375                 380

Phe Ala Ile Tyr Tyr His Gly Asn Glu Ala Lys Ile Glu Asp Leu Leu
385                 390                 395                 400

Thr Met Ser Gln Val Phe Leu Ser Ile Ala Leu Pro Phe Ala Met Ile
                405                 410                 415

Pro Leu Val Met Phe Thr Ser Asn Arg Ala Leu Met Gly Asn Phe Thr
            420                 425                 430

Asn Arg Val Trp Val Lys Trp Thr Ala Trp Ile Val Thr Val Ile Leu
            435                 440                 445

```
Ile Ile Leu Asn Ile Tyr Ile Leu Gln Thr Val Gly Leu Val Lys
        450                 455                 460

<210> SEQ ID NO 8
<211> LENGTH: 443
<212> TYPE: PRT
<213> ORGANISM: Lactobacillus sakei

<400> SEQUENCE: 8

Met His Tyr Ala Asp Gly Ser Ser Leu Glu Glu Ile Asn Asn Thr Val
1               5                   10                  15

Ala Ile Pro Lys Asn Ala Gly Phe Trp Lys Thr Leu Met Ala Phe Met
            20                  25                  30

Gly Pro Gly Ala Leu Val Ala Val Gly Tyr Met Asp Pro Gly Asn Trp
        35                  40                  45

Ile Thr Ser Ile Ala Gly Gly Ala Gln Phe Ala Tyr Thr Leu Ile Ser
    50                  55                  60

Val Ile Leu Val Ser Asn Leu Ile Ala Met Leu Leu Gln Ala Met Ala
65                  70                  75                  80

Ala Arg Leu Gly Ile Val Thr Gly Met Asp Leu Ala Gln Met Thr Arg
                85                  90                  95

Ala Lys Thr Gly Lys Lys Met Gly Ile Phe Leu Trp Ile Val Thr Glu
            100                 105                 110

Leu Ala Ile Met Ala Thr Asp Ile Ala Glu Ile Gly Ser Ala Ile
        115                 120                 125

Ala Leu Glu Leu Ile Phe Asn Ile Pro Leu Leu Trp Gly Val Leu Ile
    130                 135                 140

Thr Ala Phe Asp Val Leu Leu Leu Leu Leu Met Lys Leu Gly Phe
145                 150                 155                 160

Arg Lys Ile Glu Ala Ile Val Ala Thr Leu Val Ala Val Ile Leu Phe
                165                 170                 175

Val Phe Leu Tyr Glu Val Ile Leu Ala Gln Pro Asn Met Gly Asp Val
            180                 185                 190

Val Arg Gly Phe Val Pro Ser Pro Arg Ile Met Thr Asp Lys Lys Met
        195                 200                 205

Leu Phe Leu Ala Leu Gly Ile Val Gly Ala Thr Val Met Pro His Asn
    210                 215                 220

Leu Tyr Leu His Ser Ser Ile Ala Gln Ala Arg Gln Tyr Asp Arg Asp
225                 230                 235                 240

Asp Val Ala Glu Lys Arg Lys Ala Ile Lys Phe Thr Val Ile Asp Ser
                245                 250                 255

Asn Ile Gln Leu Thr Ile Ala Phe Val Val Asn Cys Leu Leu Leu Ile
            260                 265                 270

Leu Gly Ala Ala Met Phe Tyr Gly Thr Asn Ser Asp Leu Gly Arg Phe
        275                 280                 285

Val Asp Leu Phe Asn Ala Leu Gln Asn Lys Glu Ile Val Gly Ser Ile
    290                 295                 300

Ala Ser Pro Met Leu Ser Leu Phe Ala Val Ala Leu Leu Ala Ser
305                 310                 315                 320

Gly Gln Asn Ser Thr Ile Thr Gly Thr Leu Ser Gly Gln Ile Val Met
                325                 330                 335

Glu Gly Phe Val Arg Met Lys Ile Pro Leu Trp Ala Arg Arg Val Ile
            340                 345                 350

Thr Arg Gly Leu Ser Ile Leu Pro Val Ile Ile Phe Thr Val Tyr Tyr
        355                 360                 365
```

His Gly Asn Glu Ala Gln Val Glu Asn Leu Leu Ile Tyr Ser Gln Val
    370                 375                 380

Phe Leu Ser Ile Ala Leu Pro Val Ser Met Ile Pro Leu Thr Leu Phe
385                 390                 395                 400

Thr Ser Asp Glu Lys Ile Met Gly Pro Phe Val Asn Arg Pro Trp Val
                405                 410                 415

Lys Tyr Thr Ala Trp Phe Val Thr Ile Val Leu Thr Leu Leu Asn Ile
            420                 425                 430

Tyr Leu Ile Leu Gln Thr Val Gly Leu Ala Ala
        435                 440

<210> SEQ ID NO 9
<211> LENGTH: 454
<212> TYPE: PRT
<213> ORGANISM: Lactobacillus alimentarius

<400> SEQUENCE: 9

Met Ser Ser Lys Asn Lys Lys His Glu Ser Leu Ile His Tyr Ala Asn
1               5                   10                  15

Gly Pro Ser Leu Glu Glu Ile Asn Asp Thr Val Glu Ile Pro Lys Asp
            20                  25                  30

Ala Gly Phe Phe Lys Thr Leu Leu Ala Tyr Ser Gly Pro Gly Ala Leu
        35                  40                  45

Val Ala Val Gly Tyr Met Asp Pro Gly Asn Trp Val Thr Ser Ile Ala
    50                  55                  60

Gly Gly Ala Gln Phe Lys Tyr Lys Leu Leu Ser Val Ile Leu Ile Ser
65                  70                  75                  80

Ser Leu Ile Ala Met Leu Leu Gln Tyr Met Ser Ala Lys Leu Gly Ile
                85                  90                  95

Val Thr Gly Arg Asp Leu Ala Gln Leu Thr Arg Asp Arg Thr Ser Arg
            100                 105                 110

Val Gly Gly Phe Ile Leu Trp Ile Ile Thr Glu Leu Ala Ile Met Ala
        115                 120                 125

Thr Asp Ile Ala Glu Ile Ile Gly Ser Ala Ile Ala Leu Lys Leu Leu
    130                 135                 140

Phe Asn Ile Pro Val Leu Trp Gly Val Ile Ile Thr Ala Phe Asp Val
145                 150                 155                 160

Leu Leu Leu Leu Val Leu Met Lys Leu Gly Phe Arg Lys Ile Glu Ala
                165                 170                 175

Ile Val Ala Thr Leu Ile Met Val Ile Leu Leu Val Phe Leu Tyr Glu
            180                 185                 190

Val Ile Leu Ala Lys Pro Asp Val Gly Gln Met Met Val Gly Phe Ile
        195                 200                 205

Pro Glu Pro Lys Ile Leu Gln Asn Gln Ser Met Leu Tyr Leu Ser Leu
    210                 215                 220

Gly Ile Val Gly Ala Thr Val Met Pro His Asn Leu Tyr Leu His Ser
225                 230                 235                 240

Ser Ile Ser Gln Ala Arg Lys Tyr Asp Arg Asp Pro Lys Ser Ile
                245                 250                 255

His Gln Ala Val Arg Phe Ser Thr Trp Asp Ser Asn Ile Gln Leu Thr
            260                 265                 270

Leu Ala Phe Val Val Asn Thr Leu Leu Leu Leu Gly Ala Ala Leu
        275                 280                 285

Phe Tyr Gly Thr Ser Ser Asp Leu Gly Arg Phe Val Asp Leu Phe Asn

```
                290                 295                 300
Ala Leu Gln Asp Pro Lys Val Ala Gly Ala Val Ala Ser Pro Val Leu
305                 310                 315                 320

Ser Ile Leu Phe Ala Val Ala Leu Leu Ala Ser Gly Gln Asn Ser Thr
                325                 330                 335

Ile Thr Gly Thr Leu Ser Gly Gln Ile Val Met Glu Gly Phe Ile His
                340                 345                 350

Met Lys Met Lys Leu Trp Ala Arg Arg Val Ile Thr Arg Leu Met Ser
                355                 360                 365

Ile Ile Pro Val Ile Thr Phe Ala Ile Ile Tyr His Gly Asn Glu Ala
                370                 375                 380

Lys Ile Glu Ser Leu Leu Thr Phe Ser Gln Val Phe Leu Ser Val Ala
385                 390                 395                 400

Leu Pro Phe Ser Ile Phe Pro Leu Ile Lys Phe Thr Ser Asn Lys Lys
                405                 410                 415

Leu Met Gly Glu Phe Val Asn Asn Lys Leu Val Glu Tyr Ile Gly Tyr
                420                 425                 430

Phe Val Ala Ile Val Leu Thr Ile Leu Asn Ile Trp Leu Ile Tyr Thr
                435                 440                 445

Thr Phe Val Pro Thr Ala
    450
```

<210> SEQ ID NO 10
<211> LENGTH: 451
<212> TYPE: PRT
<213> ORGANISM: Lactobacillus floricola

<400> SEQUENCE: 10

```
Met Thr Lys Glu Glu Thr Lys Leu Phe His Tyr Ala Asp Gly Pro Ser
1               5                   10                  15

Leu Glu Glu Ile Asn Gly Thr Val Ala Val Pro Lys Lys Gly Gly Phe
                20                  25                  30

Trp Lys Thr Leu Phe Ala Phe Ser Gly Pro Gly Ala Leu Val Ala Val
                35                  40                  45

Gly Tyr Met Asp Pro Gly Asn Trp Val Thr Ser Ile Ala Gly Gly Ala
    50                  55                  60

Gln Tyr Gln Tyr Thr Leu Leu Ser Val Ile Leu Ile Ser Ser Leu Ile
65                  70                  75                  80

Ala Met Leu Leu Gln Ala Met Ser Ala Arg Leu Gly Ile Ala Ser Gly
                85                  90                  95

Leu Asp Leu Ala Gln Ala Thr Ala Lys His Ser Pro Lys Trp Leu Arg
                100                 105                 110

Tyr Thr Leu Trp Ile Ile Thr Glu Leu Ala Ile Met Ala Thr Asp Ile
                115                 120                 125

Ala Glu Ile Val Gly Ala Ala Ile Ala Leu Lys Leu Leu Phe Asn Leu
                130                 135                 140

Pro Leu Ile Val Gly Ile Phe Leu Thr Thr Leu Asp Val Met Leu Leu
145                 150                 155                 160

Leu Leu Leu Met Lys Leu Gly Phe Arg Lys Ile Glu Ala Ile Val Gly
                165                 170                 175

Ala Leu Ile Val Ser Ile Leu Val Ile Phe Leu Tyr Glu Val Ile Leu
                180                 185                 190

Ala Arg Pro Asp Val Gly Ala Met Phe Ala Gly Tyr Ile Pro Gln Pro
                195                 200                 205
```

Glu Val Val Thr Asn Lys Gly Ala Phe Tyr Ile Ala Leu Gly Ile Val
    210             215                 220
Gly Ala Thr Val Met Pro His Asn Leu Tyr Leu His Ser Ser Ile Ala
225             230                 235                 240
Gln Ala Arg Gln Tyr Asp Arg Asn Asp Ile Glu Glu Lys Lys Arg Ala
                245                 250                 255
Ile Lys Phe Thr Val Leu Asp Ser Asn Ile Gln Leu Ser Val Ala Phe
                260                 265                 270
Val Val Asn Thr Leu Leu Leu Leu Gly Ala Ala Leu Phe Tyr Gly
            275                 280                 285
Ala Gln Thr Asp Leu Gly Thr Phe Ser Glu Leu Tyr Asn Ala Leu Gln
    290                 295                 300
Asn Pro Gln Val Ala Gly Val Ile Ala Ser Pro Ile Leu Ser Val Leu
305             310                 315                 320
Phe Ala Val Ala Leu Leu Ala Ser Gly Gln Asn Ser Thr Ile Thr Gly
                325                 330                 335
Thr Leu Ser Gly Gln Ile Val Met Glu Gly Phe Ile His Leu Lys Met
            340                 345                 350
Pro Met Trp Ala Arg Arg Val Ile Thr Arg Leu Ile Ser Val Ile Pro
        355                 360                 365
Val Leu Ile Phe Ala Ile Ile Tyr His Ser Asn Glu Ala Lys Ile Glu
    370                 375                 380
Asp Leu Leu Val Phe Ser Gln Val Phe Leu Ser Ile Ala Leu Pro Val
385                 390                 395                 400
Ser Ile Ile Pro Leu Val Met Phe Thr Ala Asn Lys Lys Ile Met Gly
                405                 410                 415
Pro Phe Val Asn Lys Lys Trp Val Thr Ile Thr Ser Ser Leu Val Ala
                420                 425                 430
Ile Ile Leu Thr Gly Leu Asn Ile Phe Leu Ile Leu Gln Thr Leu Gly
            435                 440                 445
Trp Val Gln
    450

<210> SEQ ID NO 11
<211> LENGTH: 455
<212> TYPE: PRT
<213> ORGANISM: Lactobacillus brevis

<400> SEQUENCE: 11

Met Thr Asp Asn Val Ser Ala Lys Ser Val Gln Gly Asp Leu Thr Asn
1               5                   10                  15
Gly Pro Ser Leu Ala Glu Ile Asn Gly Ser Val Arg Val Pro Lys Glu
            20                  25                  30
Lys Gly Phe Val Arg Asn Leu Leu Ala Phe Ser Gly Pro Gly Ala Leu
        35                  40                  45
Val Ala Val Gly Tyr Met Asp Pro Gly Asn Trp Val Thr Ser Ile Gly
    50                  55                  60
Gly Gly Ala Gln Tyr Gly Tyr Leu Leu Met Ser Val Ile Leu Met Ser
65              70                  75                  80
Ser Leu Ile Ala Met Leu Leu Gln Tyr Met Ala Ala Lys Leu Gly Ile
                85                  90                  95
Val Thr Gln Met Asp Leu Ala Arg Ala Thr Arg Ala His Thr Gly Lys
            100                 105                 110
Arg Ile Gly Ala Val Leu Trp Val Met Thr Glu Leu Ala Ile Met Ala
        115                 120                 125

Thr Asp Ile Ala Glu Val Ile Gly Gly Ala Ile Ala Leu Lys Leu Leu
    130                 135                 140

Phe Gly Val Pro Leu Ile Leu Gly Val Ser Leu Thr Val Leu Asp Val
145                 150                 155                 160

Leu Leu Leu Leu Leu Leu Thr Arg Leu Gly Phe Arg Lys Ile Glu Ala
                165                 170                 175

Ile Val Leu Cys Leu Ile Leu Val Ile Leu Val Val Phe Ala Tyr Glu
                180                 185                 190

Val Val Ile Ala Gln Pro Ser Met Gly Gln Ala Val Ala Ser Phe Val
                195                 200                 205

Pro Gln Ala Glu Ile Met Arg Pro Gly Gln Leu Thr Met Ala Leu Gly
    210                 215                 220

Ile Val Gly Ala Thr Val Met Pro His Asn Leu Tyr Leu His Ser Ser
225                 230                 235                 240

Ile Ala Gln Thr Arg Lys Phe Asp Arg Gln Asp Pro Ala Glu Met Ala
                245                 250                 255

Arg Ala Val Lys Phe Thr Ala Trp Asp Ser Asn Ile Gln Leu Phe Gly
                260                 265                 270

Ala Phe Ile Ile Asn Cys Leu Leu Leu Leu Gly Ala Ala Met Phe
                275                 280                 285

Phe Gly Lys Asp Ala Gly Ala Leu Gly Thr Phe Gly Gln Leu Tyr Asp
    290                 295                 300

Ala Leu Gln Asp Asn Arg Leu Ala Gly Ala Val Ala Ser Pro Val Leu
305                 310                 315                 320

Ser Thr Leu Phe Ala Val Ala Leu Leu Ala Ser Gly Gln Asn Ser Thr
                325                 330                 335

Ile Thr Gly Thr Leu Thr Gly Gln Val Ile Met Glu Gly Phe Ile Asn
                340                 345                 350

Met Arg Leu Pro Ile Trp Val Arg Arg Leu Val Thr Arg Leu Ile Ser
                355                 360                 365

Val Ala Pro Val Ile Ile Val Thr Ile Leu Tyr Gly Gly Ser Glu Gln
    370                 375                 380

Ala Leu Asp Arg Leu Leu Val Asn Ser Gln Val Phe Leu Ser Ile Ala
385                 390                 395                 400

Leu Pro Phe Ser Met Ile Pro Leu Thr Ile Phe Thr Ser Ser Lys Arg
                405                 410                 415

Ile Met Gly Thr Arg Trp Val Asn Arg Trp Val Thr Ala Leu Ala
                420                 425                 430

Trp Gly Cys Thr Ala Ile Leu Thr Val Leu Asn Ile Gln Ile Val Trp
                435                 440                 445

Ala Thr Met Thr Thr Leu Phe
    450                 455

<210> SEQ ID NO 12
<211> LENGTH: 450
<212> TYPE: PRT
<213> ORGANISM: Lactobacillus casei

<400> SEQUENCE: 12

Met Ala Arg Pro Asp Glu Arg Leu Thr Val Gln Arg Glu Lys Arg Ser
1               5                   10                  15

Leu Asp Asp Ile Asn Arg Ser Val Gln Val Pro Ser Val Tyr Glu Ser
                20                  25                  30

Ser Phe Phe Gln Lys Phe Leu Ala Tyr Ser Gly Pro Gly Ala Leu Val

```
                35                  40                  45
Ala Val Gly Tyr Met Asp Pro Gly Asn Trp Leu Thr Ala Leu Glu Gly
 50                  55                  60

Gly Ser Arg Tyr His Tyr Ala Leu Leu Ser Val Leu Leu Met Ser Ile
 65                  70                  75                  80

Leu Val Ala Met Phe Met Gln Thr Leu Ala Ile Lys Leu Gly Val Val
                 85                  90                  95

Ala Arg Leu Asp Leu Ala Gln Ala Ile Ala Ala Phe Ile Pro His Trp
            100                 105                 110

Ser Arg Ile Cys Leu Trp Leu Ile Asn Glu Ala Ala Met Met Ala Thr
        115                 120                 125

Asp Met Thr Gly Val Val Gly Thr Ala Ile Ala Leu Lys Leu Leu Phe
    130                 135                 140

Gly Leu Pro Leu Met Trp Gly Met Leu Leu Thr Ile Ala Asp Val Leu
145                 150                 155                 160

Val Val Leu Leu Phe Leu Arg Phe Gly Ile Arg Arg Val Glu Leu Ile
                165                 170                 175

Val Leu Val Ser Ile Leu Thr Val Gly Ile Ile Phe Gly Ile Glu Val
            180                 185                 190

Ala Arg Ala Asp Pro Ser Ile Gly Gly Ile Ala Gly Gly Phe Val Pro
        195                 200                 205

His Thr Asp Ile Leu Thr Asn His Gly Met Leu Leu Leu Ser Leu Gly
    210                 215                 220

Ile Met Gly Ala Thr Ile Met Pro His Asn Ile Tyr Leu His Ser Ser
225                 230                 235                 240

Leu Ala Gln Ser Arg Lys Tyr Asp Glu His Ile Pro Ala Gln Val Thr
                245                 250                 255

Glu Ala Leu Arg Phe Gly Lys Trp Asp Ser Asn Val His Leu Val Ala
            260                 265                 270

Ala Phe Leu Ile Asn Ala Leu Leu Ile Leu Gly Ala Ala Leu Phe
        275                 280                 285

Tyr Gly Val Gly Gly His Val Thr Ala Phe Gln Gly Val Tyr Asn Gly
    290                 295                 300

Leu Lys Asn Pro Met Ile Val Gly Gly Leu Ala Ser Pro Leu Met Ser
305                 310                 315                 320

Thr Leu Phe Ala Phe Ala Leu Leu Ile Thr Gly Leu Ile Ser Ser Ile
                325                 330                 335

Ala Ser Thr Leu Ala Gly Gln Ile Val Met Glu Gly Tyr Leu Asn Ile
            340                 345                 350

Arg Met Pro Leu Trp Glu Arg Arg Leu Leu Thr Arg Leu Val Thr Leu
        355                 360                 365

Ile Pro Ile Met Val Ile Gly Phe Met Ile Gly Phe Ser Glu His Asn
    370                 375                 380

Phe Glu Gln Val Ile Val Tyr Ala Gln Val Ser Leu Ser Ile Ala Leu
385                 390                 395                 400

Pro Phe Thr Leu Phe Pro Leu Val Ala Leu Thr Asn Arg Arg Asp Leu
                405                 410                 415

Met Gly Ile His Val Asn Ser Gln Leu Val Arg Trp Val Gly Tyr Phe
            420                 425                 430

Leu Thr Gly Val Ile Thr Val Leu Asn Ile Gln Leu Ala Ile Ser Val
        435                 440                 445

Phe Val
450
```

<210> SEQ ID NO 13
<211> LENGTH: 451
<212> TYPE: PRT
<213> ORGANISM: Lactobacillus rhamnosus

<400> SEQUENCE: 13

| Met | Thr | Lys | Arg | Asn | Glu | Gln | Leu | Ser | Val | Gln | Gln | Ala | Lys | Pro | Ser |
|---|---|---|---|---|---|---|---|---|---|---|---|---|---|---|---|
| 1 | | | | 5 | | | | | 10 | | | | | 15 | |

Leu Asp Glu Ile Asn Arg Ser Val Gln Val Pro Gly Val Tyr Glu Pro
            20                  25                  30

Ser Phe Val Gln Lys Phe Leu Ala Tyr Ser Gly Pro Gly Ala Leu Val
        35                  40                  45

Ala Val Gly Tyr Met Asp Pro Gly Asn Trp Leu Thr Ala Leu Glu Gly
    50                  55                  60

Gly Ser Arg Tyr His Glu Thr Leu Leu Ala Val Leu Leu Leu Ser Ile
65                  70                  75                  80

Leu Ala Ala Met Phe Met Gln Thr Leu Ala Ile Lys Leu Gly Val Val
                85                  90                  95

Ala Arg Leu Asp Leu Ala Gln Ala Ile Ala Ala Phe Val Pro Lys Trp
            100                 105                 110

Ser Arg Ile Gly Leu Trp Leu Val Asn Glu Ala Ala Met Met Ala Thr
        115                 120                 125

Asp Met Thr Gly Val Val Gly Thr Ala Ile Ala Leu Lys Leu Leu Phe
    130                 135                 140

Gly Leu Pro Leu Met Trp Gly Met Leu Leu Thr Ile Ala Asp Val Leu
145                 150                 155                 160

Val Val Leu Met Phe Leu Arg Phe Gly Ile Arg Arg Ile Glu Leu Ile
                165                 170                 175

Val Leu Ala Ser Ile Leu Thr Val Gly Ile Ile Phe Gly Ile Glu Val
            180                 185                 190

Val Arg Ala Arg Pro Ser Met Gly Gly Ile Val Ala Gly Leu Val Pro
        195                 200                 205

His Thr Glu Ile Leu Thr Asn Arg Gly Met Leu Leu Leu Ser Leu Gly
    210                 215                 220

Ile Met Gly Ala Thr Ile Met Pro His Asn Ile Tyr Leu His Ser Ser
225                 230                 235                 240

Leu Ala Gln Ser Arg Arg Tyr Asp Glu His Ile Pro Ala Gln Val Thr
                245                 250                 255

Glu Ala Leu Arg Phe Gly Lys Trp Asp Ser Asn Val His Leu Val Ala
            260                 265                 270

Ala Phe Ile Ile Asn Ala Leu Leu Ile Leu Gly Ala Thr Leu Phe
        275                 280                 285

Tyr Gly Met Ser Ser His Ala Thr Ala Phe Glu Gly Val Tyr Asn Gly
    290                 295                 300

Leu Lys Asn Pro Ala Ile Val Gly Gly Leu Ala Ser Pro Leu Met Ser
305                 310                 315                 320

Thr Leu Phe Ala Phe Ala Leu Leu Ile Thr Gly Leu Ile Ser Ser Ile
                325                 330                 335

Ala Ser Thr Leu Ala Gly Gln Ile Val Met Glu Gly Tyr Leu Asn Ile
            340                 345                 350

Gln Ile Pro Leu Trp Ala Arg Arg Leu Leu Thr Arg Leu Val Thr Leu
        355                 360                 365

Ile Pro Ile Met Ile Ile Gly Phe Val Met Gly Phe Ser Glu Gln His

```
                370                 375                 380
Phe Glu Gln Val Ile Val Tyr Ala Gln Val Ala Leu Ser Ile Ala Leu
385                 390                 395                 400

Pro Phe Thr Leu Phe Pro Leu Val Ala Leu Thr Asp Arg Arg Asp Leu
                405                 410                 415

Met Gly Gln His Val Asn Ser Pro Val Val Arg Trp Met Gly Tyr Val
                420                 425                 430

Leu Thr Gly Ile Ile Thr Leu Leu Asn Val Gln Leu Ile Leu Ser Val
                435                 440                 445

Ile Leu Pro
    450

<210> SEQ ID NO 14
<211> LENGTH: 442
<212> TYPE: PRT
<213> ORGANISM: Lactobacillus kefiri

<400> SEQUENCE: 14

Met Ser Gln Glu Pro Thr His Lys Ser Leu Asp Glu Ile Asn Gln Ser
1               5                   10                  15

Val Glu Val Pro Ser Val Tyr Glu Thr Ser Phe Leu Gln Lys Phe Leu
                20                  25                  30

Ala Tyr Ser Gly Pro Gly Ala Leu Val Ala Val Gly Tyr Met Asp Pro
            35                  40                  45

Gly Asn Trp Leu Thr Ser Leu Ser Gly Gly Ser Gln Phe Arg Tyr Ala
    50                  55                  60

Leu Leu Ser Val Leu Leu Met Ser Ile Leu Val Ala Met Phe Met Gln
65                  70                  75                  80

Thr Leu Ser Ile Lys Leu Gly Val Val Ala Arg Leu Asp Leu Ala Gln
                85                  90                  95

Ala Ile Ala Gln Lys Val Pro Lys Ser Gly Arg Tyr Thr Leu Trp Ile
            100                 105                 110

Ile Asn Glu Leu Ala Met Met Ala Thr Asp Met Thr Gly Val Val Gly
        115                 120                 125

Thr Ala Ile Ala Leu Lys Leu Leu Phe Gly Leu Pro Leu Val Tyr Gly
    130                 135                 140

Ile Leu Leu Thr Ile Phe Asp Val Leu Leu Val Leu Leu Phe Leu Arg
145                 150                 155                 160

Phe Gly Ile Arg Arg Ile Glu Phe Ile Val Leu Ala Ala Ile Leu Ile
                165                 170                 175

Val Gly Val Ile Phe Gly Ile Glu Val Thr Arg Ala Thr Pro Asn Ile
            180                 185                 190

Val Glu Ile Ala Gly Gly Leu Ile Pro Thr Thr His Ile Val Thr Asn
        195                 200                 205

His Glu Met Leu Ile Met Ser Leu Gly Ile Val Gly Ala Thr Ile Met
    210                 215                 220

Pro His Asn Val Tyr Leu His Ser Ser Leu Ala Gln Ser Arg Arg Tyr
225                 230                 235                 240

Asp Tyr His Asn Pro Lys Gln Val Asn Glu Ala Leu Arg Phe Ala Lys
                245                 250                 255

Trp Asp Ser Asn Val His Leu Val Ala Ala Phe Leu Ile Asn Ala Leu
            260                 265                 270

Leu Leu Val Leu Gly Gly Thr Leu Phe Phe His Thr Asn Ser His Phe
        275                 280                 285
```

```
Ser Ala Phe Gln Asp Val Tyr Asn Gly Leu Lys Ser Ser Ala Ile Val
            290                 295                 300

Gly Ser Leu Ala Ser Pro Leu Met Ser Thr Leu Phe Ala Phe Ala Leu
305                 310                 315                 320

Leu Ile Thr Gly Met Ile Ser Ser Ile Thr Ser Thr Leu Ser Gly Gln
                325                 330                 335

Ile Val Met Glu Gly Tyr Leu His Ile Arg Leu Pro Leu Trp Glu Arg
                340                 345                 350

Arg Leu Leu Thr Arg Phe Val Thr Leu Ile Pro Ile Leu Ala Ile Gly
            355                 360                 365

Phe Leu Val Gly Phe Asn Asp His Asp Phe Glu Glu Ile Ile Val Tyr
        370                 375                 380

Ala Gln Ile Ala Leu Ser Ile Ala Leu Pro Phe Thr Leu Phe Pro Met
385                 390                 395                 400

Val Ala Leu Thr Ser Asn His Asp Leu Met Gly Val His Thr Asn Arg
                405                 410                 415

Arg Tyr Val Thr Val Ile Gly Tyr Leu Leu Thr Ser Ile Ile Thr Ile
            420                 425                 430

Leu Asn Leu Gln Phe Val Leu Ala Ser Ile
        435                 440

<210> SEQ ID NO 15
<211> LENGTH: 439
<212> TYPE: PRT
<213> ORGANISM: Lactobacillus alimentarius

<400> SEQUENCE: 15

Met Pro Asn Lys Lys Ser Leu Asp Glu Ile Asn Glu Ser Val Lys Val
1               5                   10                  15

Pro Ser Val Tyr Asp Thr Ser Phe Leu Gln Lys Phe Leu Ala Tyr Ser
            20                  25                  30

Gly Pro Gly Ala Leu Val Ala Val Gly Tyr Met Asp Pro Gly Asn Trp
        35                  40                  45

Leu Thr Ser Leu Ser Gly Gly Ser Gln Tyr Arg Tyr Asp Leu Leu Ser
    50                  55                  60

Val Leu Leu Ile Ser Ile Leu Val Ala Met Phe Met Gln Thr Leu Ser
65                  70                  75                  80

Ile Lys Leu Gly Val Ala Arg Leu Asp Leu Ala Gln Ala Ile Ala
            85                  90                  95

Thr Lys Val Ser Lys Pro Ile Arg Tyr Phe Leu Trp Ile Leu Asn Glu
            100                 105                 110

Ile Ala Met Met Ala Thr Asp Leu Thr Gly Val Ile Gly Thr Ala Ile
            115                 120                 125

Ala Leu Lys Leu Leu Phe Asn Leu Pro Leu Val Phe Gly Ile Leu Leu
        130                 135                 140

Thr Val Phe Asp Val Leu Ile Val Leu Ile Phe Leu Arg Phe Gly Ile
145                 150                 155                 160

Arg Arg Ile Glu Phe Ile Val Leu Ala Ala Ile Leu Thr Val Gly Ile
                165                 170                 175

Ile Phe Gly Ile Glu Val Phe Arg Ala Gln Pro Lys Leu Phe Ser Ile
            180                 185                 190

Ile Ser Gly Val Ile Pro Ser Thr Asp Leu Phe Thr Asn His Arg Lys
        195                 200                 205

Leu Val Leu Ser Leu Gly Ile Val Gly Ala Thr Ile Met Pro His Asn
    210                 215                 220
```

```
Ile Tyr Leu His Ser Ser Leu Ala Gln Ser Arg Arg Tyr Asp His Asn
225                 230                 235                 240

Asp Pro Leu Gln Val Asn Glu Ala Leu Arg Phe Ala Lys Trp Asp Ser
            245                 250                 255

Asn Val His Leu Ile Ala Ala Phe Ile Ile Asn Ala Leu Leu Leu Val
        260                 265                 270

Leu Gly Gly Thr Leu Phe Tyr His Met Thr Asn Gln Leu Ala Ser Leu
    275                 280                 285

Gln Asp Val Phe Thr Gly Leu Lys Ser His Ala Ile Val Gly Thr Leu
290                 295                 300

Ala Ser Pro Leu Met Ser Trp Leu Phe Ala Phe Ala Leu Leu Ile Thr
305                 310                 315                 320

Gly Met Ile Ser Ser Ile Thr Ser Thr Leu Ser Gly Gln Ile Val Met
                325                 330                 335

Glu Gly Tyr Leu Asn Ile Arg Leu Pro Leu Trp Gln Arg Arg Leu Leu
            340                 345                 350

Thr Arg Phe Val Thr Leu Ile Pro Ile Leu Ile Ile Gly Phe Ile Val
        355                 360                 365

His Phe Asn Glu Gln Asp Phe Glu Asn Leu Ile Val Tyr Ala Gln Ile
    370                 375                 380

Ile Leu Ser Ile Ala Leu Pro Phe Thr Leu Phe Pro Met Ile Phe Leu
385                 390                 395                 400

Thr Asn Asp Lys Lys Ile Met Gly Asn His Val Asn Ser Lys Leu Thr
                405                 410                 415

Thr Thr Val Gly Ile Ile Leu Ala Ser Ala Ile Thr Ile Leu Asn Leu
            420                 425                 430

Gln Leu Leu Phe Ser Leu Ile
        435

<210> SEQ ID NO 16
<211> LENGTH: 441
<212> TYPE: PRT
<213> ORGANISM: Lactobacillus plantarum

<400> SEQUENCE: 16

Met Gln Ser His Arg His Gln Ser Leu Glu Glu Ile Asn Gln Ser Val
1               5                   10                  15

Ala Val Pro Asp Val His Gln Thr Ala Phe Trp Arg Lys Phe Leu Ala
            20                  25                  30

Tyr Ser Gly Pro Gly Ala Leu Val Ala Val Gly Tyr Met Asp Pro Gly
        35                  40                  45

Asn Trp Leu Thr Ser Leu Ala Gly Gly Gln Phe Gln Tyr Arg Leu
    50                  55                  60

Leu Ala Val Leu Ala Leu Ala Ile Ile Val Ala Met Phe Met Gln Gly
65                  70                  75                  80

Leu Ala Ile Arg Leu Gly Val Val Ala Arg Gln Asp Leu Ala Gln Ala
            85                  90                  95

Ile Ala Ser Lys Leu Pro Arg Pro Val Arg Tyr Ala Ala Trp Ile Leu
        100                 105                 110

Asn Glu Val Ala Met Met Ala Thr Asp Met Thr Gly Val Ile Gly Thr
    115                 120                 125

Ala Ile Ala Leu Lys Met Leu Phe Gly Leu Pro Leu Leu Ala Gly Ile
130                 135                 140

Leu Leu Thr Ile Ala Asp Val Leu Val Val Leu Leu Phe Leu Arg Phe
```

```
                145                 150                 155                 160
Gly Ile Arg Arg Val Glu Val Ile Val Leu Val Ala Ile Leu Thr Val
                165                 170                 175
Gly Ile Ile Phe Gly Ile Glu Val Gly Arg Ala His Val Gln Phe Gly
                180                 185                 190
Asn Val Leu Leu Gly Leu Val Pro Thr Pro Leu Ile Val Lys Asn His
                195                 200                 205
Thr Ala Leu Val Leu Ser Leu Gly Ile Leu Gly Ala Thr Ile Met Pro
                210                 215                 220
His Asn Leu Tyr Leu His Ser Ser Leu Ala Gln Ser Arg Arg Tyr Asp
225                 230                 235                 240
Tyr His Asn Pro Ala Gln Val Thr Glu Ala Leu Arg Phe Ala Asn Trp
                245                 250                 255
Asp Ser Thr Val His Leu Ile Ala Ala Phe Leu Ile Asn Ala Leu Leu
                260                 265                 270
Leu Val Leu Gly Gly Thr Leu Phe Phe Gly His Thr Asn Ala Leu Ala
                275                 280                 285
Ser Leu Gln Ala Val Phe Asp Gly Leu Lys Ser Thr Val Val Gly
                290                 295                 300
Ala Leu Ala Ser Pro Val Met Ser Trp Leu Phe Ala Leu Ala Leu Leu
305                 310                 315                 320
Ile Thr Gly Leu Ile Ser Ser Ile Thr Ser Thr Leu Ala Gly Gln Ile
                325                 330                 335
Val Met Glu Gly Tyr Leu His Ile Arg Leu Pro Leu Trp Gln Arg Arg
                340                 345                 350
Leu Leu Thr Arg Ala Val Thr Leu Ile Pro Ile Leu Ile Ile Gly Met
                355                 360                 365
Leu Val Gly Phe Ser Asp Ala Ala Phe Glu Asn Leu Ile Ile Tyr Ala
                370                 375                 380
Gln Val Ala Leu Ser Ile Ala Leu Pro Phe Thr Leu Pro Leu Val
385                 390                 395                 400
Ala Leu Thr Asn Asp Ala Ser Leu Met Lys Ala His Val Asn Arg Pro
                405                 410                 415
Ala Val Thr Trp Val Gly Tyr Gly Leu Ala Gly Ile Ile Thr Val Leu
                420                 425                 430
Asn Ile Tyr Leu Val Tyr Ser Leu Phe
                435                 440

<210> SEQ ID NO 17
<211> LENGTH: 434
<212> TYPE: PRT
<213> ORGANISM: Lactobacillus reuteri

<400> SEQUENCE: 17

Met Glu Arg Lys Ser Leu Asp Glu Ile Asn Gly Ser Val Asp Val Pro
1               5                   10                  15
Asn Val Tyr Gln Ser Ala Phe Trp Gln Lys Phe Leu Ala Tyr Ser Gly
                20                  25                  30
Pro Gly Ala Leu Val Ala Val Gly Tyr Met Asp Pro Gly Asn Trp Leu
            35                      40                  45
Thr Ser Leu Ala Gly Gly Ser Gln Tyr Arg Tyr Gln Leu Leu Val Val
        50                  55                      60
Leu Phe Thr Ala Ile Leu Ile Ala Met Tyr Met Gln Ser Leu Ala Ile
65                  70                  75                  80
```

Lys Leu Gly Val Thr Thr Arg Thr Asp Leu Ala Gln Ala Ile Ala Arg
                85                  90                  95

Arg Leu Pro Thr Pro Leu Arg Ile Ala Leu Trp Leu Phe Asn Glu Ile
            100                 105                 110

Ala Met Met Ala Thr Asp Leu Thr Gly Val Val Gly Thr Ala Val Ala
        115                 120                 125

Leu Asn Met Leu Phe Lys Leu Pro Leu Leu Ile Gly Val Leu Leu Thr
    130                 135                 140

Ile Ala Asp Val Leu Val Leu Phe Phe Leu His Phe Gly Ile Arg
145                 150                 155                 160

Arg Ile Glu Phe Ile Val Leu Thr Ala Ile Leu Val Val Gly Ala Ile
                165                 170                 175

Phe Ala Ile Glu Val Cys Arg Ala His Pro Glu Phe Ser Ala Ile Met
            180                 185                 190

Asp Gly Phe Val Pro Arg Ser Thr Ile Phe Thr Asn His Ser Glu Leu
        195                 200                 205

Leu Ile Ser Leu Gly Ile Val Gly Ala Thr Ile Met Pro His Asn Ile
    210                 215                 220

Tyr Leu His Ser Ser Leu Ala Gln Ser Arg Arg Tyr Asp Glu His Asp
225                 230                 235                 240

Pro Lys Gln Val Lys Glu Thr Leu Arg Phe Ala Asn Trp Asp Ser Leu
                245                 250                 255

Ile His Leu Phe Ala Ala Phe Ile Val Asn Ala Leu Leu Ile Leu
            260                 265                 270

Gly Gly Thr Leu Phe Phe His Ala Ala Ser Leu Gly Ser Leu Glu Asp
        275                 280                 285

Val Phe Phe Gly Leu Lys Asn Pro Gln Ile Val Gly Ser Leu Ala Ser
    290                 295                 300

Pro Leu Met Ser Trp Leu Phe Ala Phe Ala Leu Leu Val Thr Gly Leu
305                 310                 315                 320

Ile Ser Ser Ile Thr Ser Thr Leu Ala Gly Gln Ile Val Met Glu Gly
                325                 330                 335

Phe Ile Asn Ile Arg Leu Pro Leu Trp Lys Arg Arg Leu Leu Thr Arg
            340                 345                 350

Ala Val Thr Leu Val Pro Ile Leu Ile Gly Phe Met Ile Asn Phe
        355                 360                 365

Lys Glu Glu Gln Phe Glu Gln Leu Ile Ile Tyr Ala Gln Ile Val Leu
    370                 375                 380

Ser Ile Ala Leu Pro Phe Thr Leu Tyr Pro Leu Val Ala Leu Thr Gly
385                 390                 395                 400

Asn Lys Lys Leu Met Gly Pro His Val Asn Ser Arg Trp Gln Thr Val
                405                 410                 415

Leu Gly Tyr Ile Leu Ala Ser Leu Val Thr Gly Leu Asn Leu Leu Val
            420                 425                 430

Leu Val

<210> SEQ ID NO 18
<211> LENGTH: 440
<212> TYPE: PRT
<213> ORGANISM: Lactobacillus crustorum

<400> SEQUENCE: 18

Met Thr Glu Lys Lys Ser Leu Asp Glu Ile Asn Gly Ser Val Ala Val
1               5                   10                  15

-continued

Pro Gln Tyr Asn Thr Ser Phe Phe Arg Lys Phe Leu Ala Tyr Ser Gly
            20                  25                  30

Pro Gly Ala Leu Ile Ala Val Gly Tyr Met Asp Pro Gly Asn Trp Leu
        35                  40                  45

Thr Ser Leu Val Gly Gly Ala His His Lys Tyr Gln Leu Leu Ser Val
    50                  55                  60

Leu Leu Ile Ser Ile Leu Val Ala Thr Phe Met Gln Ser Leu Ser Ile
65                  70                  75                  80

Arg Leu Gly Ile Ala Ser Arg Gln Asp Leu Ala Gln Ala Ile Ala Lys
                85                  90                  95

Lys Ala Lys Lys Pro Val Arg Tyr Cys Leu Trp Ile Ile Asn Glu Leu
            100                 105                 110

Ala Met Met Ala Thr Asp Leu Thr Gly Val Ile Gly Thr Ala Leu Ala
        115                 120                 125

Leu Asn Met Leu Phe Lys Leu Pro Leu Val Phe Gly Val Leu Ile Thr
    130                 135                 140

Ile Leu Asp Val Phe Leu Ile Leu Trp Phe Met Arg Phe Gly Ile Arg
145                 150                 155                 160

Arg Ile Glu Ser Ile Val Val Ile Ser Ile Leu Thr Val Gly Leu Ile
                165                 170                 175

Phe Ala Phe Glu Val Ser His Val Gln Pro Asn Leu Thr Ala Ile Phe
        180                 185                 190

Lys Gly Phe Val Pro Ser Gln Thr Ile Ile Thr Asn Gln Asn Lys Leu
    195                 200                 205

Ile Leu Ser Leu Gly Ile Ile Gly Ala Thr Ile Met Pro His Asn Ile
210                 215                 220

Tyr Leu His Ser Ala Leu Ala Gln Ser Arg Arg Tyr Asp Tyr His Asp
225                 230                 235                 240

Ser Arg Gln Val Arg Glu Ala Leu Arg Phe Ala Asn Trp Asp Ser Ile
                245                 250                 255

Val His Leu Ile Ala Ala Leu Ile Ile Asn Cys Leu Leu Leu Ile Leu
        260                 265                 270

Gly Gly Thr Ile Phe Tyr Asp Lys Ala Asp Gln Leu Ala Ser Leu Met
    275                 280                 285

Thr Val Phe Lys Gly Leu Met Asn Tyr Gln Val Val Gly Ser Leu Ala
290                 295                 300

Ser Ser Phe Met Ser Tyr Leu Phe Ala Phe Ala Leu Leu Val Thr Gly
305                 310                 315                 320

Leu Ile Ser Ser Ile Thr Ser Thr Leu Ser Gly Gln Ile Val Met Glu
                325                 330                 335

Gly Tyr Leu Asn Ile Arg Leu Pro Leu Trp Gln Arg Arg Leu Leu Thr
        340                 345                 350

Arg Ile Ile Thr Leu Ile Pro Ile Leu Val Ile Gly Phe Leu Val His
    355                 360                 365

Phe Asn Glu Val Ile Phe Glu Asp Leu Ile Val Tyr Ala Gln Ile Ala
    370                 375                 380

Leu Ser Val Ala Leu Pro Phe Thr Leu Phe Pro Leu Val Tyr Leu Thr
385                 390                 395                 400

Asn Asn Ala Lys Ile Met Gly Lys His Val Asn Lys Lys Trp Gln Thr
                405                 410                 415

Ile Leu Gly Phe Val Leu Ala Leu Ile Ile Thr Ile Leu Asn Ile Val
        420                 425                 430

Leu Ile Ala Thr Thr Leu Ser His

```
            435                 440
```

<210> SEQ ID NO 19
<211> LENGTH: 535
<212> TYPE: PRT
<213> ORGANISM: Lactobacillus casei

<400> SEQUENCE: 19

```
Met Ser Asp Asp His Lys Lys Arg His Pro Ile Lys Leu Ile Gln Tyr
1               5                   10                  15

Ala Asn Gly Pro Ser Leu Glu Glu Ile Asn Gly Thr Val Glu Val Pro
            20                  25                  30

His Gly Lys Gly Phe Trp Arg Thr Leu Phe Ala Tyr Ser Gly Pro Gly
        35                  40                  45

Ala Leu Val Ala Val Gly Tyr Met Asp Pro Gly Asn Trp Ser Thr Ser
    50                  55                  60

Ile Thr Gly Gly Gln Asn Phe Gln Tyr Leu Leu Ile Ser Val Ile Leu
65                  70                  75                  80

Met Ser Ser Leu Ile Ala Met Leu Leu Gln Tyr Met Ala Ala Lys Leu
                85                  90                  95

Gly Ile Val Ser Gln Met Asp Leu Ala Gln Ala Ile Arg Ala Arg Thr
            100                 105                 110

Ser Lys Lys Leu Gly Ile Val Leu Trp Ile Leu Thr Glu Leu Ala Ile
        115                 120                 125

Met Ala Thr Asp Ile Ala Glu Val Ile Gly Ala Ala Ile Ala Leu Tyr
    130                 135                 140

Leu Leu Phe His Ile Pro Leu Val Ile Ala Val Leu Val Thr Val Leu
145                 150                 155                 160

Asp Val Leu Val Leu Leu Leu Thr Lys Ile Gly Phe Arg Lys Ile
                165                 170                 175

Glu Ala Ile Val Val Ala Leu Ile Leu Val Ile Leu Leu Val Phe Val
            180                 185                 190

Tyr Gln Val Ala Leu Ser Asp Pro Asn Met Gly Ala Leu Leu Lys Gly
        195                 200                 205

Phe Ile Pro Thr Gly Glu Thr Phe Ala Ser Ser Pro Ser Ile Asn Gly
    210                 215                 220

Met Ser Pro Ile Gln Gly Ala Leu Gly Ile Ile Gly Ala Thr Val Met
225                 230                 235                 240

Pro His Asn Leu Tyr Leu His Ser Ala Ile Ser Gln Thr Arg Lys Ile
                245                 250                 255

Asp His Lys Asn Pro Asp Val Ala Gln Ala Val Lys Phe Ser Ala
            260                 265                 270

Trp Asp Ser Asn Ile Gln Leu Ser Phe Ala Phe Val Val Asn Cys Leu
        275                 280                 285

Leu Leu Val Met Gly Val Ala Val Phe Lys Ser Gly Ala Val Lys Asp
    290                 295                 300

Pro Ser Phe Phe Gly Leu Phe Gln Ala Leu Ser Asp Ser Ser Thr Leu
305                 310                 315                 320

Ser Asn Gly Val Leu Ile Ala Val Ala Lys Ser Gly Ile Leu Ser Ile
                325                 330                 335

Leu Phe Ala Val Ala Leu Leu Ala Ser Gly Gln Asn Ser Thr Ile Thr
            340                 345                 350

Gly Thr Leu Thr Gly Gln Val Ile Met Glu Gly Phe Val His Met Lys
        355                 360                 365
```

```
Met Pro Leu Trp Ala Arg Arg Leu Val Thr Arg Ile Ile Ser Val Ile
    370                 375                 380

Pro Val Ile Val Cys Val Met Leu Thr Ala Arg Asp Thr Pro Ile Gln
385                 390                 395                 400

Gln His Glu Ala Leu Asn Thr Leu Met Asn Asn Ser Gln Val Phe Leu
                405                 410                 415

Ala Phe Ala Leu Pro Phe Ser Met Leu Pro Leu Leu Met Phe Thr Asn
            420                 425                 430

Ser Lys Val Glu Met Gly Asp Arg Phe Lys Asn Thr Gly Trp Val Lys
        435                 440                 445

Val Leu Gly Trp Ile Ser Val Leu Gly Leu Thr Gly Leu Asn Leu Lys
    450                 455                 460

Gly Leu Pro Asp Ser Ile Ala Gly Phe Phe Gly Asp His Pro Thr Ala
465                 470                 475                 480

Thr Gln Thr Asn Met Ala Asn Ile Ile Ala Ile Val Leu Ile Val Ala
                485                 490                 495

Ile Leu Ala Leu Leu Ala Trp Thr Ile Trp Asp Leu Tyr Lys Gly Asn
            500                 505                 510

Gln Arg Tyr Glu Ala His Leu Ala Ala Val Ala Asp Glu Lys Glu Ala
        515                 520                 525

Lys Ala Asp Val Asp Glu Gln
        530                 535

<210> SEQ ID NO 20
<211> LENGTH: 535
<212> TYPE: PRT
<213> ORGANISM: Lactobacillus rhamnosus

<400> SEQUENCE: 20

Met Ser Asp Asp His Lys Lys His Ser Met Lys Leu Ile Gln Tyr
1               5                   10                  15

Ala Asn Gly Pro Ser Leu Glu Glu Ile Asn Gly Thr Val Glu Val Pro
            20                  25                  30

His Gly Lys Gly Phe Trp Arg Thr Leu Phe Ala Tyr Ser Gly Pro Gly
        35                  40                  45

Ala Leu Val Ala Val Gly Tyr Met Asp Pro Gly Asn Trp Ser Thr Ser
    50                  55                  60

Ile Thr Gly Gly Gln Asn Phe Gln Tyr Leu Leu Ile Ser Val Ile Leu
65                  70                  75                  80

Met Ser Ser Leu Ile Ala Met Leu Leu Gln Tyr Met Ala Ala Lys Leu
                85                  90                  95

Gly Ile Val Ser Gln Met Asp Leu Ala Gln Ala Ile Arg Ala Arg Thr
            100                 105                 110

Ser Lys Lys Leu Gly Ile Val Leu Trp Ile Leu Thr Glu Leu Ala Ile
        115                 120                 125

Met Ala Thr Asp Ile Ala Glu Val Ile Gly Ala Ala Ile Ala Leu Tyr
    130                 135                 140

Leu Leu Phe His Ile Pro Leu Val Ile Ala Val Leu Val Thr Val Leu
145                 150                 155                 160

Asp Val Leu Val Leu Leu Leu Thr Lys Ile Gly Phe Arg Lys Ile
                165                 170                 175

Glu Ala Ile Val Val Ala Leu Ile Leu Val Ile Leu Leu Val Phe Val
            180                 185                 190

Tyr Gln Val Ala Leu Ser Asp Pro Asn Met Gly Ala Leu Leu Lys Gly
        195                 200                 205
```

Phe Ile Pro Thr Gly Glu Thr Phe Ala Ser Ser Pro Ser Val Asn Gly
    210                 215                 220

Met Ser Pro Ile Gln Gly Ala Leu Gly Ile Ile Gly Ala Thr Val Met
225                 230                 235                 240

Pro His Asn Leu Tyr Leu His Ser Ala Ile Ser Gln Thr Arg Lys Ile
                245                 250                 255

Asp His Lys Asp Pro Glu Asp Val Ala Gln Ala Val Lys Phe Ser Ala
            260                 265                 270

Trp Asp Ser Asn Ile Gln Leu Thr Phe Ala Phe Val Val Asn Cys Leu
        275                 280                 285

Leu Leu Val Met Gly Val Ala Val Phe Lys Ser Gly Ala Val Lys Asp
    290                 295                 300

Pro Ser Phe Phe Gly Leu Phe Gln Ala Leu Ser Asp Ser Ser Thr Leu
305                 310                 315                 320

Ser Asn Gly Val Leu Ile Ala Val Ala Lys Ser Gly Ile Leu Ser Ile
                325                 330                 335

Leu Phe Ala Val Ala Leu Leu Ala Ser Gly Gln Asn Ser Thr Ile Thr
            340                 345                 350

Gly Thr Leu Thr Gly Gln Val Ile Met Glu Gly Phe Ile His Met Lys
        355                 360                 365

Met Pro Leu Trp Ala Arg Arg Leu Val Thr Arg Val Ile Ser Val Ile
    370                 375                 380

Pro Val Ile Val Cys Val Met Leu Thr Ala Arg Glu Thr Pro Ile Gln
385                 390                 395                 400

Gln His Glu Ala Leu Asn Thr Leu Met Asn Asn Ser Gln Val Phe Leu
                405                 410                 415

Ala Phe Ala Leu Pro Phe Ser Met Leu Pro Leu Leu Met Phe Thr Asn
            420                 425                 430

Ser Lys Val Glu Met Gly Asp Arg Phe Lys Asn Thr Gly Trp Val Lys
        435                 440                 445

Val Leu Gly Trp Val Ser Val Ile Gly Leu Thr Tyr Leu Asn Leu Lys
    450                 455                 460

Gly Leu Pro Asp Ser Ile Ala Gly Phe Phe Gly Asp Asn Pro Thr Ala
465                 470                 475                 480

Ala Gln Thr Asn Ile Ala Asn Met Ile Ala Tyr Val Leu Ile Ala Ala
                485                 490                 495

Val Leu Ala Leu Leu Ala Trp Thr Ile Trp Asp Leu Tyr Lys Gly Asn
            500                 505                 510

Lys Arg Tyr Glu Ala His Leu Glu Ala Val Ala Asp Glu Glu Glu Ala
        515                 520                 525

Lys Ala Asn Asp Asp Val Gln
530                 535

<210> SEQ ID NO 21
<211> LENGTH: 530
<212> TYPE: PRT
<213> ORGANISM: Lactobacillus plantarum

<400> SEQUENCE: 21

Met Ser Glu Lys Thr Asn Thr Pro Asn Arg Lys His Lys Leu Ile Glu
1               5                   10                  15

Tyr Ala Asn Gly Pro Ser Leu Glu Glu Ile Asn Gly Thr Ile Glu Val
            20                  25                  30

Pro Lys Asn Leu Asn Phe Trp Lys Thr Leu Phe Ala Tyr Ser Gly Pro

```
            35                  40                  45
Gly Ala Leu Val Ala Val Gly Tyr Met Asp Pro Gly Asn Trp Ser Thr
 50                  55                  60

Ser Ile Thr Gly Gly Gln Asn Tyr Gln Tyr Met Leu Met Ser Val Ile
 65                  70                  75                  80

Leu Ile Ser Ser Leu Ile Ala Met Leu Leu Gln Tyr Met Ala Ala Lys
                 85                  90                  95

Leu Gly Ile Val Ser Gln Met Asp Leu Ala Gln Ala Ile Arg Ala Arg
            100                 105                 110

Thr Ser Lys Ser Leu Gly Ile Val Leu Trp Ile Leu Thr Glu Leu Ala
            115                 120                 125

Ile Met Ala Thr Asp Ile Ala Glu Val Ile Gly Ala Ala Ile Ala Leu
            130                 135                 140

Tyr Leu Leu Phe Asn Ile Pro Leu Val Ile Ala Val Phe Ile Thr Val
145                 150                 155                 160

Leu Asp Val Leu Val Leu Leu Leu Thr Lys Ile Gly Phe Arg Lys
            165                 170                 175

Ile Glu Ala Ile Val Val Cys Leu Ile Leu Val Ile Leu Phe Val Phe
            180                 185                 190

Val Tyr Gln Val Ala Leu Ser Asn Pro Asp Trp Gly Val Ile Lys
            195                 200                 205

Gly Leu Val Pro Thr Ala Asp Thr Phe Ser Thr Ser Arg Ser Val Asn
210                 215                 220

Gly Met Thr Pro Leu Ser Gly Ala Leu Gly Ile Ile Gly Ala Thr Val
225                 230                 235                 240

Met Pro His Asn Leu Tyr Leu His Ser Ala Ile Ser Gln Thr Arg Lys
                245                 250                 255

Ile Asp His Asn Asp Glu Glu Asp Val Ala Arg Thr Val Lys Phe Ala
            260                 265                 270

Ala Trp Asp Ser Asn Ile Gln Leu Ser Phe Ala Phe Val Val Asn Ser
            275                 280                 285

Leu Leu Leu Ile Met Gly Val Ala Val Phe Lys Ser Gly Ala Val Lys
            290                 295                 300

Asp Pro Ser Phe Phe Gly Leu Tyr Glu Ala Leu Ser Asn Thr Ser Met
305                 310                 315                 320

Leu Ser Asn Gly Ile Leu Ile Ser Val Ala Lys Ser Gly Ala Leu Ser
            325                 330                 335

Ala Leu Phe Ala Ile Ala Leu Leu Ala Ser Gly Gln Asn Ser Thr Ile
            340                 345                 350

Thr Gly Thr Leu Thr Gly Gln Val Ile Met Glu Gly Phe Val His Met
            355                 360                 365

Arg Met Pro Leu Trp Leu Arg Arg Leu Val Thr Arg Leu Ile Ser Val
            370                 375                 380

Ile Pro Val Leu Ile Cys Val Leu Leu Thr Ser Gly Lys Ser Ala Ile
385                 390                 395                 400

Asp Glu His Thr Ala Leu Asn Asn Leu Met Asn Asn Ser Gln Val Phe
            405                 410                 415

Leu Ala Phe Ala Leu Pro Phe Ser Met Leu Pro Leu Leu Met Met Thr
            420                 425                 430

Asp Ser Ala Ala Glu Met Gly Lys Arg Phe Lys Asn Ser Leu Trp Ile
            435                 440                 445

Lys Gly Leu Gly Trp Leu Ser Val Ile Gly Leu Thr Phe Leu Asn Leu
450                 455                 460
```

```
Leu Gly Leu Pro Asp Ser Ile Leu Gly Phe Gly Asp Asn Pro Ser
465                 470                 475                 480

Ala Gly Glu Gln Thr Phe Ser Lys Ile Leu Ala Tyr Leu Leu Ile Ala
            485                 490                 495

Ala Ile Leu Ala Leu Leu Val Trp Thr Val Phe Asp Leu Gln Arg Gly
                500                 505                 510

Asn Lys Arg Tyr Val Glu Gln Gln Leu Ala Ala Ala Lys Glu Ala
            515                 520                 525

Asn Lys
    530

<210> SEQ ID NO 22
<211> LENGTH: 530
<212> TYPE: PRT
<213> ORGANISM: Pediococcus acidilactici

<400> SEQUENCE: 22

Met Ser Asn Glu Ile Lys Asn Pro Lys Lys Arg Arg Lys Leu Ile Ser
1               5                   10                  15

Tyr Ala Asn Gly Arg Ser Leu Glu Glu Ile Asn Gly Thr Val Lys Val
                20                  25                  30

Pro Lys Asn Ile Gly Phe Trp Lys Thr Leu Phe Met Tyr Ser Gly Pro
            35                  40                  45

Gly Ala Leu Val Ala Val Gly Tyr Met Asp Pro Gly Asn Trp Ser Thr
    50                  55                  60

Ser Ile Thr Gly Gly Gln Asn Phe Gln Tyr Met Leu Met Ser Ile Ile
65                  70                  75                  80

Leu Ile Ser Ser Leu Ile Ala Met Leu Leu Gln Tyr Met Ala Ala Lys
                85                  90                  95

Leu Gly Ile Val Ser Gln Met Asp Leu Ala Gln Ala Ile Arg Ala Arg
            100                 105                 110

Thr Ser Arg Ala Leu Gly Ile Val Leu Trp Ile Leu Thr Glu Leu Ala
            115                 120                 125

Ile Met Ala Thr Asp Ile Ala Glu Val Ile Gly Ala Ala Ile Ala Leu
130                 135                 140

Tyr Leu Leu Phe His Ile Pro Leu Val Val Ala Val Phe Ile Thr Val
145                 150                 155                 160

Phe Asp Val Leu Leu Leu Leu Leu Thr Lys Ile Gly Phe Arg Lys
                165                 170                 175

Ile Glu Ala Ile Val Val Cys Leu Ile Met Val Ile Leu Val Val Phe
            180                 185                 190

Val Tyr Gln Val Ala Leu Ser His Pro Ser Trp Gly Ala Val Phe Gly
            195                 200                 205

Gly Leu Ile Pro Thr Thr Lys Ala Phe Ala Thr Thr Pro Thr Val Gly
    210                 215                 220

Gly Met Thr Pro Leu Ser Gly Ser Leu Gly Ile Ile Gly Ala Thr Val
225                 230                 235                 240

Met Pro His Asn Leu Tyr Leu His Ser Ala Val Ser Gln Thr Arg Lys
                245                 250                 255

Ile Asn His Asp Asp Glu Glu Asp Val Ala Arg Thr Val Arg Phe Ser
            260                 265                 270

Thr Trp Asp Ser Asn Ile Gln Leu Ser Phe Ala Phe Val Val Asn Ala
            275                 280                 285

Leu Leu Leu Val Met Gly Val Ala Val Phe Lys Thr Gly Ala Val Gln
```

```
            290                 295                 300

Asp Pro Ser Phe Phe Gly Leu Phe His Ala Leu Asn Asp Thr Ser Thr
305                 310                 315                 320

Leu Ser Asn Gly Ile Leu Ile Gly Val Ala Lys Thr Gly Ile Leu Ser
                325                 330                 335

Thr Leu Phe Ala Val Ala Leu Leu Ala Ser Gly Gln Asn Ser Thr Ile
            340                 345                 350

Thr Gly Thr Leu Thr Gly Gln Val Ile Met Glu Gly Phe Val His Met
        355                 360                 365

Arg Met Pro Leu Trp Ala Arg Arg Leu Ile Thr Arg Leu Ile Ser Val
    370                 375                 380

Val Pro Val Leu Ile Cys Val Met Leu Thr Ser Gly Lys Gly Thr Ile
385                 390                 395                 400

Gln Glu His Glu Ala Leu Asn Asn Leu Met Asn Asn Ser Gln Val Phe
                405                 410                 415

Leu Ala Phe Ala Leu Pro Phe Ser Met Val Pro Leu Leu Met Met Thr
            420                 425                 430

Asp Ser Arg Val Glu Met Gly Asp Arg Phe Lys Asn Ser Trp Ile Val
        435                 440                 445

Arg Ile Leu Gly Trp Ile Ser Val Ile Phe Leu Thr Tyr Leu Asn Leu
    450                 455                 460

Thr Gly Leu Pro Asp Ser Ile Ala Ala Phe Phe Gly Glu Asn Ala Ser
465                 470                 475                 480

Ala Ala Glu Ile Ser Met Ala His Asp Ile Ala Tyr Ala Leu Ile Val
                485                 490                 495

Ala Val Leu Ala Leu Leu Ala Trp Thr Val Ile Glu Leu Tyr Lys Gly
            500                 505                 510

Asn Lys Arg Tyr Glu Ile Glu Leu Ala Glu Lys Ala Asn Ala Lys Glu
        515                 520                 525

Ala Ala
    530

<210> SEQ ID NO 23
<211> LENGTH: 521
<212> TYPE: PRT
<213> ORGANISM: Lactobacillus salivarius

<400> SEQUENCE: 23

Met Val Asn Asn Glu Asn Asn His Lys Lys His Lys Met Ile Gln Tyr
1               5                   10                  15

Ala Asn Gly Lys Ser Leu Glu Glu Ala Asn Gly Thr Val Glu Ile Pro
            20                  25                  30

Lys Gly Lys Gly Phe Trp Lys Thr Leu Phe Ala Tyr Ser Gly Pro Gly
        35                  40                  45

Ala Leu Val Ala Val Gly Tyr Met Asp Pro Gly Asn Trp Ser Thr Ser
    50                  55                  60

Ile Thr Gly Gly Gln Asn Phe Gln Tyr Leu Leu Met Ser Val Ile Leu
65                  70                  75                  80

Leu Ser Ser Leu Ile Ala Met Leu Leu Gln Tyr Met Ala Ala Lys Leu
                85                  90                  95

Gly Ile Val Ser Gln Met Asp Leu Ala Gln Ala Ile Arg Ala Arg Thr
            100                 105                 110

Ser Lys Ala Leu Gly Ile Val Leu Trp Ile Leu Thr Glu Leu Ala Ile
        115                 120                 125
```

```
Met Ala Thr Asp Ile Ala Glu Val Ile Gly Ala Ala Ile Ala Leu Tyr
130                 135                 140
Leu Leu Phe Asp Ile Pro Leu Ile Ile Ala Val Phe Ile Thr Val Phe
145                 150                 155                 160
Asp Val Leu Leu Leu Leu Leu Thr Lys Val Gly Phe Arg Lys Ile
                165                 170                 175
Glu Ala Ile Val Val Cys Leu Ile Phe Val Ile Leu Phe Val Phe Val
            180                 185                 190
Tyr Gln Val Ala Leu Ser Asn Pro Asp Trp Gly Val Phe Lys Gly
        195                 200                 205
Leu Ile Pro Thr Ser Glu Thr Phe Ala Lys His Pro Val Val His Asp
210                 215                 220
Met Ser Pro Leu Asn Gly Ala Leu Gly Ile Ile Gly Ala Thr Val Met
225                 230                 235                 240
Pro His Asn Leu Tyr Leu His Ser Ala Ile Ser Gln Thr Arg Lys Phe
                245                 250                 255
Asp Arg Asn Asn Glu Asp Asp Ile Ala Asn Ala Val Arg Phe Thr Ala
            260                 265                 270
Trp Asp Ser Asn Ile Gln Leu Gly Leu Ala Phe Val Val Asn Ser Leu
        275                 280                 285
Leu Leu Ile Met Gly Val Ala Val Phe Lys Ser Gly Ala Val Glu Asp
290                 295                 300
Pro Ser Phe Phe Gly Leu Tyr Gln Ala Leu Ser Asp Thr Ser Val Met
305                 310                 315                 320
Ser Asn Gly Leu Leu Ala Ala Ala Arg Thr Gly Ile Leu Ser Thr
                325                 330                 335
Leu Phe Ala Val Ala Leu Leu Ala Ser Gly Gln Asn Ser Thr Ile Thr
            340                 345                 350
Gly Thr Leu Thr Gly Gln Val Ile Met Glu Gly Phe Ile His Leu Arg
        355                 360                 365
Met Pro Leu Trp Ala Arg Arg Leu Ile Thr Arg Leu Leu Ser Val Ile
370                 375                 380
Pro Val Leu Ile Cys Val Ala Leu Thr Ser Gly Lys Ser Thr Ile Glu
385                 390                 395                 400
Glu His Glu Ala Leu Asn Asn Leu Met Asn Asn Ser Gln Val Phe Leu
                405                 410                 415
Ala Phe Ala Leu Pro Phe Ser Met Leu Pro Leu Val Ile Met Thr Gly
            420                 425                 430
Ser Lys Val Glu Met Gly Glu Arg Phe Lys Asn Arg Leu Trp Ile Asn
        435                 440                 445
Ile Leu Gly Trp Ile Ser Val Ile Ser Leu Thr Tyr Leu Asn Met Ile
450                 455                 460
Gly Leu Pro Gln Asn Leu Glu Pro Phe Phe Pro Ala Asp Lys Val Gly
465                 470                 475                 480
Leu Ala His Thr Val Ala Tyr Ile Leu Ile Val Leu Ile Ile Ala Leu
                485                 490                 495
Leu Ile Trp Thr Leu Val Glu Leu His Leu Gly Asn Lys Arg Phe Ala
            500                 505                 510
Ala Glu Gln Ala Lys Lys His Asn Lys
        515                 520

<210> SEQ ID NO 24
<211> LENGTH: 520
<212> TYPE: PRT
```

<213> ORGANISM: Lactobacillus fermentum

<400> SEQUENCE: 24

```
Met Asp Asn Thr Lys Asn Gln His Arg Lys Leu Arg Leu Ile Glu His
1               5                   10                  15

Ala Asn Gly Lys Ser Leu Glu Glu Ile Asn Gly Thr Val Glu Val Pro
            20                  25                  30

His Gly Lys Gly Phe Phe Arg Thr Leu Phe Ala Tyr Ser Gly Pro Gly
        35                  40                  45

Ala Leu Val Ala Val Gly Tyr Met Asp Pro Gly Asn Trp Ser Thr Ser
    50                  55                  60

Ile Thr Gly Gly Gln Ser Phe Gln Tyr Thr Leu Met Thr Thr Ile Leu
65                  70                  75                  80

Ile Ser Ser Leu Ile Ala Met Leu Leu Gln Tyr Met Ala Ala Lys Leu
                85                  90                  95

Gly Ile Val Ser Gln Met Asp Leu Ala Gln Ala Ile Arg Ala Arg Thr
            100                 105                 110

Gly Lys Ala Leu Gly Val Ile Leu Trp Leu Met Thr Glu Leu Ala Ile
        115                 120                 125

Met Ala Thr Asp Ile Ala Glu Val Ile Gly Ala Ala Ile Ala Leu Asn
    130                 135                 140

Leu Leu Phe His Ile Pro Leu Val Leu Ala Val Phe Ile Thr Val Leu
145                 150                 155                 160

Asp Val Leu Val Leu Leu Leu Thr Lys Ile Gly Phe Arg Lys Ile
                165                 170                 175

Glu Ala Ile Val Ala Cys Leu Ile Val Ile Leu Ala Val Phe Ala
            180                 185                 190

Tyr Gln Val Ala Leu Ser His Pro Asp Trp Ala Gly Val Phe Lys Gly
    195                 200                 205

Leu Leu Pro Thr Lys Glu Ala Ile Ala Lys Glu Pro Val Val Gly Gly
210                 215                 220

Ile Ser Pro Leu Thr Gly Ser Leu Gly Ile Ile Gly Ala Thr Val Met
225                 230                 235                 240

Pro His Asn Leu Tyr Leu His Ser Ala Ile Ser Gln Thr Arg Lys Ile
                245                 250                 255

Asp His Thr Asn Ala Glu Asp Ile Lys Gln Thr Val Arg Phe Thr Ala
            260                 265                 270

Trp Asp Ser Asn Ile Gln Leu Thr Leu Ala Phe Phe Val Asn Ala Leu
    275                 280                 285

Leu Leu Ile Met Gly Val Ala Val Phe Lys Asn Gly Ala Val Gln Asp
    290                 295                 300

Ser Ser Phe Phe Gly Leu Tyr Asp Ala Leu Asn Thr Asp Met Leu
305                 310                 315                 320

Ser Asn Gly Leu Leu Ile Ala Val Ala Lys Ser Gly Val Leu Ser Thr
                325                 330                 335

Leu Phe Ala Ile Ala Leu Leu Ala Ser Gly Gln Asn Ser Thr Ile Thr
            340                 345                 350

Gly Thr Leu Thr Gly Gln Val Ile Met Glu Gly Phe Val His Met Lys
        355                 360                 365

Met Pro Leu Trp Ala Arg Arg Leu Ile Thr Arg Leu Leu Ser Val Val
    370                 375                 380

Pro Val Leu Val Cys Val Ala Met Thr Ala His Glu Ser Thr Ile Asp
385                 390                 395                 400
```

```
Gln His Ala Ser Leu Asn Ile Leu Met Glu Asn Ser Gln Val Phe Leu
            405                 410                 415

Ala Phe Ala Leu Pro Phe Ser Met Leu Pro Leu Leu Ile Met Thr Asn
        420                 425                 430

Ser Asp Thr Glu Met Gly Gln Phe Lys Asn Ser Leu Trp Val Arg Val
        435                 440                 445

Leu Gly Trp Ile Ser Val Ile Gly Leu Thr Phe Leu Asn Leu Tyr Asn
    450                 455                 460

Leu Pro Gln Thr Tyr Glu Gly Phe Gly Ile Trp Ser Lys Gly Leu Ser
465                 470                 475                 480

Asp Val Leu Ala Trp Ile Ser Ile Val Val Ile Val Val Leu Leu Ala
                485                 490                 495

Trp Thr Cys Phe Glu Leu Ile Arg Gly Asp Arg Arg Leu Ala Ala Glu
            500                 505                 510

Arg Glu Lys His Thr Trp Glu Lys
            515                 520

<210> SEQ ID NO 25
<211> LENGTH: 533
<212> TYPE: PRT
<213> ORGANISM: Lactobacillus amylolyticus

<400> SEQUENCE: 25

Met Cys Ser Arg Lys Val Leu Leu Thr Lys Gln Lys Gly Lys His Tyr
1               5                   10                  15

Leu Ile Arg Tyr Ala Asn Gly Lys Ser Leu Ser Glu Ile Asn Gly Thr
            20                  25                  30

Ile Glu Ile Pro Lys Lys Arg Thr Phe Trp Arg Met Leu Trp Ala Tyr
        35                  40                  45

Thr Gly Pro Gly Ala Leu Val Ala Val Gly Tyr Met Asp Pro Gly Asn
    50                  55                  60

Trp Ala Thr Ser Ile Thr Gly Gly Gln Ser Phe Gln Tyr Ile Leu Met
65              70                  75                  80

Ser Thr Ile Leu Ile Ser Ser Leu Met Ala Met Leu Leu Gln Tyr Met
                85                  90                  95

Ala Ala Lys Leu Gly Ile Val Thr Gln Met Asp Leu Ala Gln Ala Ile
            100                 105                 110

Arg Leu Arg Thr Gly Lys Ala Leu Gly Ile Val Leu Trp Leu Met Thr
        115                 120                 125

Glu Leu Ala Ile Met Ala Thr Asp Ile Ala Glu Val Ile Gly Ala Ala
    130                 135                 140

Ile Ala Leu Asn Leu Leu Phe Asp Ile Pro Leu Val Pro Ala Val Phe
145                 150                 155                 160

Ile Thr Val Leu Asp Val Leu Leu Leu Leu Leu Ala Arg Ile Gly
                165                 170                 175

Phe Arg Lys Ile Glu Ala Val Val Ser Cys Leu Ile Leu Val Ile Leu
            180                 185                 190

Leu Val Phe Val Tyr Glu Val Leu Leu Ser Asn Pro Asp Trp Ser Lys
        195                 200                 205

Ala Phe Val Gly Leu Val Pro Ser Ala Lys Ile Ile Gln Thr His Pro
    210                 215                 220

Val Val Gly Gly Ile Ser Pro Leu Thr Gly Thr Leu Gly Ile Ile Gly
225                 230                 235                 240

Ala Thr Val Met Pro His Asn Leu Tyr Leu His Ser Ala Ile Ser Gln
                245                 250                 255
```

-continued

```
Thr Arg Lys Ile Asn His His Asn Leu Gln Leu Ile Arg Asp Ala Val
        260                 265                 270

Lys Tyr Thr Ala Leu Asp Ser Asn Ile Gln Leu Ser Leu Ala Phe Leu
        275                 280                 285

Val Asn Ala Leu Leu Leu Ile Met Gly Ala Ala Val Phe Lys Ser Gly
    290                 295                 300

Ala Val Arg Asp Ser Ser Phe Phe Gly Leu Tyr Gln Ala Leu Asp Asn
305                 310                 315                 320

Ala Lys Met Leu Ser Asp Pro Leu Leu Val His Val Ala Arg Thr Gly
                325                 330                 335

Ile Leu Ser Thr Leu Phe Ala Val Ala Leu Leu Ala Ser Gly Gln Asn
            340                 345                 350

Ser Thr Ile Thr Gly Thr Leu Thr Gly Gln Val Ile Met Glu Gly Tyr
        355                 360                 365

Ile His Leu Lys Met Pro Leu Trp Ala Arg Arg Leu Val Thr Arg Leu
    370                 375                 380

Leu Ser Val Ile Pro Val Leu Leu Cys Val Ser Phe Thr Met Asn Asp
385                 390                 395                 400

Ser Val Met Gln Gln His Phe Ala Leu Asn Met Leu Met Glu Asn Ser
                405                 410                 415

Gln Val Phe Leu Ala Phe Ala Leu Pro Phe Ser Val Leu Pro Leu Leu
            420                 425                 430

Ile Met Thr Asn Asn Lys Ala Glu Met Gly Glu Phe Lys Asn Lys Pro
        435                 440                 445

Leu Trp His Tyr Leu Gly Trp Ala Cys Ala Leu Val Leu Thr Phe Leu
    450                 455                 460

Asn Leu Tyr Asn Leu Pro Ser Gln Phe Val Asn Phe Lys Phe Ala Ser
465                 470                 475                 480

Lys Glu Val Ser Thr Ile Ile Ala Tyr Phe Val Ile Val Val Ile Ala
                485                 490                 495

Ala Leu Leu Leu Trp Thr Cys Ile Glu Ile Tyr Ile Gly Asp Arg Lys
            500                 505                 510

Val Lys Ile His His Ser Gly Phe Asp Ala Lys Glu Lys Glu Leu Lys
        515                 520                 525

Glu Glu Gly Gln Lys
    530
```